US011575683B2

(12) United States Patent
Bleikertz et al.

(10) Patent No.: US 11,575,683 B2
(45) Date of Patent: Feb. 7, 2023

(54) PRIVACY PRESERVING VALIDATION AND COMMIT ARCHITECTURE

(71) Applicant: Digital Asset (Switzerland) GmbH, Zurich (CH)

(72) Inventors: Sören Gerhard Bleikertz, Zurich (CH); James Benton Litsios, New York, NY (US); Andreas Lochbihler, Zurich (CH); Ognjen Maric, Zurich (CH); Matthias Schmalz, Zurich (CH); Ratko Goran Veprek, Zurich (CH); Shaul Kfir, New York, NY (US); Tsering Shrestha, Zurich (CH)

(73) Assignee: Digital Asset (Switzerland) GmbH

( * ) Notice: Subject to any disclaimer, the term of this patent is extended or adjusted under 35 U.S.C. 154(b) by 199 days.

(21) Appl. No.: 16/658,920

(22) Filed: Oct. 21, 2019

(65) Prior Publication Data

US 2020/0128022 A1    Apr. 23, 2020

Related U.S. Application Data

(60) Provisional application No. 62/748,327, filed on Oct. 19, 2018, provisional application No. 62/748,315, filed on Oct. 19, 2018.

(51) Int. Cl.
*H04L 29/06* (2006.01)
*H04L 9/40* (2022.01)

(52) U.S. Cl.
CPC ........ *H04L 63/123* (2013.01); *H04L 63/0421* (2013.01); *H04L 63/0428* (2013.01); *H04L 2463/121* (2013.01)

(58) Field of Classification Search
CPC ............... H04L 63/123; H04L 63/0421; H04L 63/0428; H04L 2463/121; H04L 63/0465; H04L 63/0442

(Continued)

(56) References Cited

U.S. PATENT DOCUMENTS 10,333,902 B1 *  6/2019  Druker .................. G06F 21/604
10,552,829 B2 *  2/2020  Wilkins ................. G06Q 40/04

(Continued)

FOREIGN PATENT DOCUMENTS

AU    2019200933 B1    5/2019
WO   2015143068 A1    9/2015

(Continued)

OTHER PUBLICATIONS

International Search Report for Application No. PCT/US2019/057248, dated Feb. 12, 2019, pp. 1-3.

(Continued)

*Primary Examiner* — Longbit Chai
(74) *Attorney, Agent, or Firm* — Lerner, David, Littenberg, Krumholz & Mentlik, LLP

(57) ABSTRACT

A method of scheduling and validating a multiple-participant process, the method including: submitting, by a submitting node associated with a participant in the multiple-participant process, a proposed transaction by sending a cryptographically-protected message to one or more recipient nodes, wherein the cryptographically-protected message includes at least an unencrypted submessage readable by an external node and a cryptographically-protected submessage to preserve privacy from at least the external node; determining, by the external node, an order of the proposed transaction relative to other transactions; by way of at least some of the recipient nodes, validating the cryptographically-protected message; receiving a confirmation of validity of the cryptographically-protected message from at least some of the recipient nodes; finalizing the proposed transaction, as a confirmed transaction, based on receiving one or more confirmations from at least some of the recipient nodes that satisfy a confirmation condition; and writing the con- (Continued)

firmed transaction to a distributed ledger according to the order determined by the external node.

26 Claims, 23 Drawing Sheets

(58) Field of Classification Search
USPC .......................................................... 713/168
See application file for complete search history.

(56) References Cited

U.S. PATENT DOCUMENTS

| | | | |
|---|---|---|---|
| 10,708,070 B2* | 7/2020 | Fallah | .................... H04L 9/3239 |
| 2016/0350749 A1 | 12/2016 | Wilkins et al. | |
| 2017/0155515 A1 | 6/2017 | Androulaki et al. | |
| 2017/0255917 A1 | 9/2017 | Singh et al. | |
| 2017/0301047 A1 | 10/2017 | Brown et al. | |
| 2017/0316391 A1 | 11/2017 | Peikert et al. | |
| 2018/0096360 A1 | 4/2018 | Christidis et al. | |

FOREIGN PATENT DOCUMENTS

| | | |
|---|---|---|
| WO | 2017187394 A1 | 11/2017 |
| WO | 2017189027 A1 | 11/2017 |
| WO | 2019082142 A1 | 5/2019 |

OTHER PUBLICATIONS

Peikert, Vincent et al., U.S. Appl. No. 62/329,888, filed Apr. 29, 2016, titled "Digital Asset Modelling Language Simulator".

Yoshihama Sachiko et al.: "Study on Integrity and Privacy Requirements of Distributed Ledger Technologies," 2018 IEEE International Conference on Internet of Things (ITHINGS) and IEEE Green Computing and Communications (GREENCOM) and IEEE Cyber, and IEEE Smart Data (SMARTDATA), IEEE, Jul. 30, 2018 (Jul. 30, 2018), pp. 1657-1664, XP033556263, DOI: 10.1109/CYBERMATICS_2018.2018.00276 [retrieved on May 30, 2019] *p. 1659-p. 1663 *.

Xavier Defago et al.: "Total Order Broadcast And Multicase Algorithms," ACM Computing Surveys, ACM, New York, NY, US US, vol. 36, No. 5, Dec. 1, 2004 (Dec. 1, 2004), pp. 372-421, XP058270101, ISSN: 0360-0300, DOI: 10.1145/1041680.1041682 * the whole document *.

Extended European Search issued in EP Appln. No. 19873365.1 dated May 6, 2022 (9 pages).

* cited by examiner

PRIVACY PRESERVING VALIDATION AND COMMIT ARCHITECTURE

TECHNICAL FIELD

The present disclosure relates to a computer system, comprising a plurality of nodes, for a privacy-preserving validation and commit architecture. The disclosure also relates to a method of validating a multiple-participant process to commit transactions to a distributed ledger.

BACKGROUND

In distributed computing, the problem of ensuring consistency is known as the state-machine replication problem. Byzantine fault tolerant solutions can solve the problem while ensuring the validity of state (i.e., workflow) evolution, even with mutually distrusting parties. Cryptocurrency systems such as Bitcoin and Ethereum may have at least partial solutions to the state-machine replication problem (with additional "permissionless" requirements). However, such existing solutions are inapplicable for many applications. One such application is to provide privacy in a multiple-participant process, where workflow evolution usually must only be visible to the affected participants. A solution to this problem is to utilise a centralised node that validates, synchronizes and commits transactions to a distributed ledger. However, the use of a centralised node for this purpose may not be suitable for some applications because the centralised node has to be trusted, and each other node will have to reveal their workflow evolution to the centralised node. Therefore, there is a need for a privacy-preserving architecture that avoids the use of centralised nodes for the purpose of synchronizing and validating transactions.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", shall be understood to imply the inclusion of a stated element, integer or step, or group of elements, integers or steps, but not the exclusion of any other element, integer or step, or group of elements, integers or steps.

SUMMARY

There is provided a method of scheduling and validating a multiple-participant process, the method comprising: submitting, by a submitting node associated with a participant in the multiple-participant process, a proposed transaction by sending a cryptographically-protected message to one or more recipient nodes, wherein the cryptographically-protected message comprises at least an unencrypted submessage readable by an external node and a cryptographically-protected submessage to preserve privacy from at least the external node; determining, by the external node, an order of the proposed transaction relative to other transactions; by way of at least some of the recipient nodes, validating the cryptographically-protected message; receiving a confirmation of validity of the cryptographically-protected message from at least some of the recipient nodes; finalizing the proposed transaction, as a confirmed transaction, based on receiving one or more confirmations from at least some of the recipient nodes that satisfy a confirmation condition; and writing the confirmed transaction to a distributed ledger according to the order determined by the external node.

In some embodiments, the one or more recipient nodes may include at least a first recipient node and a second recipient node and wherein the cryptographically-protected submessage is readable by the first recipient node, but not readable by the second recipient node.

In some embodiments, the first recipient node may have access to a decryption key to decrypt the cryptographically-protected submessage, but the second recipient node does not.

In some embodiments, the cryptographically-protected message may be sent to the external node, and the external node sends the cryptographically-protected message to each recipient node.

In some embodiments, the one or more recipient nodes may use pseudonymous addresses to hide their identity from other recipient nodes.

In some embodiments, the method may further use an identity manager that maintains associations between the submitting node and a pseudonymous address, and the recipient node and a pseudonymous address.

In some embodiments, determining validity of the cryptographically-protected message may be based on the unencrypted submessage.

In some embodiments, determining validity of the cryptographically-protected message based on the unencrypted submessage may include determining if a transaction time of the proposed transaction is within a window of a timestamp provided by the external node.

In some embodiments, the transaction time of the proposed transaction may be a range of timestamps.

In some embodiments, determining validity of the cryptographically-protected message may be based on the cryptographically-protected submessage.

In some embodiments determining validity of the cryptographically-protected message based on the cryptographically-protected submessage may include identifying the proposed transaction conflicts with a previous transaction.

In some embodiments, determining validity of the cryptographically-protected message based on the cryptographically-protected submessage may include determining the proposed transaction is well-formed.

In some embodiments, determining validity of the cryptographically-protected message based on the cryptographically-protected submessage may include determining if the proposed transaction conforms with a set of conformance rules.

In some embodiments, identifying the proposed transaction conflicts with a previous transaction may include checking if the proposed transaction has been previously recorded on the distributed ledger.

In some embodiments, determining validity of the cryptographically-protected message may be based on the unencrypted submessage and the cryptographically-protected submessage.

In some embodiments, determining validity may comprise determining if the unencrypted submessage is consistent with the cryptographically-protected submessage.

In some embodiments, the confirmation condition may be one or more of the following: receiving a confirmation from each recipient node corresponding to a participant in the multi-participant process; receiving a specified amount of confirmations within an allocated period of time; or receiving confirmations from a specified subset of recipient nodes;

or receiving confirmation from a verifiable attestation mechanism such as a cryptographic prover or trusted hardware.

In some embodiments, the method may further use a referee node that determines if the one or more recipient nodes do not act in accordance with an expected action for the recipient node.

In some embodiments, the referee node may determine one or more of the following: whether a proposed transaction is well-formed; whether the confirmation provided by the one or more recipient nodes conflicts with one or more other confirmations; and whether the proposed transaction falsely indicates capacity promise exhaustion.

In some embodiments, the method may further use the referee node to perform a dispute resolution process.

In some embodiments, determining a proposed transaction is well-formed may include checking one or more of the following: that the proposed transaction conforms with the conformance rules; that the proposed transaction is authorised by a required subset of the one or more recipient nodes; and that the proposed transaction has a correct declaration of resource requirements.

In some embodiments, a first of the one or more recipient nodes may forward a proposed transaction to the referee node to initiate the dispute resolution process.

In some embodiments, the dispute resolution process may be resolved by the referee imposing a punishment on a misbehaving node determined from the submitting node or the one or more recipient nodes.

In some embodiments, the punishment may be one or more of the following: removing the ability for the misbehaving node to submit transactions; flagging a proposed transaction associated with the misbehaving node as frozen; a custom punishment for the misbehaving node as determined by the referee node; and a punishment for the misbehaving node as defined in the domain rules.

In some embodiments, the referee node may communicate the result of the dispute resolution process to the submitting node or one or more of the recipient nodes.

In some embodiments, the dispute resolution process may be defined in the domain rules.

In some embodiments, other recipient nodes besides the first recipient node may provide one or more messages as evidence for the dispute resolution process to the referee node.

In some embodiments, determining the order of a plurality of messages corresponding to the multiple transactions that make up the process may be based on the unencrypted submessage.

In some embodiments, the unencrypted submessage may contain a physical timestamp corresponding to the time the cryptographically-protected message is received by the external node.

In some embodiments, the order of the proposed transaction relative to other transactions may be based on the physical timestamp.

In some embodiments, the order of the proposed transaction may be based on a logical timestamp assigned to the proposed transaction.

In some embodiments, the logical timestamp may correspond to a time within a defined time window of the physical timestamp.

In some embodiments, the cryptographically-protected submessage may be an encrypted submessage.

There is provided a method of scheduling and validating a multiple-participant process, the method comprising: submitting, by a submitting node associated with a participant in the multiple-participant process, a proposed transaction by sending a cryptographically-protected message to one or more recipient nodes, wherein the cryptographically-protected message comprises at least an unencrypted submessage readable by an external node and a cryptographically-protected submessage to preserve privacy from at least the external node; determining, by the external node, an order of the proposed transaction relative to other transactions; determining, by the external node, one or more recipient nodes associated with a participant in the multiple-participant process based on the unencrypted submessage; sending, by the external node, at least the cryptographically-protected submessage to the one or more recipient nodes; determining, by the one or more recipient nodes, validity of the cryptographically-protected submessage; receiving, by the external node, a confirmation of validity of the cryptographically-protected submessage from the one or more recipient nodes; determining, by the external node, one or more nodes that should receive the confirmation; sending, by the external node, the confirmation to the one or more nodes; finalizing, by the submitting node, the proposed transaction, as a confirmed transaction, based on whether the confirmations provided by the one or more recipient nodes satisfy a confirmation condition; and writing, by the submitting node, the confirmed transaction to a distributed ledger according to the order determined by the external node.

In some embodiments, the method may further comprise: receiving and aggregating, by a mediator node, the confirmations provided by the one or more recipient nodes.

In some embodiments, the method may further comprise one or more of the following: storing the aggregation of the one or more confirmations; sending the aggregation of the one or more confirmations to another node; and confirming the proposed transaction based on the aggregation of the confirmations.

A non-transitory, tangible, computer-readable medium comprising program instructions that, when executed, cause a node or series of related nodes to perform the above method.

There is provided a method of scheduling and validating a transaction or series of transactions in a multiple-participant process comprising: submitting a proposed transaction by at least sending a partially encrypted message to one or more recipient nodes associated with a participant in the multi-participant process, wherein the partially encrypted message comprises at least an unencrypted submessage readable by an external node and an encrypted submessage to preserve privacy from at least the external node; receiving a confirmation of validity of the partially encrypted message from the recipient node; finalizing the proposed transaction, as a confirmed transaction, based on receiving one or more confirmations from at least some of the recipient nodes that satisfy a confirmation condition; receiving, from the external node, an order of the confirmed transaction relative to other transactions; and writing the confirmed transaction to a ledger according to the order determined by the external node.

In some embodiments, the one or more recipient nodes may include at least a first recipient node and a second recipient node, and the method may further comprise sending the encrypted submessage to the first recipient node, the encrypted submessage being decryptable by a decryption key controlled by the first recipient node, but not the second recipient node.

In some embodiments, the encrypted submessage may not be sent to the second recipient node.

In some embodiments, the method may further comprise determining a pseudonymous address of each recipient node, wherein each pseudonymous address is used to hide an identity of the respective recipient node from the other recipient nodes.

There is provided a non-transitory, tangible, computer-readable medium comprising program instructions that, when executed, cause a submitting node to perform the above method.

There is provided a method of scheduling and validating a plurality of transactions in a multiple-participant process comprising:

by way of a node or series of related nodes:
A. determining an order of a plurality of messages corresponding to the plurality of transactions that make up the multi-participant process;
B. receiving, from a submitting node associated with a participant in the multi-participant process, a proposed transaction that includes a partially encrypted message, wherein the partially encrypted message comprises at least an unencrypted submessage readable by the node or series of related nodes;
C. determining a recipient node associated with a participant in the multi-participant process based on the unencrypted submessage;
D. sending the partially encrypted message to the recipient node;
E. receiving a confirmation of validity of the partially encrypted message from the recipient node; and
F. sending the confirmation to the submitting node.

In some embodiments, the method may further comprise determining a pseudonymous address of the recipient node, wherein the pseudonymous address is used to hide an identity of the recipient node from other nodes.

In some embodiments of the method, the distributed ledger records messages between the submitting node, external node, and/or recipient nodes, wherein the confirmed transaction(s) written to the distributed ledger comprises the recorded messages, whereby the order determined by the external node is evidenced, or can be derived, from the recorded messages.

In some embodiments of the method, the distributed ledger comprises a plurality of distinct ledgers, each maintaining a respective partial copy of the ledger, wherein the distributed ledger is constructed from partial records of the plurality of distinct ledgers.

In some embodiments, the method further includes a change of the multiple-participant process from a first domain associated with the external node to a target domain associated with a target external node. The method further comprises: receiving, by the external node of the first domain, a transfer request from an initiator node, wherein the transfer request specifies the target domain and the target external node; determining, by the external node of the first domain, validity of the target domain and the target external node to host the proposed transaction, wherein based on determining the target domain can validly host the proposed transaction, sending an authorization to the initiator node to schedule and validate the proposed transaction at the target node, wherein the step of ordering the proposed transaction is performed by the target external node.

In further embodiments, the method comprises: receiving, at the submitting node and/or the recipient node, the transfer request; determining, at the submitting node and/or recipient node, validity of the target domain and target external node to host the proposed transaction, wherein based on determining the target domain can validly host the proposed transaction, sending authorization to the initiator node to schedule and validate the proposed transaction at the target node.

In another embodiment, the authorization to the initiator node is associated with a specified timeout condition, wherein the authorization is effective and/or exclusive based on the specified time out condition.

There is also provided method of scheduling and validating a multiple-participant process involving: a first domain that is associated with a first external node, a first recipient node, and a submitting node that is associated with participants in the multiple-participant process; a second domain that is associated with a second external node, a second recipient node, and the submitting node or a separate relay node, and wherein the submitting node or the relay node is in communication with both the first external node and the second node, wherein the method comprises: determining, by the submitting node, a first proposed transaction for the first domain and a second proposed transaction for the second domain, wherein the first and second proposed transaction in combination form a proposed multi-participant transaction involving the first and second recipient nodes, wherein each of the first and second proposed transactions include a cryptographically-protected message to the respective recipient nodes, and the cryptographically-protected message comprises at least an unencrypted submessage readable by the external node of the respective domain and a cryptographically-protected submessage to preserve privacy from at least the external node; submitting, by the submitting node and/or the relay node, the first proposed transaction to the first recipient node and the second proposed transaction to the second recipient node; determining, by the first external node, a first order for the first proposed transaction. The method also includes: determining, by the second external node, a second order for the second proposed transaction; by way of the first and second recipient nodes, validating the respective cryptographically-protected message; receiving a confirmation of validity of the cryptographically-protected messages from the first and second recipient nodes; finalizing the proposed multi-participant transaction, as a combination of a confirmed first transaction and a confirmed second transaction, based on receiving the confirmations from the first and second recipient nodes that satisfy a confirmation condition; and writing the first confirmed transaction, according to the first order, to a distributed ledger associated with the first domain and writing the second confirmed transaction, according to the second order, to a distributed ledger associated with the second domain.

In a further embodiment of the method, the submitter node is a relay to receive and send messages between the first domain and the second domain, wherein the method further comprises: sending, by the submitting node and/or the relay node, the confirmation of validity of the cryptographically-protected message from the first recipient node to the second external node and/or second recipient node of the second domain; and sending, by the submitting node and/or the relay node, the confirmation of validity of the cryptographically-protected message from the second recipient node to the first external node and/or first recipient node of the first domain.

In another embodiment of the method, an authorization to finalize the proposed multi-participant transaction is associated with a specified timing condition, wherein the authorization is effective and/or exclusive based on the specified timing condition.

In another embodiment of the method, the proposed transaction is part of a proposed multi-participant transaction across multiple domains, the method further comprising: determining from a proposed multi-participant transaction: the first proposed transaction for a first domain including the one or more recipient nodes and the external node; and at least another proposed transaction for another domain including one or more other recipient node and another external node, submitting the other proposed transaction by at least sending another partially encrypted message to the one or more other recipient nodes associated with a participant in the multi-participant process in the other domain, wherein the other partially encrypted message comprises at least an unencrypted submessage readable by the other external node and an encrypted submessage to preserve privacy from at least the other external node; receiving another confirmation of validity of the other partially encrypted submessage from the one or more other recipient node; wherein the step of finalizing the proposed transaction further includes finalizing the other proposed transaction, as another confirmed transaction, based on receiving one or more confirmations from at least some of the other recipient nodes that satisfy the confirmation condition; receiving, from the other external node, an order of the other confirmed transaction relative to other transactions in the other domain; and writing the other confirmed transaction to a ledger, or other ledger, according to the order determined by the other external node.

In a further embodiment, the method further comprises: sending the confirmation of validity of the cryptographically-protected message from the recipient node in the first domain to the other recipient node in the other domain; and sending the other confirmation of validity of the cryptographically-protected message from the other recipient node in the other domain to the recipient node in the first domain.

In a further embodiment, an authorization to finalize the proposed transaction and other proposed transaction is associated with a specified timing condition, wherein the authorization is effective and/or exclusive based on the specified timing condition.

In other embodiments of the above mentioned methods, the encrypted submessage includes expected confirmation data to cryptographically validate all expected confirmations in the proposed transaction, wherein the method further comprises: executing a cryptographic function to cryptographically validate each of the received one or more confirmations corresponds with the expected confirmation data.

In further examples of the method, the expected confirmation data is in the form of public key(s), and wherein the expected confirmation includes an electronic signature with a private key corresponding to the public key(s).

In some examples of the method, the proposed transaction includes a plurality of subtransactions that each involve at least one recipient node, and each subtransaction is associated with a corresponding cryptographically-protected submessage with private information readable by an involved recipient node to the subtransaction, but not readable by recipient node(s) that are not involved in the subtransaction, and wherein the cryptographically-protected submessage includes private information validation data to validate confirmations that, at least in part, are representative of private information of at least one other subtransaction in the proposed transaction, and the method further comprises: validating that the confirmation of at least one other subtransaction corresponds with the private information validation data.

In some further examples of the method, the confirmation of a subtransaction includes, at least in part, a cryptographic hash of the private information of that subtransaction.

In some examples of the method, the proposed transaction has a tree structure with a plurality of subtrees, wherein a subtree includes one or more of the plurality of subtransactions.

In some examples of the method, the cryptographically-protected submessage includes private information validation data to cryptographically validate any one of the confirmations of the plurality of subtransactions in the proposed transaction.

There is provided a non-transitory, tangible, computer-readable medium comprising program instructions that, when executed, cause a node or series of related nodes to perform the above method.

In some embodiments, the ledger may be a shared ledger.

BRIEF DESCRIPTION OF DRAWINGS

Examples of the present disclosure will be described with reference to the figures below:

FIG. 11b conceptually illustrates blinded views of the view in FIG. 11a;

FIG. 14b illustrates the view visible by the bank in the transaction of FIG. 14a;

DESCRIPTION OF EMBODIMENTS

This disclosure is related to a system that can separate synchronization from validity in a distributed system. Synchronization is a standard problem in distributed systems, and is usually solved through some form of ordering agreement primitive, such as total-order broadcast or multicast. An exemplary system is disclosed herein that ensures validity based on the notion of recipient nodes where validity checks can be moved to the recipients themselves. Among a myriad of other benefits, this can remove the need for a centralised committer node who has the ability to see and process all data, or remove the need for a multi-party committer node which jointly has the ability to see and process all data, thereby increasing privacy for the recipient nodes in the system.

In the system, participants can perform local validity checks based on their partial views of a transaction, and exchange the results of their local checks through confirmations (e.g., peer-to-peer confirmations or confirmations routed through a component(s) or node(s) of the system). In an example, parties can delegate the task to perform local validity checks based on their partial views to participant users or other actors. In an example, participants can delegate the task to perform transaction level validity checks based on their limited views of the workflow rules of the distributed ledger to party users or other actors.

Figure 1:
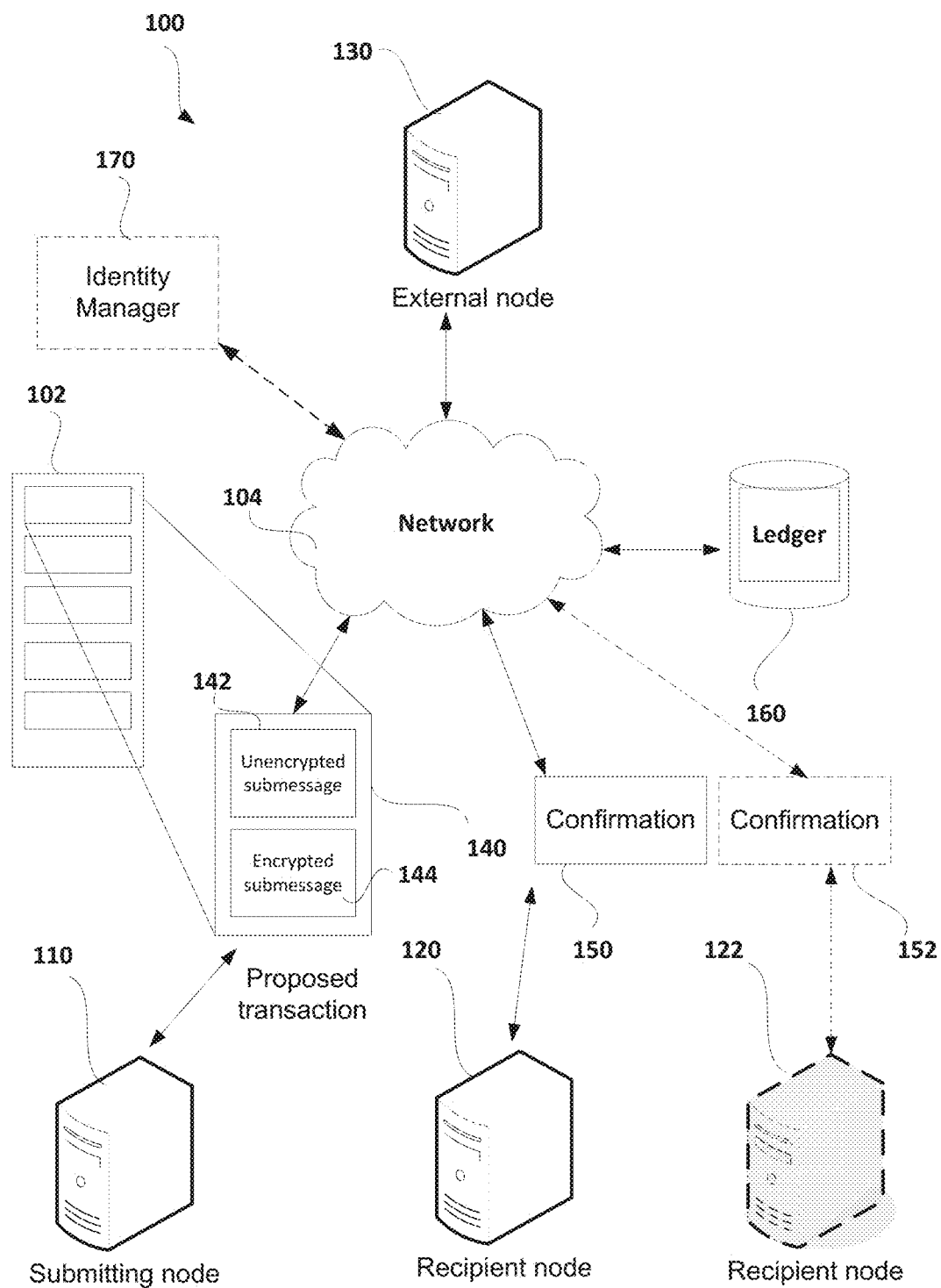
FIG. 1 is an example system for scheduling and validating a multiple-participant process including multiple transactions.

FIG. 1 illustrates an example system 100 for scheduling and validating a multiple-participant process including multiple transactions. In this example, there is a process 102, a network for communicating 104 amongst nodes, a submitting node 110, a recipient node 120, an external node 130 and a ledger 160. Optionally, there can be a second recipient node 122 (reflected by dashed lines in FIG. 1) and an identity manager 170.

In this example, the process 102 can be shared across all the nodes. The process can have multiple participants, each of which can be associated with at least one node in the network. In the simplest example, there can be a submitting node 110, a recipient node 120 and an external node 130. The external node 130 can determine an order of a plurality of messages corresponding to the one or more transactions that make up the process 102 involving multiple participants. The external node 130 can comprise of a plurality of physical systems implementing the logical ordering function of the external node.

The submitting node 110 can submit a proposed transaction 140. Submitting a proposed transaction 140 can comprise sending over the network 104 a cryptographically-protected message to one or more recipient nodes 120, 122 associated with a participant in the process, wherein the cryptographically-protected message can comprise at least an unencrypted submessage 142 readable by the external node 130 and a cryptographically-protected submessage 144 to preserve privacy from at least the external node 130. In an example, the cryptographically-protected message can be a partially encrypted message that can include an unencrypted submessage 142 and an encrypted submessage 144. For the remainder of the specification, reference is made to the cryptographically-protected message and submessage as a partially encrypted message and an encrypted submessage, respectively, for convenience only, it being understood that other cryptographic protection mechanisms besides encryption might be utilized to encode or obfuscate the cryptographically-protected message or submessage from unauthorized nodes (e.g. data masking, semantics obfuscation, etc.). The encrypted submessage 144 in this example can be considered the submitted payload of the partially encrypted message. In an example, symmetric (e.g., Advanced Encryption Standard (AES)), asymmetric encryption (e.g., RSA, elliptic curve, etc.), or integrated encryption (e.g., ECIES) can be utilized in encrypting the partially encrypted message and submitting the proposed transaction 140, and can be utilized in all transactions disclosed herein, as is appreciated.

Once a submitting node 110 has submitted the proposed transaction 140, the recipient node 120 can receive the proposed transaction 140 and determine validity of the partially encrypted message, and by extension the proposed transaction 140. In an example, such validation can encompass the recipient node 120 validating the encrypted submessage 144 of the partially encrypted message. For instance, the encrypted submessage 144, in certain embodiments, can contain data (e.g., program instructions, information, etc.) that is private to the recipient node 120 and the submitting node 110, and is not readable by the external node 130 (e.g., because the submitting and recipient nodes 110, 120 contain decryption keys while the external node 130 does not).

Once the validity of the proposed transaction 140 is determined, the recipient node 120 can send out a message called a confirmation 150, which can be a confirmation of validity of the partially encrypted message from the recipient node 120. In an example, the confirmation can confirm that the recipient node 120 has validated the encrypted submessage 144 in the context of the proposed transaction 140 and considers the proposed transaction 140 accurate and valid. In some examples, the steps of sequencing (i.e. ordering the proposed transaction 140 relative to other proposed transactions) before the proposed transaction 140 is validated can be advantageous. Since every participant can receive and validate the same sequence of transactions (or snippet of that sequence), such participants can implicitly validate the same order or sequencing of proposed transactions, which can make it easier to identify a misbehaving node.

In this example, the submitting node 110 can accept the proposed transaction 140 as a confirmed transaction, based on receiving the confirmation from the recipient node 120 and, in turn, can then determine that the proposed transaction 140 satisfies a confirmation condition. A confirmation condition in this example could be that a confirmation 150 is received by all the nodes that correspond to participants in the process 102. Given that there is only one (1) recipient 120 in this example, only one (1) confirmation might be required to be received by the submitting node 110 to confirm the proposed transaction 140. More complicated examples are discussed below.

In this example, the submitting node 110 and/or the recipient node 120 can write the confirmed transaction to a ledger 160 according to the order determined by the external node 130. In an example, the ledger can be a data store that can be shared between all nodes. In another example, the ledger 160 can be a distributed ledger where each node maintains a partial or full copy of the ledger, and the submitting 110 and/or the recipient 120 nodes can update their copy of the ledger accordingly. In even other examples, the ledger 160 can be a distributed ledger that exists only in concept and not in reality. Specifically, the ledger 160 can be a distributed "virtual" ledger that is comprised of a plurality of messages exchanged between the nodes of the network concerning transactions submitted over the network and entered into the "virtual" ledger. From the data contained in the plurality of messages, participants associated with nodes in the network can compute the state of the "virtual" ledger at any point in time, and thus their obligations and responsibilities to other participants in the network at that point in time, but a stateful distributed ledger (e.g., similar to Bitcoin or Ethereum) might not exist in reality. Stated differently, only the plurality of messages might be stored by the various nodes of the network and the state of the "virtual" ledger computed based off the content of those messages.

Figure 2A:
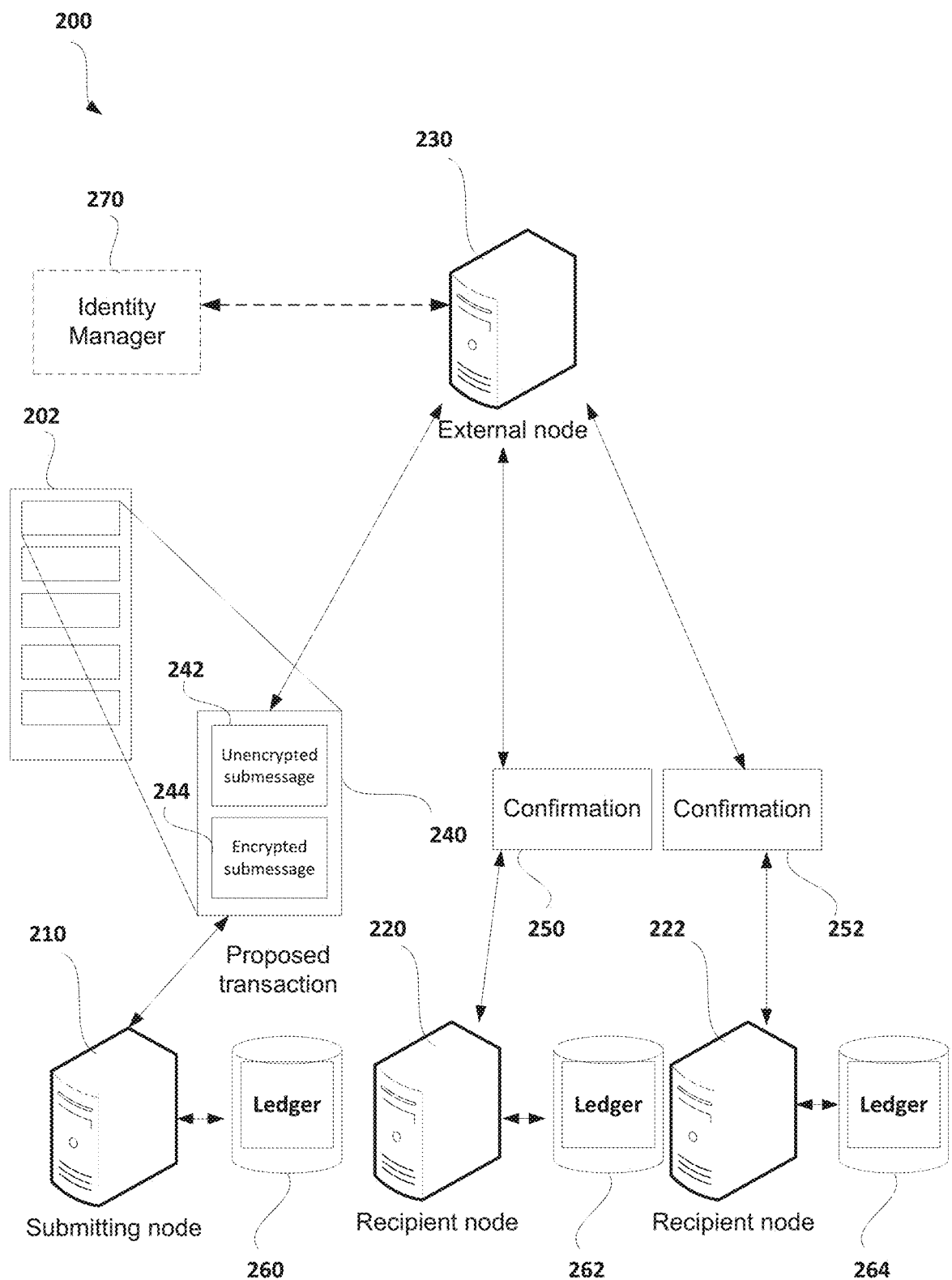
FIG. 2a is a more complex example system for scheduling and validating a multiple-participant process including multiple transactions.
Figure 2B:
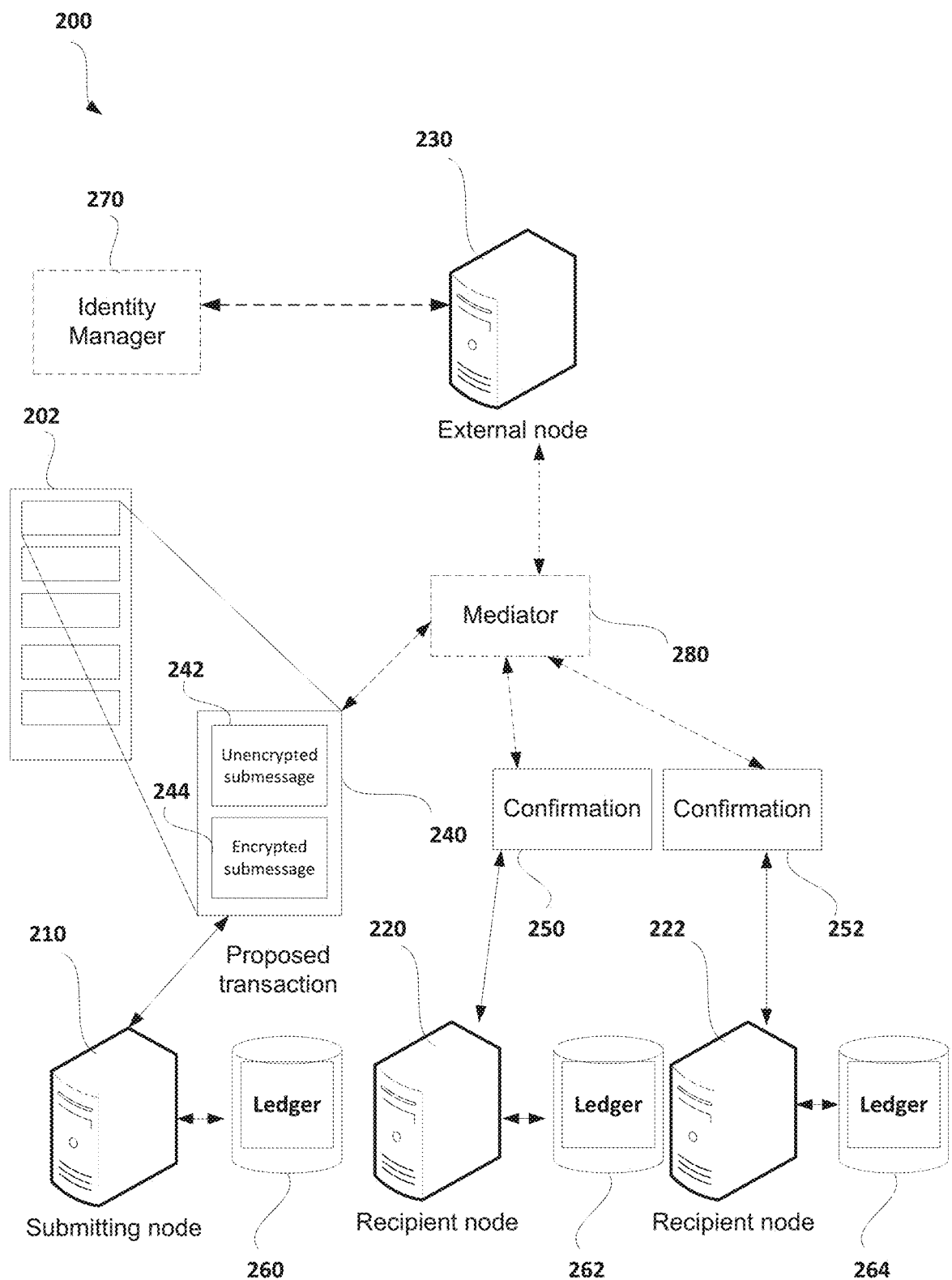
FIG. 2b is the example of FIG. 2a with a mediator node.

FIGS. 2a and 2b show a more complex example system 200. Much like in the example of FIG. 1, the process 102 can be shared across all the nodes. The process can have multiple participants, each of which can be associated with one or more nodes in the network. However, unlike the example of FIG. 1, in this example there are three (3) nodes associated with a participant in the system: a submitting node 210 and two (2) recipient nodes 262, 264. The external node 230, as in the example of FIG. 1, can determine an order of a plurality of messages corresponding to the multiple transactions that makes up the process 102 involving multiple participants. Typically, a process 102 is made up of multiple transactions as described in the other examples in this disclosure; however it is to be understood that a process could involve a single transaction. For clarity, the network has been removed from the illustration but it is noted that a network may be present as in FIG. 1.

Similarly to FIG. 1, the submitting node 210 can submit a proposed transaction 240. Submitting a proposed transaction 240 can comprise sending over the network (not depicted) a partially encrypted message to two (2) recipient nodes 220, 222 associated with a participant in the process 202, wherein the partially encrypted message can comprise at least an unencrypted submessage 242 readable by the external node 230 and an encrypted submessage 244 to preserve privacy from at least the external node 230. In the example of FIG. 2a, the partially encrypted message can be sent to the external node 230, and the external node can determine one or more of the recipient nodes to receive the proposed transaction 240 for confirmation. The external node 230 can then send the partially encrypted message to the appropriate recipient node(s) 220, 222. In some cases, the external node 230 may send the encrypted submessage 244 to the recipient nodes instead of the proposed transaction 240 as a whole, provided the encrypted submessage 244 is relevant to the respective recipient node 220, 222. In another example, the proposed transaction 240 may include a set of multiple partially-encrypted messages (with corresponding unencrypted 242 and encrypted 244 submessages for respective recipients), whereby the submessages (e.g., the encrypted submessages 244) can be divided and distributed to respective recipients nodes 220, 222. This means that part of a proposed transaction 240 can be visible to an authorized recipient node but not to another, unauthorized recipient node, thereby preserving privacy of parts of a transaction that should not be visible to the unauthorized recipient nodes, for those respective parts.

Figure 2C:
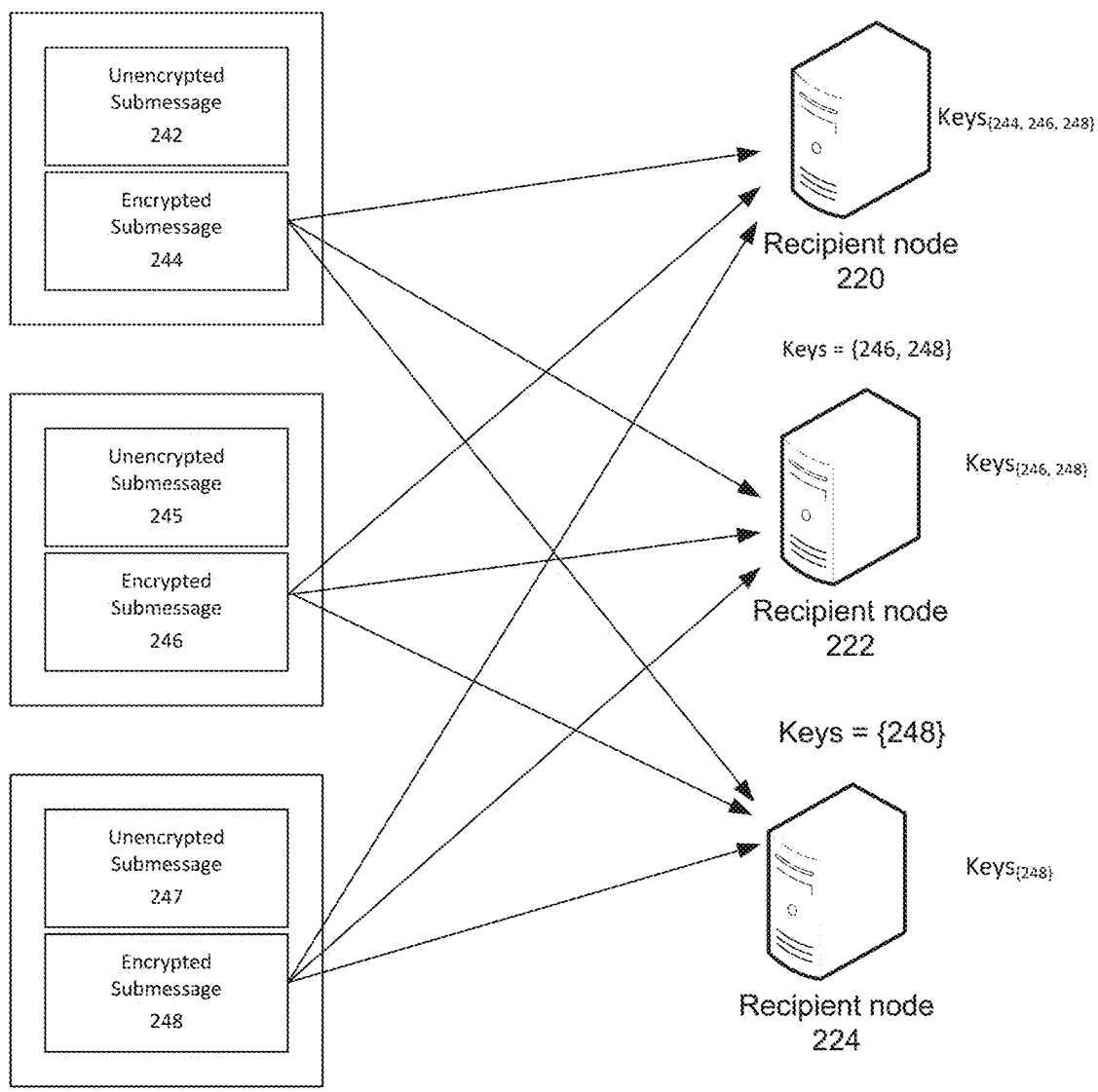
FIG. 2c is an example of distributing submessages to all nodes.

An example of the above is illustrated in FIG. 2c, which depicts a scenario with an additional recipient node 224 where the partially-encrypted messages are divided into submessages 242 to 248 and wherein the encrypted submessages 244, 246, 248 are each distributed to the respective recipient nodes 220, 222, 224. In the example of FIG. 2c, the encrypted submessage 244 can be readable by the first recipient node 220, but not readable by the second recipient node 222 or by the third recipient node 224. That is, even though each recipient node 220, 222, 224 receives each encrypted submessage 244, 246, 248, the content of the encrypted submessage 244 can be read and potentially validated by the first recipient node 220, but not the second recipient node 222 or third recipient node 224. This may occur in many examples where the content of some messages is private to one recipient node, and therefore should not be shared with another recipient node. More nodes than first, second and third recipient nodes 220, 222, 224 may form part of the network and a particular encrypted submessage 244 can be sent and be readable by any subset of recipient nodes entitled to see the encrypted submessage 244, and not sent to or not readable by any subset of recipient nodes not entitled to see the encrypted submessage 244.

Figure 2D:
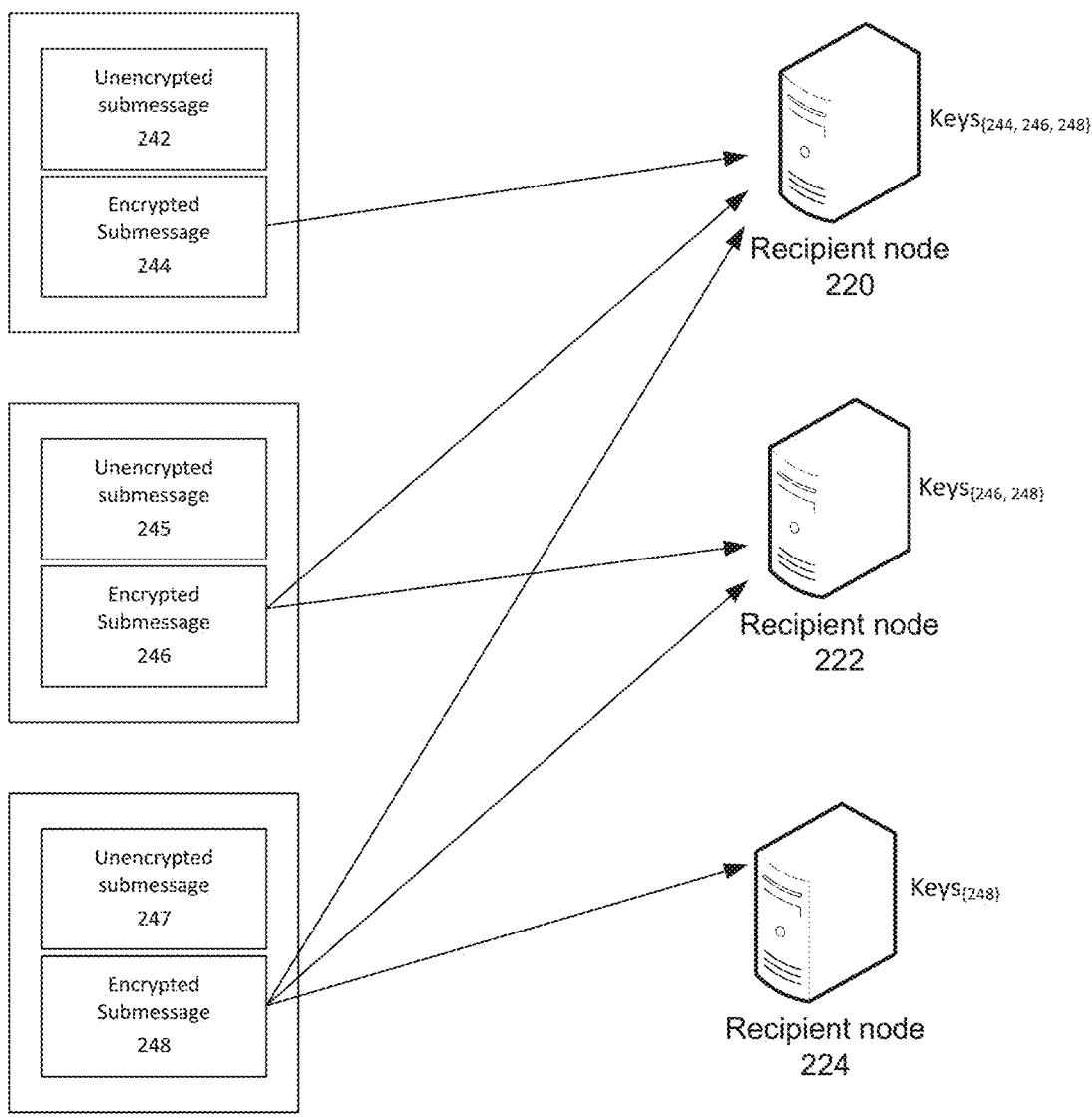
FIG. 2d is an example of distributing submessages to some nodes.

A similar example to that illustrated in FIG. 2c is depicted in the example of FIG. 2d. In the example of FIG. 2d, the encrypted submessage 244 may only be received by the first recipient node 220, but not received by the second recipient node 222 or third recipient node 224. That is, in this example the external node 230 may not forward the encrypted submessage 244 to the second recipient node 222 or third recipient node 224 if it determines that the encrypted submessage 244 is not relevant to the second recipient node 222 or third recipient node 224. This means that the second recipient node 222 cannot decrypt the encrypted submessage 244 even if the node managed to gain unauthorised access to a decryption key because the second recipient node 222 would have never received the encrypted submessage 244 from the external node 230. Similarly the third recipient node 224 cannot decrypt the encrypted submessage 244 because the third recipient node 224 would never have received the encrypted submessage 244 from the external node 230. Likewise, even if the external node 230 mistakenly sent the encrypted submessage 244 to the second recipient node 222 or third recipient node 224, the second recipient node 222 or third recipient node 224, without nefarious behaviour, would not ordinarily have a decryption key to decrypt the encrypted submessage 244. Thus, the system of the present disclosure can preserve privacy amongst nodes to ensure that only nodes entitled to view parts of a proposed transaction 240 are able to do so, even in the case of key or cryptographic algorithm compromise.

In an example, in order to read the encrypted submessage, the first recipient node 220 can have access to a decryption key to decrypt the encrypted submessage 244 provided to the first recipient node 220. In this example, the second recipient node 222 can receive the encrypted submessage 244 as depicted in FIG. 2c but does not have access to a decryption key to decrypt the encrypted submessage 244 addressed to the first recipient node 220 in order to preserve privacy of that particular encrypted submessage 244. Of course, access to decryption keys to decrypt an encrypted submessage 244 can extend to any number or subset of recipient nodes in the network that are entitled to read the particular encrypted submessage 244.

For completeness it is worth noting that in the example of FIG. 2d, the encrypted submessage 246 is distributed to the first and second recipient nodes 220 and 222, and the encrypted submessage 248 is distributed to the first second and third recipient nodes 220, 222 and 224. Similarly then, the first recipient node 220 and second recipient node 222 would need to have access to a decryption key to decrypt the encrypted submessage 246 and the first recipient node 220, second recipient node 224 and third recipient node 226 would need to have access to a decryption key to decrypt the encrypted submessage 246.

Once validity of the proposed transaction 240 is determined by each recipient node 220, 222, each recipient node 220, 222 can send out a message called a confirmation 250, 252, which can be a confirmation of validity of the partially encrypted message from the recipient node 220, 222. In this example, unlike the example in FIG. 1, the confirmations from each recipient node 220, 222 can be sent to the external node 230. The external node 230 can determine the submitting node 210, which may be one of a plurality of nodes, and can send the confirmations to the appropriate submitting node 210. It is possible, in some variations not illustrated, for confirmations to be sent directly from one recipient node to another node. That is, the confirmations can be sent peer-to-peer rather than via an external node or mediator. Peer-to-peer confirmation can be used in conjunction with an external or mediator with appropriate rules for validating transactions.

In an example, the submitting node 210 can accept the proposed transaction 240 as a confirmed transaction, based on receiving a plurality of confirmations: a first confirmation from the recipient node 220, and a second confirmation from the recipient node 222. The confirmation condition in this example is, as in the example of FIG. 1, full confirmation so the transaction can be confirmed. Other alternative confirmation conditions besides full confirmation are discussed in other areas of the disclosure.

Notably, in this example, each of the nodes associated with a participant in the system can have a ledger 260, 262, 264 and update its partial or full copy of the ledger accordingly. For instance, the submitting node 210 can have ledger 260, the first recipient node 220 can have ledger 262 and the second recipient node 222 can have ledger 264. Each node can then write the confirmed transaction to its respective ledger 260, 262, 264 according to the order determined by the external node 230. In some examples, the ledger is a data store that can be shared between all nodes, in which case a privacy model, for example based on segregated data, might be needed to maintain the privacy of each transactions relative to each participant node. In other examples, each ledger is a "virtual" ledger as described above.

Optionally, a variation of the system illustrated in FIG. 2a can be to use a mediator 280, as illustrated in FIG. 2b. In this scenario, the recipient nodes 220, 222 can send a confirmation 250, 252 to a mediator node 280, which can receive the confirmations and determine an aggregate result. The submitting node 210 may also submit the proposed transaction 240 to the mediator 280. In cases with more than two (2) recipient nodes, it could be simpler to count how many recipient nodes confirm the proposed transaction 240 using a mediator node 280. Further, a mediator node 280 can serve as an authoritative record as to whether a confirmation was sent by a particular recipient node 220, 222. In other words, since confirmations may be routed through a mediator node 280, the mediator node 280 can have a record of all confirmations sent using the system, and a recipient node 220, 222 cannot deny having sent or not sent a confirmation. In some examples, the mediator node 280 receives all confirmations, aggregates them, and send them to corresponding participant nodes (so that the participant nodes do not directly interact with one another. This may be advantageous if participant nodes are involved in a transaction that affects another but where at least one participant node needs to preserve privacy with at least another node in the transaction as the latter two do not have direct dealings. That is, in cases where one participant node should not learn that another participant node is involved in the same transaction.

Identity Manager

The identity manager node 170, 270 can offer a number of services, for instance:

a. Membership Management.
b. Pseudonym Management.

For membership management, the identity manager node 170, 270 can allow nodes to join and leave the system (such as the systems defined in FIG. 1, FIG. 2a and FIG. 2b). The systems described previously in FIGS. 1 and 2a-b can also be referred to as a domain, and a single node may be a member of multiple domains. The identity manager node 170, 270 can allow nodes to register, revoke and rotate public keys. The identity manager node 170, 270 can know the participants represented by a given node. It can also define the trust level of each node. For example, the trust level may be strong such as for an operator of a domain (e.g., a settlement system) or weak (e.g., such as for a participant in a settlement system). Alternatively, the trust level may be chosen to be the same for each node. In short, the identity manager node 170, 270 can allow nodes to register, revoke and rotate public keys associated with an identity of the particular node, allowing other nodes in the system to identify the particular node within a domain. The identity of the particular node can be useful in instances such as dispute resolution, as detailed elsewhere in the disclosure.

For pseudonym management, the identity manager node 170, 270 can allow a node to create pseudonymous keys (e.g., keys to sign a message without revealing the identity of the signer). If a privileged participant (such as the external node or a referee node) requests it, the identity manager node 170, 270 can uncloak previously created pseudonymous identities. The pseudonymous identity can be a pseudonymous address, which hides the true identity of the node but, at the same time, can be used by other nodes as an identifier.

When using an identity manager node 170, 270, the recipient nodes 120, 122, 220, 222 do not necessarily learn the identity of the submitting node 110, 210 nor of the other recipient nodes 120, 122, 220, 222. In an example, recipient nodes only learn the identities of other recipient nodes if they are a participant on the same process 202; otherwise recipient nodes might only learn the pseudonym of the other recipient node. The external node 130, 230 may allow message delivery to recipient nodes using a pseudonymous address and can resolve the participant identity of a pseudonym using the identity manager node 170, 270.

External Node

The external node 130, 230 can provide an order to a plurality of messages corresponding to the multiple transactions that make up the process involving multiple participants. In an example, the external node 130, 230 can provide a global total-order multicast (for the domain) where messages are uniquely sequenced, for example via unique time-stamps provided by the external node 130, 230. Therefore, the global ordering can be derived from the timestamps. However, it is to be appreciated that in some examples, the order of the plurality of messages may be based, at least in part, on information in the unencrypted submessage that is other than the time-stamp. In other scenarios, as described elsewhere, the timestamp provided by the external node 130, 230 can be a physical or a logical timestamp.

It is possible in some examples to provide an order for a single transaction. That is, because the external node 130, 230 can provide a global total-order multicast where messages are uniquely sequenced, an order can be established even if other transactions do not yet exist. As an example, a first proposed transaction may be timestamped such that any other transactions or proposed transactions that are yet to be submitted to the external node may be timestamped with a later time. Therefore, in this example, the first proposed transaction can be first (that is, first in time) in the global total order of all the transactions that may exist for a process.

As noted in some of the examples herein, the external node 130, 230 may, instead of delivering a single message, provide fine-grained message delivery. That is, a list of submessages 142, 242, 144, 244 may be delivered to recipient nodes 220, 222. All submessages can receive the same timestamp as the message 140, 240 they are contained in. Notably, each submessage may have a different set of recipient nodes, and each recipient node can receive the submessages in the order derived from the original message 140, 240.

The external node 130, 230 may also provide a proof of submission. That is, the submitting node 110, 210 can receive a proof from the external node 130, 230 on the submission of a proposed transaction 140, 240, or a confirmation 250, 252. The proof can serve as evidence in disputes, which may for example be used in case of missing confirmations. Corresponding to proof of submission, there may be a further need for non-repudiation of messages, such that a node cannot deny having sent a transaction or confirmation. Finally, proof of delivery by the external node 130, 230 can provide recipient nodes with the evidence on the order of messages.

In some examples, the external nodes 130, 230 can provide (or can be required to provide if queried) cryptographic proof of authenticity of every message, or batch of messages, that the external node delivers. These can serve as cryptographic "receipts" sent to the submitting node (or other nodes such as the mediator node 280).

Mediator

A mediator node 280 can form part of the system as shown in FIG. 2b. In a system with a mediator node 280, the mediator node 280 may receive confirmations from recipient nodes and aggregate the confirmations in order to determine whether there is a consensus on validation of the proposed transaction. This means that, in some cases, a mediator node 280 can be used to reduce the total amount of confirmations that are sent across the wider network. In an example, the mediator node 280 can receive a message that sets forth all the expected confirmations that the mediator node 280 should expect to receive for a transaction to be considered accepted/confirmed. The mediator node 280 can compare the confirmations it receives to the confirmations it expects to determine if a transaction should be accepted/confirmed.

Further, a mediator node 280 can be a node that is used where there is a dispute over whether a confirmation was sent or received. Since the mediator node 280 can aggregate all confirmations from recipient nodes, it can serve as an indisputable record that a confirmation was sent by a particular node, or that a confirmation was not sent when it should have been sent, and that the confirmation was appropriately received by all relevant recipient nodes.

When aggregating confirmations, a mediator can take into account the confirmation policy, which can determine the nodes that are required to validate and confirm a proposed transaction, as well as the nodes that can optionally validate and confirm a proposed transaction but may not be required to do so for the proposed transaction to be confirmed. That is, in some confirmation policies, a subset of the recipient nodes may be required to respond with a confirmation. The remaining subset of recipient nodes can be optional validators in that a confirmation that is received from an optional validator can be aggregated as part of determining a consensus on validation of the proposed transaction, but the confirmation may not be required to confirm the proposed transaction and enter it into the ledger. Aggregating confirmations using a mediator node can also have an effect of protecting the identity of nodes involved in the process or proposed transaction. In other words, the mediator node can serve as a proxy to aggregate confirmations and determine if a confirmation condition or policy has been met, without necessarily sharing the identity of the nodes providing a particular confirmation, or even the confirmation message itself.

There may also be more complex confirmation policies. For example, there may be a confirmation policy in a system with multiple nodes where it is mandatory to receive a confirmation from at least a first node, but it is not necessary to receive a confirmation from both nodes. It is to be understood that there are many further variations of confirmation policies that could be implemented.

In some examples, the confirmation policy may specify a quorum for an action based on the number (or set) of confirming parties that approve the transaction (even if some or all of the remaining parties reject the action). In other examples, a VIP confirmation policy gives some participant nodes VIP status that allows them to validate an action on behalf of one or more other stakeholders and/or makes them a mandatory confirming party (further details of VIPs are discussed in under a separate heading).

A confirmation policy may rely on attestation by one or a plurality of nodes, for example via attestation by a cryptographic prover (e.g., zkSNARK, zkSTARK) or trusted execution environment (e.g., Intel SGX)

The submitting node in some cases may submit the proposed transaction via the mediator node 280, which can then receive and aggregate confirmations from the recipient nodes 220, 222. There may be one mediator node or multiple mediator nodes, each with potentially different recipient nodes. Further, not every recipient node needs to be associated with a mediator node. In some cases, for example, a first recipient node may communicate its confirmation as per usual to an external node, submitting node or other recipient nodes, while a further subset of recipient nodes may communicate their conformations via a mediator node. In other cases, it can be required for all nodes in the network to submit confirmations via a mediator node, or multiple interconnected mediator nodes, to ensure that the entire network has a consistent view on confirmations sent or received by the nodes in the network.

The mediator node 280 may store confirmations and other messages received from recipient nodes. This allows for auditability as an auditor can retrieve the confirmations or messages if required to perform an audit. A storage API can allow an auditor to retrieve received messages from the storage. The storage API can inform the auditor whether a result message has been sent for a particular transaction or proposed transaction.

Domain messaging API and Properties

A domain messaging API is exposed to each participant node and system entities in that domain (e.g., submitting node 110, recipient node 120, etc.). A non-limiting example will now be described where the domain messaging API has a single command to "Send" a message and three event types, namely "Receipt", "Deliver" and "Heartbeat".

the command Send(messageId, b, b, Sig(b, $sk_{sender}$)) where messageId is a message identifier. b is a batch, a list of n tuples ($m_i$, $recipients_i$), where $m_i$ is a message, and $recipients_i$ is the list of recipients of $m_i$, for 0<=i<n. The batch b must be signed by the sending participant's secret key $sk_{sender}$. The send command can be used to send messages in batches so that multiple messages (with different recipients) under the same timestamp.

the event Receipt(messageId, ts, proof(sender, messageId, ts, b)), where messageId is a message identifier, ts is a timestamp, sender the node's identifier, and b a hatch. The receipt event provides the recipients with cryptographic evidence of the messages that they have submitted. The proof may include a signature.

the event Deliver(ctr, ts, b', proof(recipient, ctr, ts, b')), with ctr a monotonically increasing counter for each recipient, ts a timestamp defining the order, b' a message batch, and proof a cryptographic proof of delivery, which includes the identity of the recipient. Intuitively, the node learns all messages addressed to it, as well as the other recipients of each message (this is possible since b is a batch).

the event Heartbeat(ctr, ts, proof(recipient, ctr, ts)), with ctr a non-decreasing counter, ts a timestamp and proof a cryptographic proof of heartbeat emittance.

In some examples, it is desirable that the domain messaging API for the nodes have one or more, or in some cases all, of the following properties:

Reliable delivery: All messages are eventually delivered to all their recipients. If Send(messageId, b, Sig(b, $sk_{sender}$)) is invoked by a correctly functioning node sender, then there exists a ts and ctr such that a Deliver(ctr, ts, b', proof(p, ctr, ts, b')) event is eventually triggered at each node p in the recipients set the union of all elements from $recipients_i$ with:

$b' = [(m, recipients) \in b | p \in recipients]$

No creation: For every Deliver(ctr, ts, b', proof(p, ctr, ts, b') triggered at a node p, some node previously invoked Send(messageId, b, Sig(b, $sk_{sender}$)) with some messageId such that $b' = [(m, recipients) \in b | p \in recipients]$ Moreover, the induced mapping of Deliver onto Submit events is infective (i.e., there are no more Deliver events than corresponding Submit events). Note that this property can be verified due to the signature that is required for the Send command. Thus, the sender cannot repudiate sending the message.

In-order delivery: If Deliver(ctr, ts, -, -) is triggered at a node, then exactly one of the following holds:
ctr=0 and no earlier Deliver or Heartbeat event has been triggered at this node.
ctr equals ctr'+1 where ctr' is the counter of the predecessor Deliver or Heartbeat event.

Moreover, ts must be larger than the ts of any earlier Deliver or Heartbeat event. The timestamp ordering together with batch-internal ordering provides a global total order. This, together with the cryptographic proofs, ensures that messages cannot be retroactively inserted in the message stream, and omitted messages can be detected by a recipient.

Agreement: If Deliver(ctr, ts, b, proof(p1, ctr, ts, b)) and Deliver(ctr', ts, b', proof(p2, ctr', ts, b')) are triggered at node p1 and p2 respectively, then filter bothReceive b=filter bothReceive b' where bothReceive(m,recipients)=[p1,p2]⊆recipients

Genuine delivery proofs: No-one can generate proof(p, ctr, ts, b) unless Deliver(ctr, ts, b, proof(p, ctr, ts, b)) has previously been triggered at the node p. In practice, this is achieved by using signatures for the proofs.

Proof of submission: If Send(messageId, b, Sig(b, $sk_{sender}$)) is invoked by the node sender, and the sender does not crash, then there exist a ts such that a Receipt (messageId, ts, proof(sender, messageId, ts, b)) is eventually triggered at the sender. The timestamp ts must be the same timestamp as for the Deliver events that correspond to the Send.

Causality: If Send(messageId, b, -) is invoked by a correctly functioning node sender, then the timestamp ts in the receipt Receipt(messageId, ts, _) must be strictly greater than the timestamp in any earlier Deliver or Heartbeat event triggered at the sender node.

Regular heartbeats: At regular intervals, either a Deliver or a Heartbeat event is triggered at each participant 110, 120.

In-order heartbeats: Whenever a Heartbeat(ctr, ts, proof (ctr, ts)) event is triggered at a participant, then exactly one of the following holds:
ctr=0 and no earlier Deliver or Heartbeat event has ever been triggered at this participant.
ctr equals ctr'+1 where ctr' is the counter of the predecessor Heartbeat or Deliver event.

Furthermore, ts must be larger than the ts of any earlier Deliver or Heartbeat event. Increasing the counter on heartbeat events ensures that every counter maps to exactly one timestamp.

Proposed Transaction

A submitting node 110 can submit a transaction by submitting a proposed transaction. Generally, a transaction protocol will require that the submitting node specify the parties who need to be informed about the action/transaction (i.e., declared stakeholders). The proposed transaction can be addressed to other recipient nodes (it may also address other aspects of the system such as a capacity monitor, a fee or resource accounting unit, an external node, mediator, etc.). The information in the proposed transaction can include an unencrypted submessage and an encrypted submessage. The encrypted submessage can include, in encrypted form, the actual payload that describes the transaction to its stakeholders (e.g., the recipient nodes affected by the proposed transaction).

In some examples, the transaction protocol requires the submitting node 110 to specify information of the submitting node. This may include requiring the submitting node 110 to sign the transaction, and/or parts of the proposed transaction. In some examples, this may require the submitting node's signature for every top-level action of the transaction. In other examples, this includes the submitting node 110 signing and forwarding the signature to the affected stakeholders.

Figure 3:
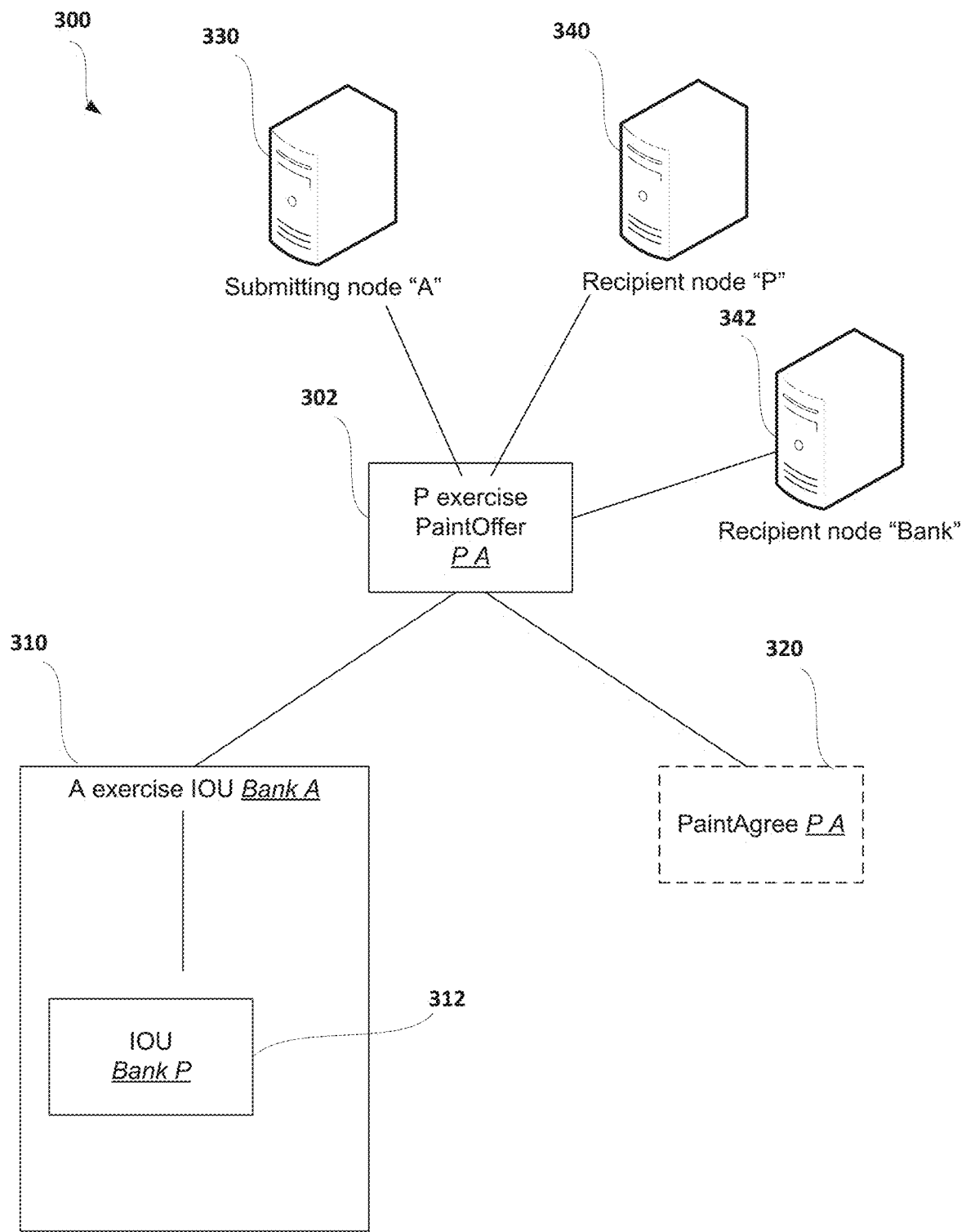
FIG. 3 is an illustration of an example proposed transaction.

FIG. 3 illustrates an example 300 of a proposed transaction 302. In the example, participant A 330 wants the participant P (a painter) 340 to paint participant A's house, and is willing to pay for this using an IOU participant A holds from a bank 342. Participant A makes participant P an offer with a PaintOffer process 302.

In the context of this example, the system performs a number of actions. The first is the action to create a contract that defines the proposed transaction (and recording the definition in the ledger). The second type of action is to exercise actions on the contract, which can include multiple actions in the transaction. For example, acceptance of the contract by a participant is a top level action that results in a number of subactions 310 (which in themselves can be considered actions). This can include, for example, exercising transfer of value from Participant A's IOU with the Bank, and another action includes creating a new IOU for the benefit of Participant P. From a system perspective, such actions must be (i) approved by the transaction protocol for that action; and (ii) conforms to the underlying system model—so that the action can be validly recorded on the ledger.

In the root of the transaction, participant P 340 exercises its choice on the paint offer; this in turn can cause participant A 330 to exercise its transfer choice on the IOU 310, creating a new IOU 312 to the benefit of participant P, backed by the same bank 342. Simultaneously, an agreement is created whereby participant P agrees to paint participant A's house 320. Exercising a choice, in the context of the disclosure, can mean that a node executes a code segment(s) on a smart contract that the node is entitled to execute. Thus, for instance, in the above example participant P 340 can exercise its choice to accept the paint offer by executing a code segment(s) within a PaintOffer smart contract that records participant P's acceptance of the paint offer. Further details concerning the exercise of choices and/or smart contracts that can be usable with the system of the present disclosure can be found in U.S. Patent Pub. No. 2017/0316391, WO 2017/189027, WO 2017/187394 (all of which claim priority from U.S. 62/329,888), and Australian Patent No. 2019200933, WO 2019/082142 (both of which claim priority from AU 2017904367), each of which is incorporated herein by reference in its entirety.

The respective nodes 330, 340, 342 may need to learn only the transaction parts that affect the contracts on which the node is a stakeholder. Since the entire transaction results from an exercise of the PaintOffer, its stakeholders (participant A and participant P) might need to learn the whole transaction. Conversely, the bank and participant A might need to learn only about the IOU transfer 310, and participant P might need to learn only about the produced IOU 312. This can lead to a decomposition of the different parts of the transaction, as depicted in FIG. 3.

For integrity, it might suffice if the proposed transaction was sent to all of its stakeholders. However, this is insufficient for privacy. Fortunately, not all stakeholders need full visibility into the entire transaction; their views only need to disclose sufficient information to ensure integrity and synchronization between parties.

Each solid rectangle in FIG. 3 represents the scope of the privacy (with relevant parties noted in italics and underline) for that part of the transaction. Note that there is no separate solid rectangle for PaintAgree 320; as participants A and P already learn about the PaintOffer exercise, they need not learn about the creation of PaintAgree 320 separately, as this can be implicitly deduced.

The situation can, however, be different for the newly created IOU 312. The bank 342 should not learn anything about the context of the transfer of rectangle 302. In particular, the bank 342 cannot assume and should not learn that participant P 340 was a participant in any of the other contracts in the transaction. This is why a separate solid rectangle 312 exists that is shared between Bank 342 and participant P 340, even though both Bank 342 and participant P 340 already learn, at least in part, the contents of that solid rectangle 312 by knowing the outer rectangle 310. The Bank 342 should not be aware of what the other rectangles 302 or 320 is (that is, what A is paying for), or who the stakeholders of it are.

Transactions

One of ordinary skill will recognize that a transaction, as used in this disclosure, may have a tree-like structure. A transaction may have stakeholders and/or observers, and accordingly the parts of this tree-like structure (e.g., sub-trees) that are visible to different stakeholders may change. Within their physical transport storage form, these transaction sub-trees are referred as sub-views. In an example, each recipient node 120, 122, 220, 222 obtains only the part of the transaction it is entitled to see, semantically as subset of a transaction sub-tree, and physically as a subset of sub-views of the transported transaction message.

A transaction such as shown in FIG. 3 (as transaction 302) can be atomic in nature. In other words, it can complete or fail as a unit. Since parties in general can have visibility only into parts of a transaction, a participant might not be able to decide the transaction's validity or acceptance on its own. Moreover, in an example this determination cannot be made even by participants who do see the entire transaction, due to the way in which it is intended that validity of a transaction may be delegated. For example, while a node of participant P 340 can see the entire transaction above, it is not a participant to the IOU 310 that the Bank 342 issued to the node of participant A 330. In order to assess the transaction's validity or acceptance, the node of participant P 340 might require a confirmation from the Bank 342.

Unencrypted Submessage

A proposed transaction, such as 240 in FIG. 2a and FIG. 2b, can contain an unencrypted submessage 242. The unencrypted submessage can include information about the proposed transaction 240 that is available publicly or to all participants in the transaction process and, in general, might not contain information that is private to any one of the participants. For example, the unencrypted submessage can include the transaction time or may include the choice of branch version of the (implicit or explicit, possibly concurrent) physical-temporal rules agreed among the stakeholders of the ledger (e.g., which capacity or sharding model can be used). In general, such information can be publicly available information about the transaction.

In some examples, the external node provides the transaction time in the unencrypted submessage by providing a timestamp. In other examples, the submitting node may propose a transaction time based on a timestamp provided by the submitting node. A transaction time may be simply a timestamp or a digital record of the time that the external node 230 received the proposed transaction 240. The timestamp can give the date and time of day, a universal time, or any measure of time that is accurate to fractions of a second, which can assist with ordering the transactions even where transactions have been sent to the external node almost simultaneously.

In an example, the timestamp might not be a physical timestamp designating when the external node 230 received the proposed transaction 240, but it could be a logical timestamp. A logical timestamp can be a combination of a physical timestamp by which the external node 230 received the proposed transaction 240 along with some logical time offset. For instance, the logical timestamp can be a combination of the physical timestamp designating the time the external node 230 received the proposed transaction 240 plus some logical time offset, thereby making the logical timestamp later than the physical timestamp. In an example, the logical time offset can be provided by the submitting node 210 that submits the proposed transaction 240. Thus, the concatenation of the physical timestamp provided by the external node 230 and the logical time offset provided by the submitting node 210 can, in some cases, form the logical timestamp. In other cases, the external node 230 or another node in the network can provide the logical time offset.

Allowing the submitting node 210 to provide the logical time offset may, to some extent, allow the submitting node 210 to control a confirmation response deadline by which the recipient nodes 220, 222 must send a confirmation for a proposed transaction 240, and/or somewhat control the ordering of the proposed transaction 240 relative to other transactions. For instance, in an example, the system of the disclosure can provide a confirmation response deadline by which a relevant recipient node 220, 222 must send a confirmation of a proposed transaction 240 for it to be confirmed and entered into the ledger. The confirmation response deadline can be calculated with reference to the logical timestamp. For instance, the confirmation response deadline may be calculated by adding some preset time period to the proposed transaction 240's logical timestamp. By permitting the submitting node 210 to provide the logical time offset, the system can allow the submitting node 210 to somewhat set the logical timestamp of the proposed transaction 240, which can affect the confirmation response deadline. Merely as an example, the submitting node 210 can therefore tailor its confirmation response deadline by altering the logical time offset, such that relevant recipient nodes 220, 222 can meet the confirmation response deadline and not fail to send a confirmation within the appropriate deadline. For instance, if the submitting node 210 determines recipient nodes 220, 222 might need a larger amount of time to confirm a particular proposed transaction 240, it can provide a generous logical time offset so as to set the logical timestamp of the proposed transaction 240 somewhat later than the physical timestamp provided by the external node 230. The converse example is also possible.

In addition, the logical timestamp can, in an example, serve as the definitive transaction time for the proposed transaction 240, which can affect the ordering of the proposed transaction 240 relative to other transactions. In other words, a global total order of transactions, including the proposed transaction 240, can be determined by examining the logical timestamp of all transactions and ordering such transactions in time using the logical timestamps. As such, by providing the logical time offset, the submitting node 210 can also somewhat dictate, within reasonable boundaries, the ordering of the proposed transaction 240 relative to other transactions. Specifically, if the submitting node 210 is concerned about priority of a proposed transaction 240, it can set the logical time offset to be relatively short, thereby ensuring that the proposed transaction 240 receives the best logical timestamp and has a possibility of achieving priority in the global total order of transactions.

In some cases, a transaction time can be given which changes the order of transactions, including the proposed transaction 240. Such reordering is sometimes referred to as a logical reordering herein since the reordering can be based on the logical timestamp of a transaction. With logical reordering, a proposed transaction 240 may be given a logical timestamp that, in certain examples, is based on the physical timestamp by the external node 230 and a logical time offset, as explained above. In some cases, the logical time offset can be considered as the difference between physical and logical timestamps. The logical time offset can be selected so that it is not too large or too small in light of the following considerations. If the logical time offset is large, the proposed transaction 240 might be prone to front-running. That is, merely as an example, after a transaction $tx_1$ has been submitted and receives a logical timestamp (e.g., somewhat dictated by the submitting node 210), another participant node in the network may later submit a conflicting proposed transaction $tx_2$ that receives an earlier logical timestamp (e.g., due to the logical time offset provided by such participant node). If the later proposed transaction $tx_2$ is confirmed and entered into the ledger, then $tx_1$ might be rejected since it conflicts with tx2, even though $tx_1$, according to its physical timestamp, came first. Thus, practically submitting nodes may find that it is within their interest to set the logical time offset to be the shortest possible given other nodes' resource bounds and the time required to validate a transaction so that the submitting node's proposed transaction is confirmed and entered into the ledger without another conflicting transaction "jumping the queue".

Alternatively, if the later proposed transaction $tx_2$ is rejected after a confirmation response deadline of the earlier transaction $tx_1$, then $tx_1$ might be rejected as well since the confirmation response deadline for $tx_1$ has already passed. In this scenario, ultimately both transactions would be rejected. Conversely, if the logical time offset is small, recipient nodes may be unable to send confirmations by the confirmation response deadline simply due to computational or network constraints. Consequently, the transaction might be rejected if the logical time offset is set too small.

In yet another scenario, a proposed transaction $tx_1$ might be submitted by a submitting node, assigned a logical timestamp, confirmed by relevant recipient nodes and entered into the ledger. A subsequent proposed transaction $tx_2$ could be submitted by the same or another submitting node, assigned a logical timestamp that is earlier than $tx_1$'s logical timestamp, confirmed by relevant recipient nodes and entered into the ledger. Since $tx_2$'s transaction time (e.g., logical timestamp) is earlier than $tx_1$'s transaction time (e.g., logical timestamp), a logical reordering can occur that gives priority to $tx_2$ over $tx_1$ in the global total order of transactions even though $tx_1$ was submitted first.

Encryption

The encrypted submessage may be encrypted with symmetric encryption or asymmetric encryption or both. Asymmetric cryptography utilises multiple keys, a public key and a private key to encrypt and decrypt data. Any suitable encryption method may be used, for example RSA or elliptic curve cryptography may be used.

For encryption, the following operations might be available:

- A deterministic asymmetric encryption scheme $E_{pub}$ (pk, m), which encrypts an arbitrary message m with the given public key pk (e.g., referred to as public-key encryption).
- A symmetric authenticated encryption scheme $E_{sym}$ (symk, m), which encrypts an arbitrary message m with the given symmetric key symk. The authentication can protect against potential modifications by the external node 230 (referred to as symmetric encryption).
- A pseudonym derivation scheme pseudonym(participant, token), which derives the pseudonym of the given participant with the given token.

Encrypted Submessage

To prepare the encrypted submessage 144, 244, the submitting node 110, 210 can first obtain a secret token $tok_a$ (in an example from the identity manager 170) and prepare a new nonce $key_a$ for each action "a". Let $stkh_a$ denote the stakeholders of an action a. $Subs_a$ is the list of sub-views of a (including a itself) obtained by an in-order traversal of a.

The encrypted submessage for action a, in an example, can then be derived as follows:

1. The encrypted action is $E_{sym}$ ($key_a$, (bound(a), desc (a))), where bound is a function that expresses the optional pre-stated shared physical-temporal constraints to which the affected stakeholders will bind themselves. For example, bound can estimate the resource consumptions of the action a (provided by a resource model) and desc(a) can be some complete means of describing a (e.g., a model expression or an eval trace, together with the divulged inputs).
2. Let keys be the list of keys associated to sub-views of a ([key a'|a'←$subs_a$], to be read as "list of keys that decrypt sub-views"). Then, the keys are protected for storage and transport in the form of wrapped keys as the list of public encryption of the keys list, with an entry per transaction stakeholder ([$E_{pub}$ (pk(stkh), keys) |stkh←$stkh_a$]). Stated differently, this portion of the encrypted submessage can, for example, be an encrypted list of public keys corresponding to each stakeholder to a transaction, with the corresponding private key known to the relevant stakeholder (e.g., permitting the stakeholder to decrypt the encrypted submessage).
3. The tokens that are used to generate the pseudonyms of the expected confirmers of that action are [$tok_{a'}$|a'←$subs_a$]. Stated differently, this portion of the encrypted submessage can, for example, include a list of tokens, from which can be derived the pseudonyms (e.g., a hexadecimal address) of each of the expected confirmers that need to confirm a particular action. Such information, for example, can be useful to allow a node in the network (e.g., external node 230) to determine which nodes in the network need to confirm a particular action.

The encrypted submessage containing a proposed transaction payload can thus be described by the data type (written here in Haskell, but implementable in a number of other languages):

```
type RequestPayload = {
    metadata :: RequestMetadata
    , stakeholders :: [Pseudonym]
    , descriptions :: [(EncryptedActionDescription, [Participant])]
}
```

Expected Confirmations

Given that, for each proposed transaction (e.g., proposed transaction 240 in FIGS. 2a-b), there are confirmations that might be required to accept/confirm the proposed transaction, and a node may make a determination of the confirmations it should expect to receive for a transaction. An expected confirmation can be a necessary positive response from a participant node in the process for a proposed transaction to be accepted/confirmed and entered into the ledger. In some embodiments, each node can determine which nodes are required to provide a confirmation (e.g., according to the view of transaction scope of that particular node). That is, a node 210, 220, 222 can assess which of the recipient nodes 220, 222 are required to provide a confirmation in order to accept or confirm the proposed transaction 240. For example, a submitting node 210 that submits a proposed transaction 240 with a confirmation condition of full confirmation can determine that the expected confirmations are from all participant nodes in the process and that all confirmations have been received.

In some examples, the protocol can specify a confirmation policy. In other examples, the confirmation policy (that may include confirmation conditions explained under a separate heading) is specified at least in part in proposed transaction by the submitting node.

The expected confirmations can be determined in whole or in part. That is, in some cases, a node can make a determination as to what expected confirmations are required for the visible part of the transaction the node is entitled to view rather than the transaction as a whole. In this case, a node may determine that a part of the transaction is accepted/confirmed based on the confirmations the node has received for the portion of the transaction that the node is entitled to view.

In an example, a proposed transaction 240 can include information (such as expected confirmation data) in the encrypted submessage 244 that describes all the valid expected confirmations. Such information can be used to validate the received confirmations, which can include using cryptographic functions to validate the received confirmations with the expected confirmation data. In some examples, the expected confirmations can be in the form of public keys and hashes of the parts of the transaction that these keys are required to sign. If an identity manager 270 is being used, the keys may be pseudonyms of known keys, and the hashes may be salted to protect the participant nodes' privacy. The expected confirmations for the entire transaction can be thus given by the following data type (written in Haskell):

type ExpectedConfirmations=[([Pseudonym], SaltedHash ActionDescription)]

Further Characteristics of the System

In some examples, in order to ensure that confirmations 150, 152, 250, 252 occur in a timely manner, the concept of timeouts are used. For instance, if a transaction's validity cannot be determined after a timeout parameter, which may be defined by the domain rules (see below), the transaction can be rejected.

Further, in some examples, nodes make and announce physical or temporal transaction promises, such as transaction capacity promises (e.g., computation and size needed), or structural usage promises (e.g., aligned with storage sharding model). Typically, this might be done by the submitting node when submitting a proposed transaction. The promises can be per process, providing per-process and per-counterparty guarantees. The physical or temporal transaction requirements may extend the transaction timeout.

If there are unresponsive nodes, then the nodes can be marked as such. This disclosure can utilise dispute resolution mechanisms to disincentivize unresponsiveness and not upholding capacity promises.

Determining Validity

A node can perform a number of checks to determine validity of a transaction. Examples of transaction validity checks are as follows:

a. Conflicts
  i. This check involves determining if there are any previous transactions that have already consumed the relevant contract (e.g., DAML contract) or input(s) that forms part of the process.

b. Authorization
   i. This check involves determining the submitting node is allowed to submit that transaction based on authorization rules.
c. Conformance
   i. This involves determining if the transaction is well-formed according to conformance rules.
d. Time constraints
   i. This involves determining if the transaction time satisfies the time constraints.
e. Physical-temporal constraints
   i. This involves determining if the physical or temporal transaction promises satisfies the choice of branch version of the physical-temporal requirement rules agreed among the stakeholders of the ledger (e.g. which capacity or sharding model can be used).
f. Resource checks
   i. This involves checking if the transaction resource requirements were accurately specified. For instance, the node can read the transaction resource requirements specified as part of the transaction, and then the node can execute the transaction if the resources used by the node are within the specified resource requirements. In an example, the node can fail a transaction if the resources it uses to execute a transaction are above the specified resource requirements. This can have the positive benefit of preventing nodes in the network from submitting transactions that are outside of the resource requirements specified by the node without consequence.

Conflicts

One of the checks that a node 110, 120, 122, 210, 220, 222 can perform is to determine if the proposed transaction 140, 240 conflicts with a previous proposed transaction or previous confirmed transaction. Such conflicts are inherent in the concurrent nature of the system, and need not arise due to intentional bad behaviour (malice) or operational problems. A conflict may include whether the contract (e.g., DAML contract) or input(s) that is part of a process has been previously consumed by one or more transactions.

In some examples, one of the checks a node 110, 120, 122, 210, 220, 222 can perform is to determine if the proposed transaction 140, 240 conflicts with a current or upcoming proposed transaction, or a transaction that is currently being validated or will be validated in the near future. Such conflicts are inherent in the concurrent nature of the system where non-uniform physical implementation choices can be made (e.g. sharding), or with out-of-order transaction logic (e.g., for large transactions, such as batch-like activity), or in general for all cache or lock-like ledger support logic (e.g., maintained for optimization purposes or to support additional ledger features), and need not arise due to intentional bad behaviour (malice) or operational problems. A conflict may include whether a contract (e.g., DAML contract) has been previously initiated for consumption by one or more transactions.

Authorization

Another check that a node 110, 120, 122, 210, 220, 222 can perform is to determine if the proposed transaction 140, 240 was well-authorized. This includes determining if the submitting node is authorized by the state and rules of the ledger to submit the transaction.

Conformance Rules

Another check that a node 110, 120, 122, 210, 220, 222 can perform is to determine if the proposed transaction 140, 240 was well-formed with regards to each node's ledger conformance rules. Determining a proposed transaction was well-formed may include determining if the proposed transaction conforms to a set of conformance rules for that proposed transaction. This may include, for example, determining if the proposed transaction adhered to a specified format or to specific ledger workflows or if the proposed transaction contained all the necessary data. One of the rules may include whether the proposed transaction was authorized. This may also include, for example, determining if the physical-temporal requirements (discussed in further detail below) of the proposed transaction adhere to rules previously defined or agreed by the stakeholders. Therefore, the request may be considered to be malformed (also known as ill-formed) in some way if it fails the conformance (e.g., inappropriately executed ledger workflow choices or physical-temporal requirements) or authorization (e.g., node's ledger workflow does not allow the proposed transaction's submitter to submit the transaction) criteria. This generally only occurs due to malice or correctness problems of the platform components (e.g., software bugs) at the participants.

A specific case of conformance may be adherence to a program or script defined in a smart-contract language (e.g., DAML).

Time Constraints

A further check that a node may perform is to determine the transaction time and whether it is within time constraints. For example, the node may determine if the transaction time in the proposed transaction is too far away from the external node's timestamp on the proposed transaction. With the transaction expected resource consumption added to a proposed transaction, the allowed window for the deviation can be resource-consumption-dependent, as the submitter might need to process the transaction before submitting it. That is, it can be defined within the domain rules as a factor over the stated expected resource consumption.

Stated differently, determining validity of a proposed transaction may include determining if the current time is within a timeout window of the proposed transaction's transaction time (e.g., if the current time is greater than the proposed transaction's transaction time plus some preset time value). The transaction time, in an example, can be considered as the logical timestamp, which can be provided with the unencrypted submessage of the transaction. A node validating a proposed transaction can compare the current time to the proposed transaction's transaction time and determine if the current time is within the timeout window (e.g., if the current time is prior to a confirmation response deadline). If so, the node can proceed to process the proposed transaction and send a confirmation response accordingly, if other validity checks also pass. If the current time is after the timeout window, the node can fail the transaction.

Physical-Temporal Constraints

An additional check that a node may perform is to determine whether the physical or temporal transaction promises satisfy the branch version of the physical-temporal requirement rules agreed among the stakeholders of the transaction or domain. For example, the node may determine that the transaction cost calculation is not compatible with the specified physical-temporal requirement rules. For example, the submitter node may express the rules it is using to tie the proposed logical time to the stated resource consumption of the transaction, or the submitter may express how the utilized sharding model is tied to a choice of multiple instances of the external node and mediator node.

Confirmation Condition

To offer a trade-off between trust, integrity, and availability, the system can allow for different confirmation conditions. As explained in more detail below, a confirmation condition can be a confirmation threshold sufficient to determine a transaction is accepted or confirmed and can be entered into the ledger.

A confirmation condition can be a restraint or prerequisite for the proposed transaction to be accepted or confirmed and appropriately entered into the ledger. The confirmation condition can relate to receiving one or more confirmations (e.g., a threshold amount of confirmations) from the recipient nodes.

There can be many types of confirmation conditions and the appropriate confirmation condition to be used can depend on the parties involved, the process and potentially even considerations such as network conditions. For example, if network conditions are good then a full confirmation condition may be required, but if there is traffic congestion on the network then an optimistic confirmation condition may be satisfactory until the network improves.

Using a full confirmation condition, it can be a requirement that a confirmation is received from each recipient node corresponding to a participant in the process.

Using a signatory confirmation condition, it can be a requirement that a confirmation is received from each recipient node corresponding to a signatory participant in the process.

Using an optimistic confirmation condition, it can be a requirement that the recent stream of confirmations meet a specified criteria. For example, that a specified amount of confirmations are received by relevant nodes within an allocated period of time.

Using a "VIP" confirmation condition, the confirmation criteria can depend on properties of the recipient nodes. For example, a VIP confirmation condition may dictate that confirmations are received from a specified subset of recipient nodes (e.g., designated as VIP nodes) corresponding to a participant in the process. That is, there may be some nodes that must provide a confirmation and other nodes that do not necessarily need to provide a confirmation, which can be reflected in the confirmation condition.

A "VIP" confirmation may be implemented by an attestation of a cryptographic prover (e.g., zkSNARK, zkSTARK) or a trusted execution environment (e.g., Intel SGX). Stated differently, in an example a node in the network can act as an attestor (e.g., when a VIP confirmation policy is used), which can attest to other nodes that are parties to a proposed transaction that the proposed transaction satisfies all validity checks as described herein (e.g., described in paragraph [134] above). In an example, the attestor node can provide a cryptographic proof (e.g., zkSNARK, zkSTARK) to the parties of a proposed transaction that cryptographically proves the proposed transaction satisfies all validity checks and can be accepted as a confirmed transaction. The cryptographic proof can be, as described above, a zero-knowledge type proof that can be provided to all parties to a proposed transaction so that all parties can have confidence in the proposed transaction's validity, but also not have access to private details about the proposed transaction that the relevant party normally would not have access to. Similarly, a trusted execution environment like Intel SGX can be used alongside or instead of a cryptographic prover.

Typically, in a domain where nodes can be trusted to act without maliciousness (that is, intentional bad behaviour), an optimistic confirmation condition might suffice to ensure transaction acceptance. That is, for efficiency it can be presumed that nodes act without malice and none of the recipient nodes are malicious. However, maliciousness can still be detected and proven. In some cases, ramifications of malicious behaviour may be handled outside of the system.

In some examples, the confirmation condition(s) can also require that a response to a proposed transaction (which can be considered a confirmation of validity request) be received by the submitting node (and/or sent by the recipient node) in a timely manner. This includes having timeout and deadlines discussed in further examples below.

Domain Rules

Domain rules are a set of rules to which all participants of a domain have agreed. The domain rules may govern the dispute resolution process, or outcome such as a punishment.

For instance, if a node 120, 122, 220, 222 is not sending confirmations within a specified timeframe, that node may be punished by being temporarily excluded from the network or by using some other punishment. In some cases, good behaviour may need to be established before being given complete access to the network again. For example, a node 120, 122, 220, 222 may be temporarily excluded from the network and be unable to submit transactions, and then allowed to be in a "confirm-only" mode until a sequence of on-time confirmations are received by the punished node.

Rejecting a Transaction

A proposed transaction 140, 240 can be rejected for a number of reasons. One ground of rejection may be that the proposed transaction 140, 240 has multiple domains without signifying as such, meaning that the proposed transaction 140, 240 tried to use processes 102, 202 or contracts (e.g., DAML contracts) residing on different domains without indicating that the proposed transaction 140, 240 is a multi-domain transaction. In some cases this may be allowed, but a general rule can be that a proposed transaction 140, 240 should have a single domain.

In an example, the domain rules establish the confirmation condition. In this case, it is possible that insufficient confirmations are received within the timeout window to declare the transaction as finally accepted according to the domain rules.

Another reason to reject a proposed transaction 140, 240 can be that the proposed transaction 140, 240 is inconsistent with one or more other transactions; that is, it conflicts with an earlier accepted/confirmed transaction.

In some examples, the transaction protocol requires all stakeholders to be informed on whether a transaction is approved and conversely if a transaction is rejected. In some examples, the protocol requires that the declared stakeholders of the transaction to be informed of the reason for the decision.

Any node can raise a dispute, which could result in marking the offending node as offline. However, raising an invalid dispute can also subject a node to punishment. So, if a dispute has been raised, the proposed transaction can be rejected as well. This may happen if a recipient node determines that the proposed transaction is not well-formed, or if different nodes give conflicting responses on the validity of the same transaction part. Both of these can, in an example, occur due to malice or software bugs. That is, in most cases, the nodes can be expected to act properly.

Confirmation Heartbeats

Each pair of participants who share active contracts 102, 202 (or processes) that make up transactions occasionally exchange signed statements over those contracts, which are referred to herein as confirmation heartbeats, so that bilaterally (or multilaterally) the participants can confirm the status of the contracts/transactions. The statements are of the form "at timestamp $t_s$ these are all the active mutual contracts which have been finally confirmed". They can be used in dispute resolution. For example, a participant A could prove to a referee that a contract c that it has with a participant B is still active at some time t by showing the latest heartbeat from B which included c, and says in the heartbeat at timestamp $t_s$, and disclosing all the transactions that have occurred between $t_s$ and t. With a careful design of the action descriptions and the delivery proofs of the messaging layer, the referee would not need to learn anything except for contract IDs from the disclosed transactions.

To preserve the participants' privacy, the statements in some examples can contain just the roots of Merkle trees over the active contracts. To ensure that the participants can check each other's statements, the construction of the tree must be deterministic and reproducible by both participants.

Privacy

The disclosed system may include one or more of the following privacy characteristics.

Requirement (non-disclosure to unrelated participants). The transaction protocol may disclose an action within a submitted transaction (including its stakeholders and confirmers) only to stakeholder participants of the action. In this context, an action is a creation or exercise of a right in relation to stakeholder participants that is recorded on the distributed ledger which, in turn, is recognised by stakeholder participants for that action (which inherently means that it is: (i) approved by the transaction protocol for that action; and (ii) conforms to the underlying system model). This privacy aspect will be described with reference to the example illustrated in FIGS. 14a and 14b which reflects the transaction illustrated in FIG. 3.

Figure 14A:
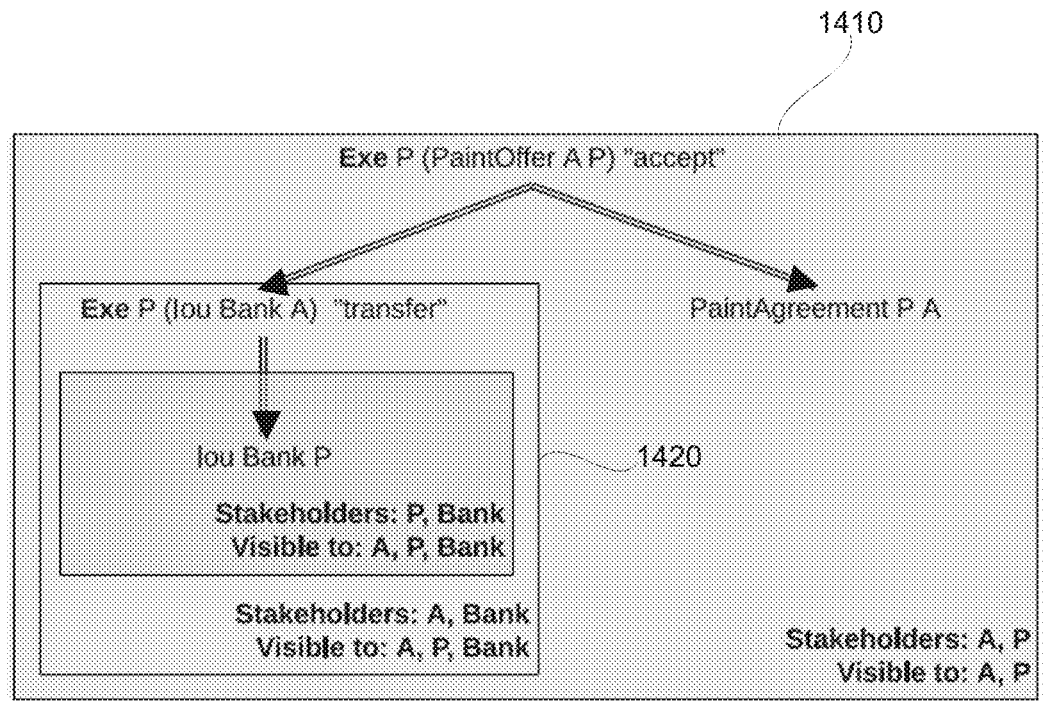
FIG. 14a illustrates views of a transaction involving participant A, participant B, and a bank.
Figure 14B:
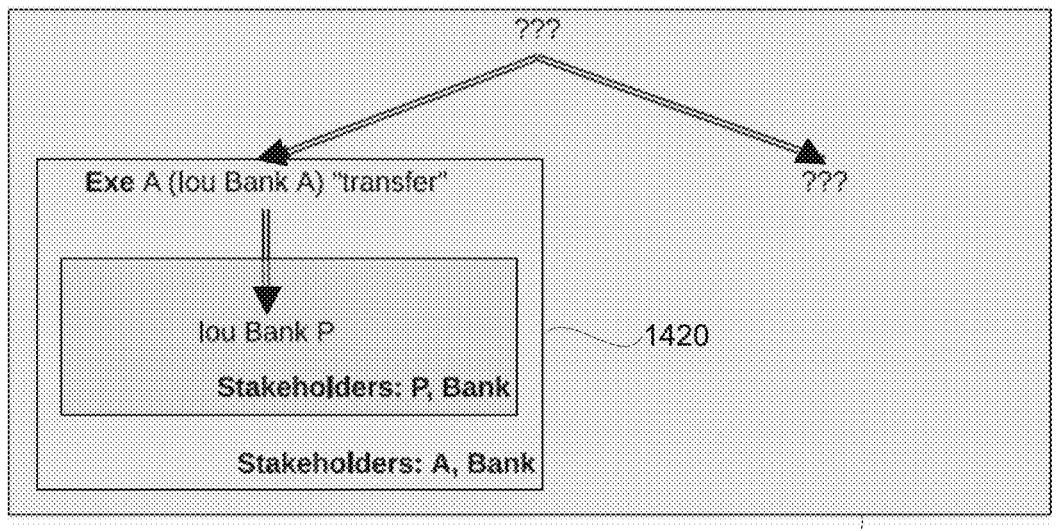

Referring to FIG. 14a, the participant node hosting A may see the entire transaction (first box 1410), as A is a stakeholder of the root action. For the same reason, the participant node hosting P also sees the entire transaction (first box 1410). Note that the participant node hosting P may see the second action (second box 1420), although it is not strictly a stakeholder. It sees the second action anyway, because it is a subaction of the first action, "Exe P (PaintOffer A P) "accept".

The participant node hosting the bank only sees the second action (second box 1420). Note that the requirement allows the transaction protocol to disclose the structure of the first action 1410 to the bank. This is illustrated by box 1410' in FIG. 14b.

The question marks "???" in 1410' indicate that the message delivered to the bank contains a blinded hash of the action, but the bank is unable to derive the action from the hash.

Requirement (non-disclosure of submitter). In some examples, the transaction protocol may disclose the submitting node or the submitter of a transaction only to stakeholder participants of top-level actions of the transaction.

In the paint fence transaction, the participants of A and P may learn the submitting node as they have visibility to the entire action. However, the participant node of the bank may not (or in cases where required must not) learn the submitting node nor the identity of the submitter.

Requirement (non-disclosure to message broker and mediator). The transaction protocol must not disclose the contents (that is the contents of the encrypted submessage 144) of a submitted transaction to the external node 230 or to the mediator 280.

Limitation (disclosure of stakeholders and confirmers). The transaction protocol can disclose the stakeholders and confirmers of a submitted transaction to the external node 230 or to the mediator 280. This information may be derived from the unencrypted submessage 142.

Limitation (disclosure of encrypted transactions). The transaction protocol can disclose an encrypted version of a submitted transaction to the external node, e.g. the encrypted submessage 144 that cannot be decrypted by the external node.

Limitation (disclosure by dishonest participants). The transaction protocol will not prevent dishonest participants from disclosing transactions to third parties.

Limitation (disclosure to an auditor) The transaction protocol will not prevent participants from disclosing transactions to an auditor.

Transaction Views

The privacy of the system can be further illustrated by transaction views from the perspective of the various nodes described below.

The transaction protocol may suggest that the system should obtain confirmation responses separately for every action in a transaction. In more complex examples, this leads to an excessive amount of messages being sent. Therefore the concept of transaction view can be used to reduce this burden. That is, how a multi-stakeholder transaction is decomposed to a set of minimal distinct views such that each node only sees what they need to see and to minimize data structure size.

Transaction view—Given a transaction tx, a view of the transaction tx is a subaction of the transaction meeting one of the following properties:

1. The subaction does not have a parent action in tx.
2. The parent action of the subaction in tx has different stakeholders or different confirming parties than the subaction.

The core of a view results from removing all subviews (except the view itself) from a view.

Figure 16A:
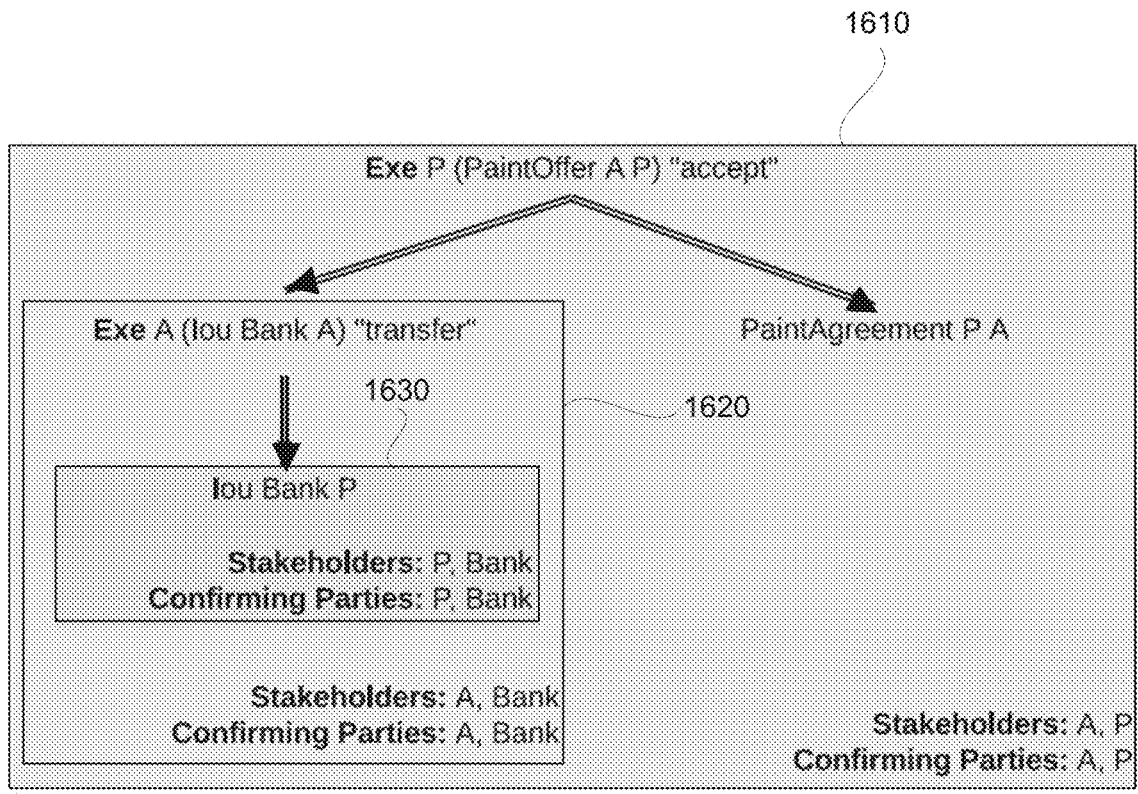
FIG. 16a illustrates the complete transaction view of a multi-participant process.
Figure 16B:
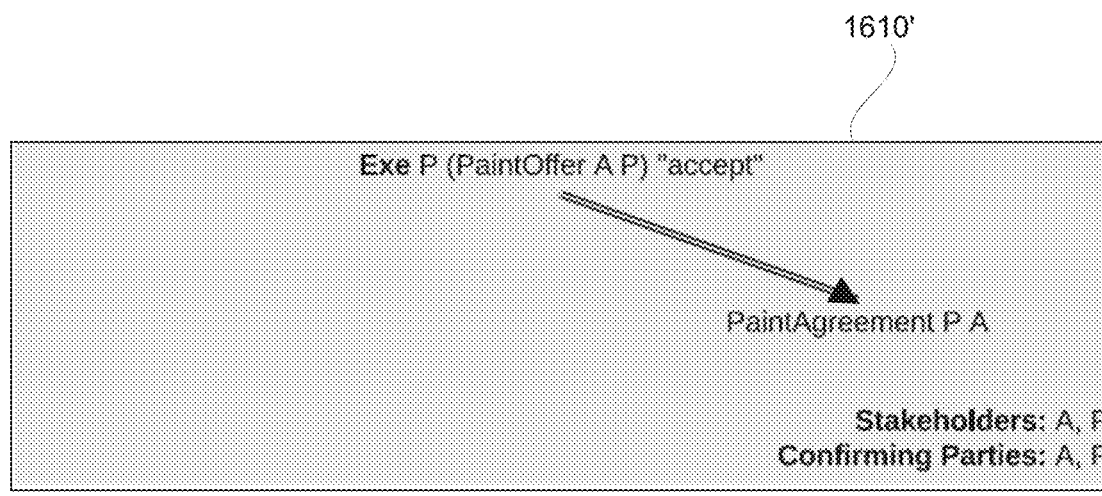
FIG. 16b illustrates the core of a first view in FIG. 16b.

This is best illustrated in FIGS. 16a and 16b. It is assumed that the full confirmation policy is in place; so every stakeholder is also a confirming party. As shown in FIG. 16a, the acceptance of the PaintOffer and the creation of the PaintAgreement belong to the same first view 1610, as these two actions have the same stakeholders (and therefore also the same confirming parties). The IOU transfer belongs to a separate second view 1620, as the bank is not a stakeholder of the first view 1610. The creation of P's IOU again belongs to a separate third view 1630, as the painter P is not a stakeholder of the second view 1620.

FIG. 16b illustrates the core of the first view 1610'. Thus the core of a view removes extraneous information from that view that can reduce message size as well as data requirements to store such information (such as parts of the corresponding submessages). This can include storing such information related to the transaction views on the distributed ledger. It is to be appreciated that second view 1620 and third view 1630 have respective cores that can involve different stakeholders, confirming parties (and respective nodes). This can assist in sub-transaction privacy as only those entitled to see a view can see the respective information.

It is to be appreciated that data structures can be built to represent the above transaction and views. This can include a transaction tree that is a blindable Merkle tree representing the transaction that may include: the transaction, the stakeholders of every view of the transaction, the ledger effective time, and the confirmation policy. A requirement may be that two different subtrees have different Merkle root hashes, even if the contents are the same.

Transaction Trees

Figure 17:
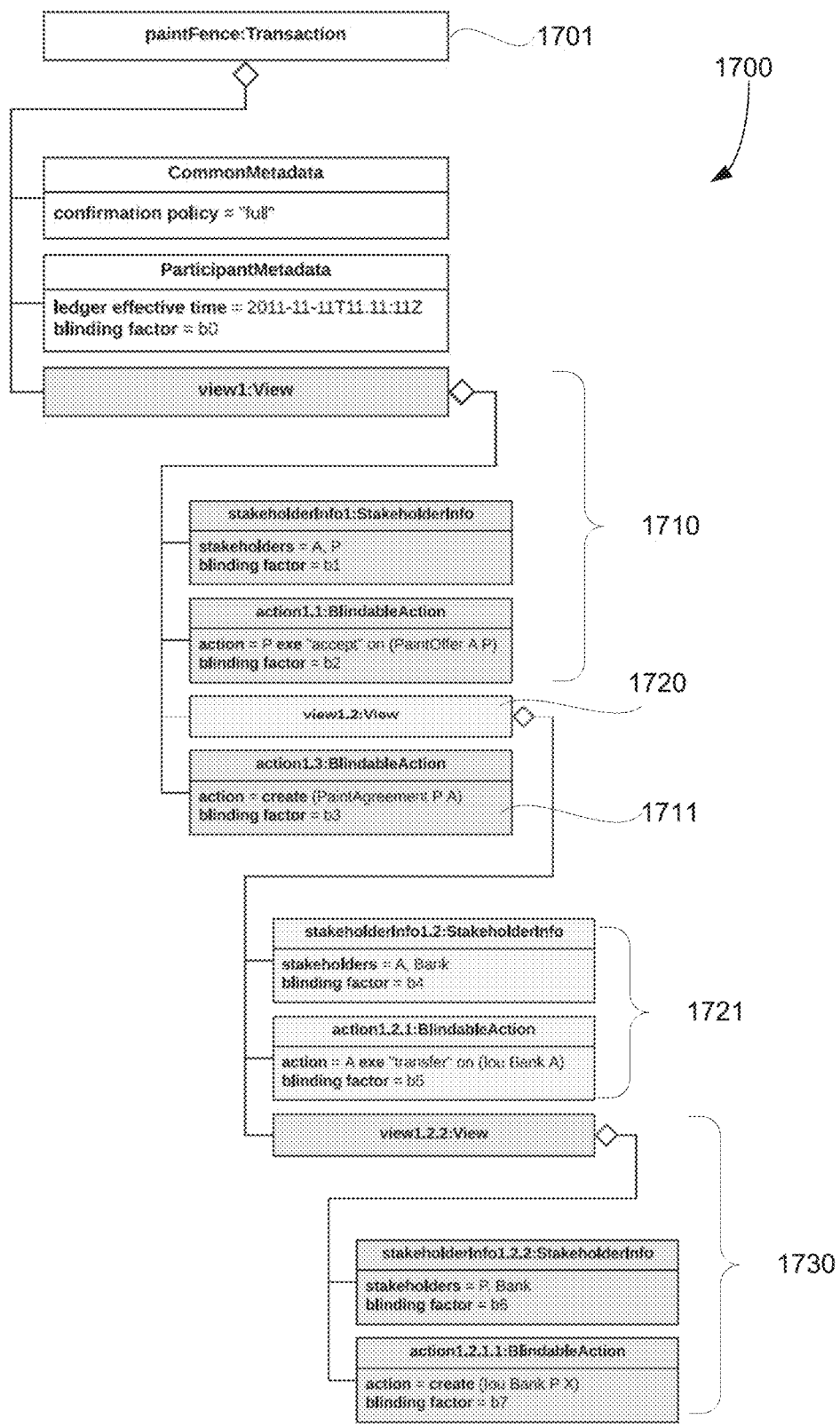
FIG. 17 illustrates a complete data structure representing a multi-participant process and transaction.

FIG. 17 illustrates a candidate data structure 1700 representing the paint fence transaction 1701. This can include the following groups:
(1) The acceptance of the PaintOffer represented by 1710 and 1711
(2) The transfer of the IOU represented by 1720 and 1721
(3) The creation of the new IOU as part of the transfer represented by 1730

The term blindable Merkle tree in this context means the following or has the following characteristics:
Every subtree has a hash.
If a subtree is replaced by its hash, the hash of the overall tree will not change.
It is practically impossible that an attacker can derive the contents of a subtree from its hash. To achieve this, the hashes must depend on blinding factors, which are included in the transaction tree.

The uniqueness of subtree hashes is required because the hash of a subtree will be used as a unique identifier of the subtree. It is also required to avoid that a participant who can see one subtree can deduce whether another subtree has the same content. Uniqueness of subtree hashes can be achieved by applying unique blinding factors.

Definition (hashes of transactions and views). The transaction hash of a transaction tree is the Merkle root hash of the tree. A transaction view hash of a transaction view is the Merkle root hash of the subtree of the transaction tree representing the transaction view.

Figure 18:
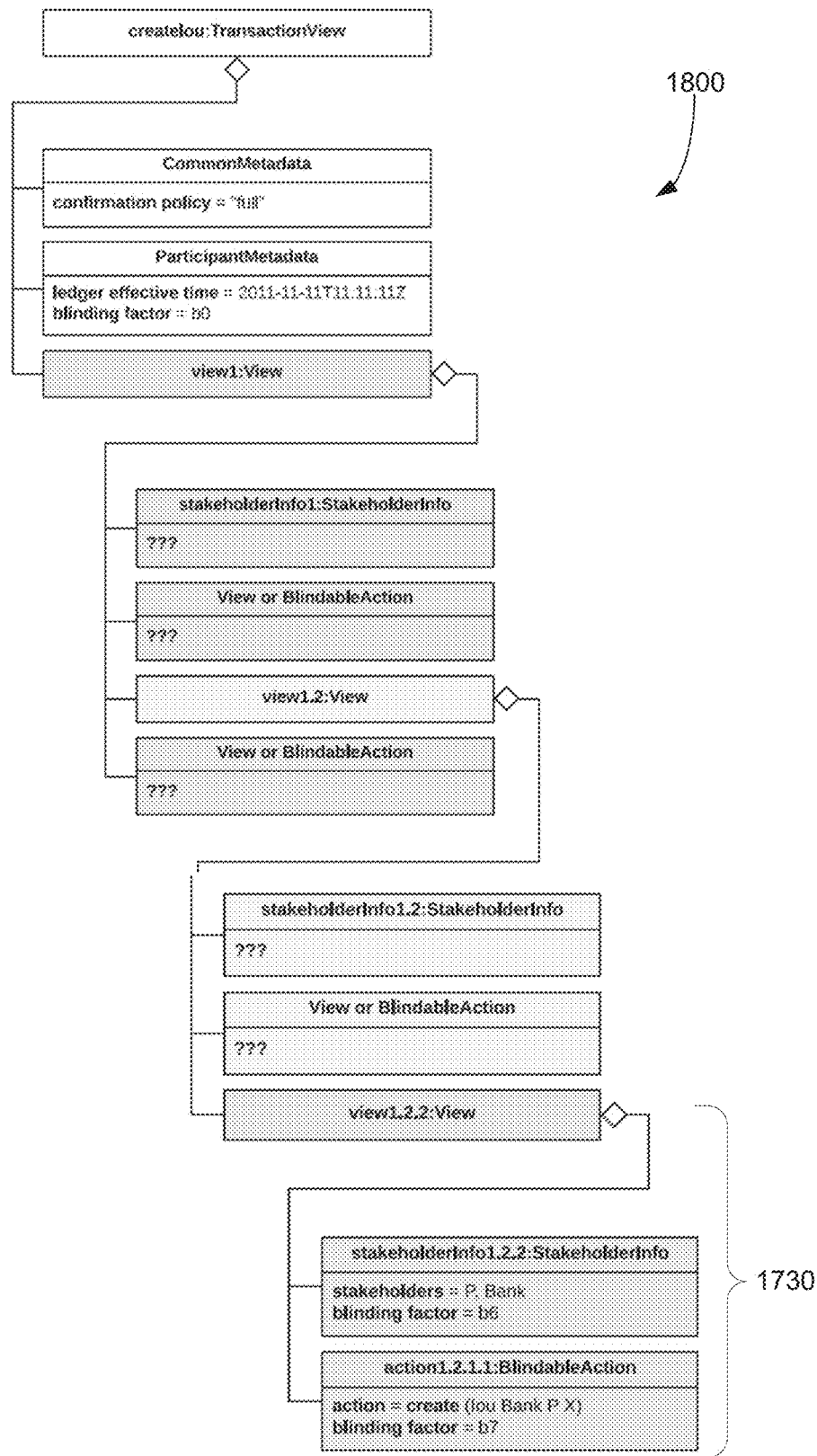
FIG. 18 illustrates a representation of a sub view of the transaction in FIG. 17 that illustrates sub-transaction privacy.

FIG. 18 shows a candidate representation 1800 of the subview 1730 of the paint fence transaction that creates the IOU owned by the painter. Information on the other views such as the acceptance of the PaintOffer 1710, 1711 and transfer of the IOU 1720, 1721 are not visible. This can be used to provide sub-transaction privacy.

Stakeholder tree—A stakeholder tree of a transaction is a partially blinded version of the transaction tree with the following properties:
(1) The contents of transaction views are blinded.
(2) The ledger effective time is blinded.
(3) The confirmation policy is unblinded.
(4) The hashes of selected transaction views are unblinded.
(5) If the hash of a transaction view is unblinded, then the stakeholders of the view are unblinded.

Figure 19:
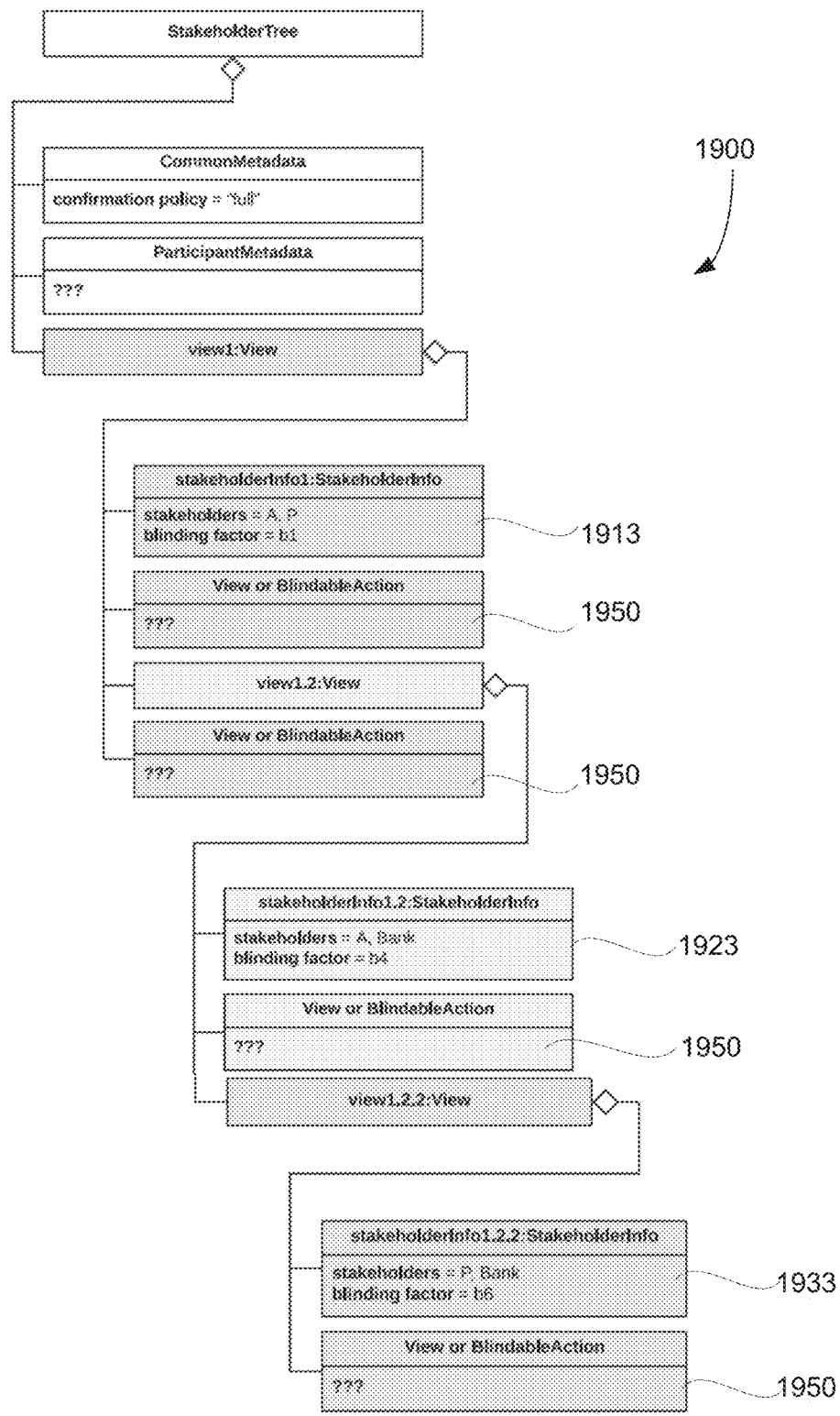
FIG. 19 illustrates a representation of a full stakeholder tree of the transaction in FIG. 17.

In the full stakeholder tree of a transaction the hashes of all views of the transaction are unblinded. FIG. 19 is a candidate representation 1900 of the full stakeholder tree of the paint fence transaction. The stakeholders' information 1913, 1923, 1933 is visible, with other information 1950 blinded.

Figure 20:
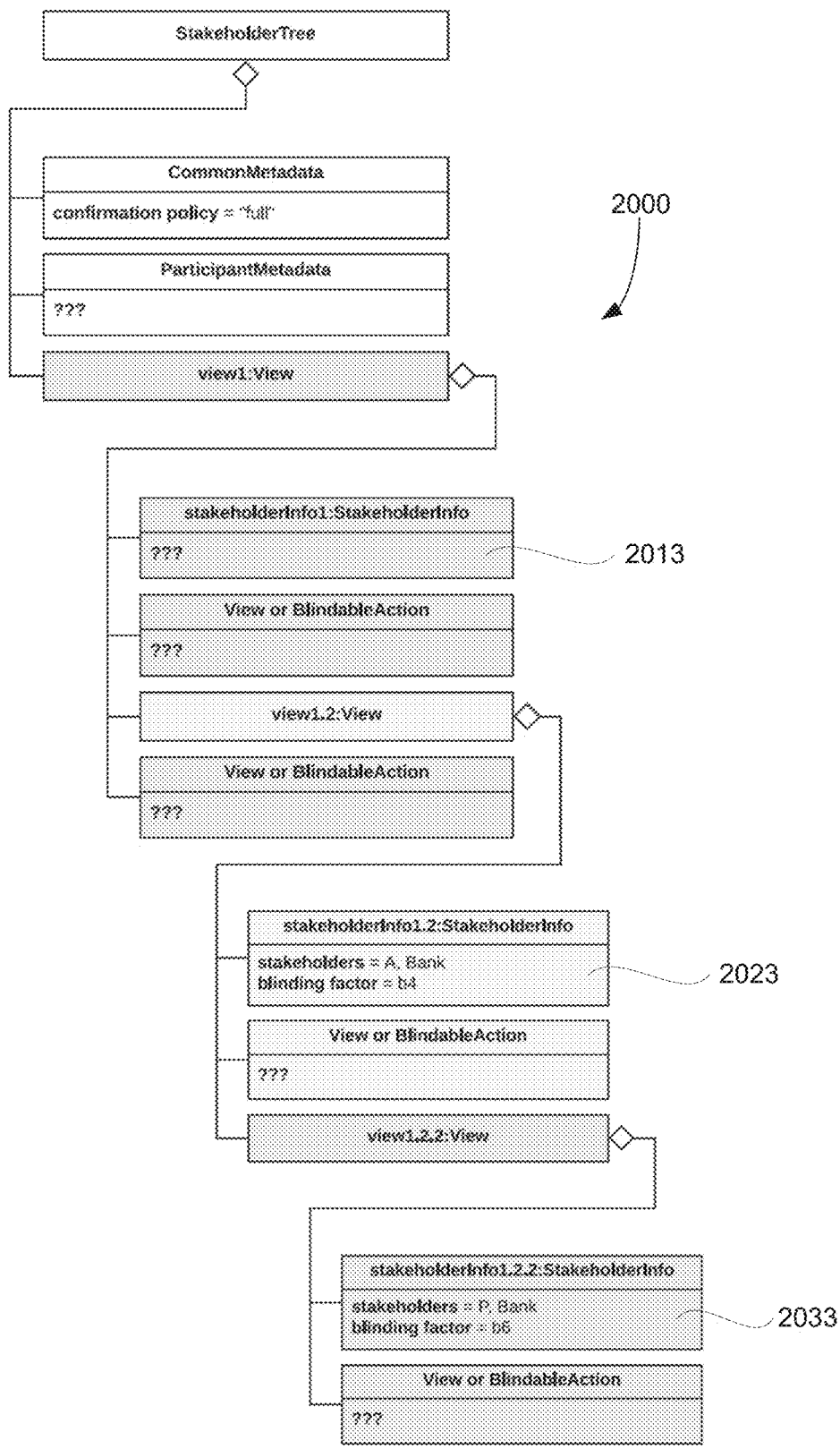
FIG. 20 illustrates a representation of a stakeholder tree unblinded for a stakeholder bank.

In the stakeholder tree unblinded for the parties p1, . . . , pn the hashes of exactly those views of which one of p1, . . . , pn is a stakeholder are unblinded. FIG. 20 illustrates a candidate representation 2000 of the stakeholder tree unblinded for the bank of the paint fence transaction. Unlike FIG. 19, the stakeholders 1913 are blinded 2013 (since the bank is not a stakeholder in the Paint agreement (offer/ acceptance) between participants A and P. The stakeholder information 2023, 2033 is visible to the bank as they are a stakeholder.

The above examples illustrate mechanisms for maintaining privacy at different levels of the transaction, whilst allowing stakeholders to view information to which they are stakeholders (or are otherwise entitled to view such information). Stated differently, the preceding examples illustrate how a transaction can be sent to multiple stakeholders with different part of the same transaction blinded to relevant stakeholders, according to the privacy model described. In that way, multiple stakeholders can receive the same transaction but have a different privacy view of that transaction. Such a construct permits submitting and recording transactions to a shared ledger while maintaining privacy amongst a variety of nodes in the network.

Virtual Shared Ledger

In some examples, the transaction protocol implicitly creates a virtual shared ledger. The properties of the virtual shared ledger are enforced by the transaction protocol. The virtual shared ledger is a virtual concept. Typically, there is no single participant who stores the entire virtual shared ledger. However, if all participants disclose the messages resulting from interactions with the transaction protocol, the virtual shared ledger can be derived from these messages.

First, the set of actions on the virtual shared ledger is defined. Ideally, an action belongs to the virtual shared ledger if and only if the protocol has approved the underlying transaction. This property actually holds if all stakeholder participants of the transaction are honest.

However, if some stakeholder participants are dishonest, they may approve an action even if it should be rejected according to the validation algorithm. In particular, dishonest participants may make the transaction protocol approve transactions that do not conform to the underlying DAML model (or alternative system model). For this reason, if an action is part of a transaction that the protocol has approved, the action must meet further properties in order to be part of the virtual shared ledger.

Actions on the virtual shared ledger—An action is part of the virtual shared ledger if the following properties hold:
i. The action is part of a transaction that has been approved by the transaction protocol.
ii. The action conforms to the underlying system model (e.g., DAML model for DAML systems).
iii. For every subaction A of the action (including the action itself), the declared stakeholders of A are exactly the stakeholders of A according to the system semantics (e.g., DAML semantics).

This example definition is illustrated at the example of the paint fence transaction. It is assumed that the underlying system model (in this case DAML model) contains all actions used in the example so that the transaction conforms to the underlying system model. It is also assumed that the transaction has been submitted with the full confirmation policy. First, consider the case that the stakeholders are declared correctly, e.g., according to DAML semantics. If the transaction as a whole has been approved, then every action in the transaction is part of the virtual shared ledger. Otherwise, i.e., if the transaction has been rejected, none of the actions in the transaction is part of the virtual shared ledger.

Figure 15A:
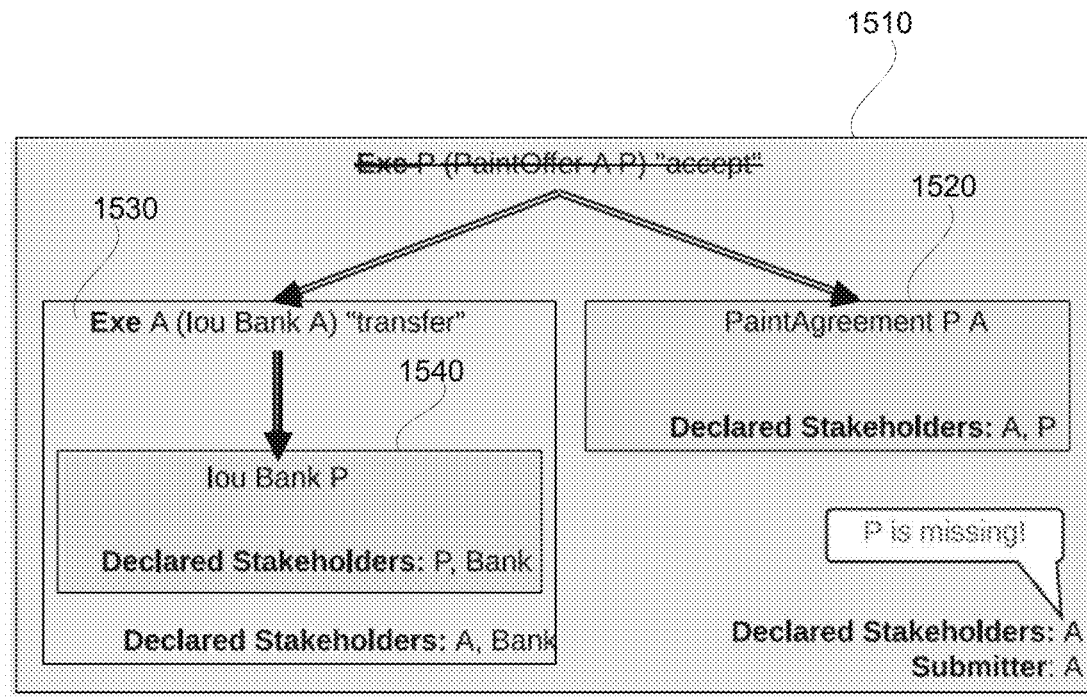
FIG. 15a is a representation of messages for a transaction to be recorded on a virtual ledger, whereby details of one participant P is missing.

FIG. 15a illustrates the case that A instead of P has submitted the paint fence transaction and that A has not declared P as a stakeholder of the first action 1510. Also, suppose that the protocol has approved the transaction.

The first action 1510 is not part of the virtual shared ledger because P has not been declared as a stakeholder. This makes sense, as P is the controller of the "accept" choice, but it has not even seen the action.

The creation of the PaintAgreement (1520) is part of the virtual shared ledger, as both A and P have been correctly declared as stakeholders. As both A and P have approved the action through their participant nodes, it makes sense to add the action to the virtual shared ledger.

For the same reason, the IOU transfer from A to P (action 1530 and 1540) is part of the virtual shared ledger. It would not be feasible to exclude the IOU transfer from the virtual shared ledger, as the Bank would need to be informed about it.

Figure 15B:
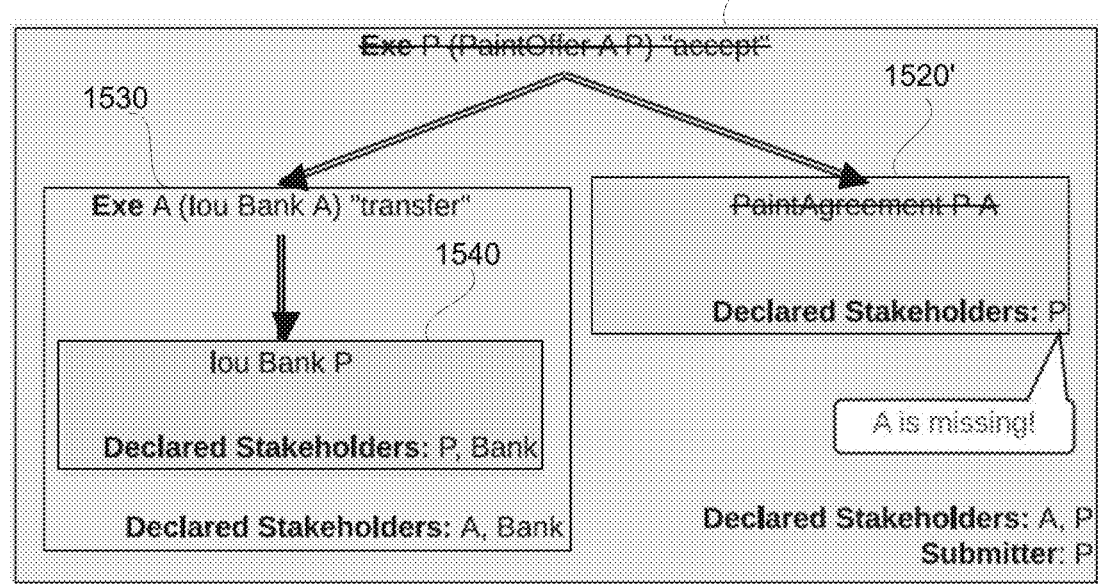
FIG. 15b is a representation of messages for a transaction to be recorded on a virtual ledger, whereby details of participant A is missing.

FIG. 15*b* illustrates the case that A has not been declared as a stakeholder of the action that creates the PaintAgreement (1520'). Again, suppose that the protocol has approved the transaction.

The creation of the PaintAgreement (1520) is not part of the virtual shared ledger, as A has not been declared as a stakeholder. This makes sense, as the action would create a PaintAgreement without informing A. The acceptance of the PaintOffer (1510) is not part of the virtual shared ledger either. If it were part of the virtual shared ledger, the virtual shared ledger would not conform to the DAML model (or alternative system model), as the DAML model does not allow for accepting a PaintOffer without creating a valid PaintAgreement (1520).

As before, the IOU transfer (1530 and 1540) is part of the virtual shared ledger. There is no reason against it, as both A and the Bank have approved the transaction.

Having explained under which conditions an action is part of the virtual shared ledger, the question "when" a transaction is part of the virtual shared ledger will now be addressed.

Transactions on the virtual shared ledger. A transaction tx is part of the virtual shared ledger if one of the following properties holds:
1. The transaction tx has been submitted via the transaction protocol and all actions in tx are part of the virtual shared ledger.
2. The transaction tx has been submitted via the transaction protocol as part of another transaction ptx. The transaction tx results from removing those actions from ptx that are not part of the virtual shared ledger.

Finally, an example of virtual shared ledger is defined as follows.

Virtual shared ledger In some examples, the virtual shared ledger can include the following properties:
i. The virtual shared ledger is a sequence of transactions. It contains those transactions that are "part of the virtual shared ledger" as discussed above.
ii. The order of transactions on the virtual shared ledger corresponds to the order of submission. Alternatively, in the specified order according to the protocol, such as the order as discussed under "logical reordering").
iii. Every recorded action on the virtual shared ledger is decorated with its confirming parties and the confirmer's signatures (e.g. those of the receiving node).
iv. If a transaction on the virtual shared ledger coincides with the transaction that has been submitted, then the transaction is decorated with its submitter and the submitting node's signature.

As noted above, typically no single participant stores the entire virtual shared ledger. However, if all participants disclose the messages that resulted from interactions with one another from the according to the transaction protocol, the virtual shared ledger can be derived from combining these messages.

Example Method

Figure 4:
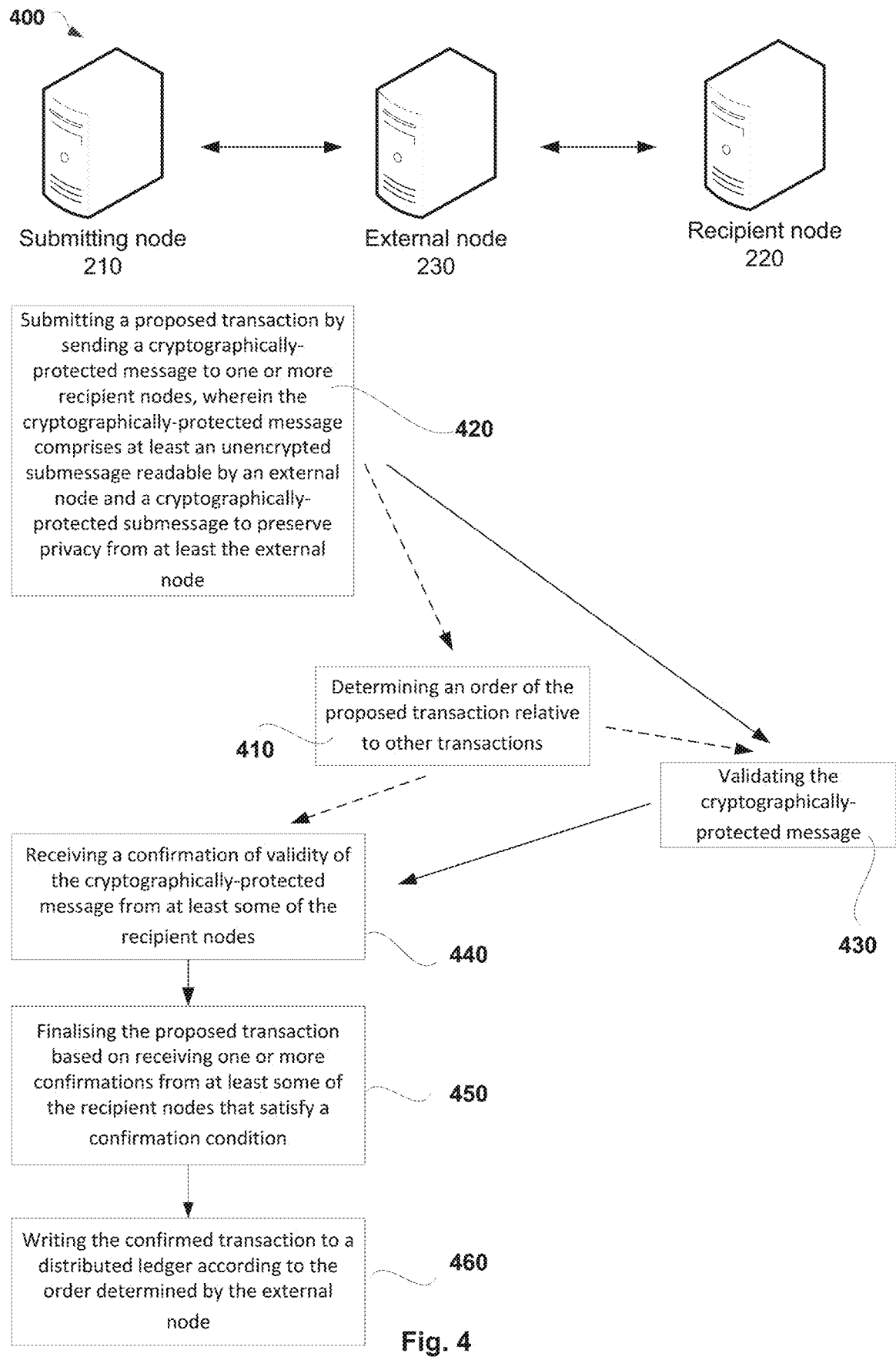
FIG. 4 is an example method of scheduling and validating a multiple-participant process.

FIG. 4 illustrates an example method performed by the system 200. It is to be appreciated that the method can be performed using system 100, as well.

In this example, the external node 230 can determine 410 an order of a plurality of messages corresponding to multiple transactions that makes up the process involving multiple participants. It is to be appreciated that the step of determining 410 may be performed before, between or after some of the steps described below.

The submitting node 210, who is associated with a participant in the process, can submit 420 a proposed transaction (such as 240 in FIG. 2*a*), wherein submitting a proposed transaction can comprise sending a partially encrypted message (such as a cryptographically-protected message) to one or more recipient nodes (such as recipient node 220) associated with a participant in the process, the partially encrypted message comprising at least an unencrypted submessage 242 readable by the external node 230 and an encrypted submessage 244 (such as a cryptographically-protected submessage) to preserve privacy from at least the external node 230.

The recipient node 220 can then determine 430 the validity of the partially encrypted message. This can involve performing validity checks on the proposed transaction 240 and then, if the validity checks pass, sending a confirmation to the submitting node and any other nodes that the recipient node 220 determines would expect or require a confirmation. In an example, the recipient node 220 can send the confirmations through a mediator node 280. In other examples, the recipient node 220 can send the confirmations peer-to-peer.

The submitting node 210 can then receive 440 a confirmation of validity of the partially encrypted message from the recipient node 220.

The submitting node 210 can then finalise 450 the proposed transaction as an accepted or confirmed transaction based on receiving one or more confirmations from one or more recipient nodes that satisfy a confirmation condition. The confirmation condition, as specified above, can for example be a full confirmation condition, a VIP confirmation condition, or some other confirmation condition set as a parameter of the system.

A node, which is the submitting node 210 in this case, can then write 460 the accepted/confirmed transaction to a ledger according to the order determined by the external node 230. The ledger can be any ledger as detailed herein, including a distributed "virtual" ledger. In an example, the recipient node 220 (or nodes 220, 222) that are part of the transaction can, once such node(s) receives sufficient confirmations 250, 252 to satisfy the confirmation condition, also write the accepted/confirmed transaction to its own copy of the ledger 260, 262, 264. In a sense, the nodes 210, 220 to the transaction can, in an example, form a "virtual" shared ledger between the nodes specific to any number of transactions occurring between the nodes 210, 222.

It is to be appreciated that each node 110, 120, 122, 130, 210, 220, 222, 230, 330, 340, 342 may perform a corresponding portion of the method described.

Example Node

Figure 5:
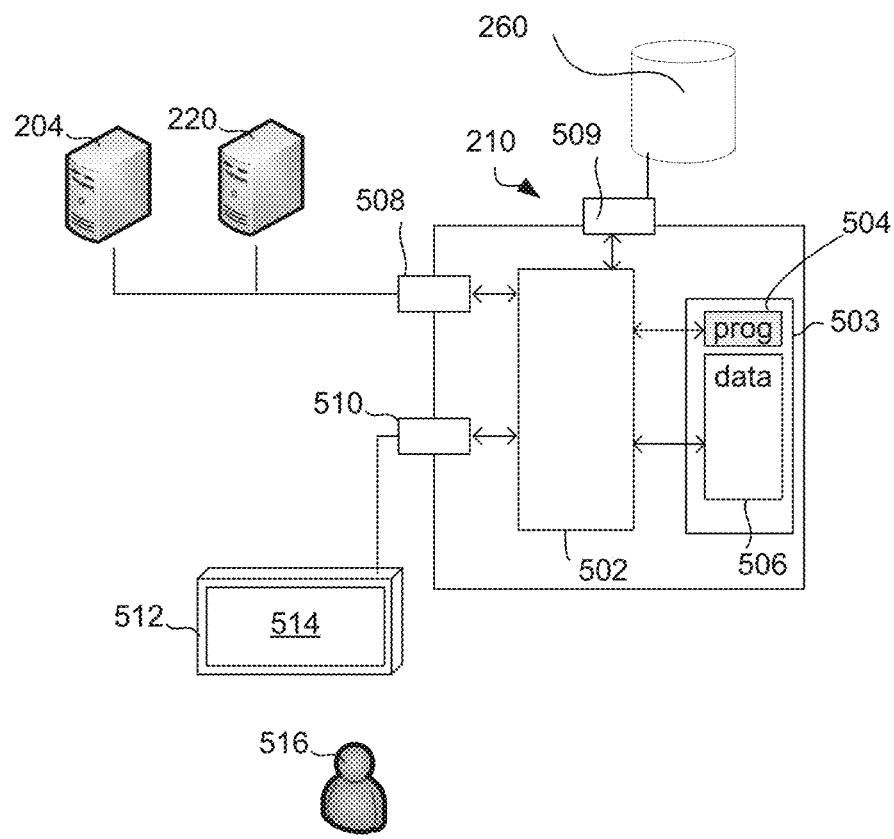
FIG. 5 is an example node.

FIG. 5 illustrates an example node which could be any of nodes 110, 120, 122, 130, 210, 220, 222, 230, 330, 340, 342 disclosed herein. The node 210 shown in FIG. 5 includes a processor 502, a memory 503, a network interface device 508, 510, a distributed ledger interface device 509 that interfaces with the ledger 260 and a user interface 512. The memory 503 can store instructions 504 and data 506 and the processor 502 can perform the instructions from the memory 503 to implement the processes as described in FIG. 3.

Processor 502 can receive an input through the user interface 512 from a user such as a participant 516. Processor 502 can determine an instruction based on the current state of execution as recorded in the distributed ledger 152. The instruction may be a function to execute. The processor 502 may execute instructions stored in the program code 504 to indicate any output 514 or result to the participant 516.

Resource Model

A proposed transaction 140, 240 may contain one or more the resource requirements in terms of resource units that express a choice of pre-stated shared physical-temporal constraints (processing time, memory, network, storage), in an example one per request message confirmable sub-block, for each recipient to validate and confirm the transaction.

Every node 110, 120, 122, 130, 210, 220, 222, 230, 330, 340, 342 can promise to provide a specified amount of a resource for a specified time period. Such capacity promises can be restricted to a process or a group of nodes. All resource requirements are charged against the most specific capacity promise that applies. A node can immediately reject a transaction whose resource requirements exceed its unused capacity requirements. The node may reply to indicate it is out of quota for its resource capacity. A capacity monitor, such as a referee node, can confirm all rejections based on exceeding a quota for its resource capacity. Thereby, the capacity monitor can check against the capacity promises made by the relevant nodes.

In some exemplary systems, the capacity promises of the nodes have been created and possibly updated by a previous transaction or proposed transaction(s) and acceptances involving the nodes and their participants. Such capacity reservation transaction(s) can be implemented using the transactions described in this present disclosure. In some exemplary systems, the capacity promises are reserved for subset of specific transaction types. This can allow some exemplary systems to have nodes specifically promise capacity to process capacity creation and update transaction(s).

The resource requirements can be declared in a transaction, but not the content of the transaction itself. Thus, the submitting node can in theory declare lower resource requirements than the actual resources consumed by processing and validating the transaction. A recipient node can detect such a mismatch and raise a dispute on the basis that the submitting node is cheating on the resource consumption.

Resource Allowances

Related to the resource model, in some cases a submission fee or resource allowance may be required to be paid by the submitting node 110, 210 (submission fee) and applicable recipient nodes 120, 122, 220, 222 (validation fee) that exercise a choice on a contract (e.g., a DAML contract) in a transaction. Fees can be paid to the operator who runs the domain, and/or to the stakeholders of the transaction. Fees can be determined as a function of the transaction costs as determined by the amount of resources required to be used by the transaction, the process, and the domain. In order to do this easily, each node can have a fee account where fees are deducted and credited to the fee account.

The accounting component can maintain an account for each participant. When a transaction is timestamped by the message broker (e.g., external node 230), the submission fee can be charged to the submitter's account. When a transaction becomes final, the validation fees can be transferred. Participants can top up their fee accounts using a dedicated workflow. In some exemplary systems, fee accounting and transaction logic can be implemented using the transactions described in this present disclosure. In such cases, the operator, or a representative of the operator, can be a participant with a node in the domain. Fee accounting rules and fee payment logic can then implemented within ledger logic without need for additional accounting components. Further, fee data or support data may be transported within the proposed transaction and confirmation messages (encrypted or not) without need for additional transaction logic. This may allow participants to create and update fee rules used for fee calculations through transactions, and/or allow fee calculations to be participant and transaction content specific. For example, participant nodes may be free of validation fees when their sole role within the ledger process is to validate.

Dispute

A dispute can be raised when a participant is misbehaving or failing, such as when a participant does not confirm transactions within agreed time spans, systematically requests transactions that fail validation, or declares insufficient resource requirements.

A referee node can form part of the system and can store evidence to evaluate a dispute; that is, it might need to store the sent transactions and confirmations. The nodes involved in a dispute may be required to provide evidence, that is, their unblinded transactions, such that a dispute can be resolved. To maintain privacy, the nodes may re-encrypt the transactions in such a way that only the referee node can decrypt them.

In some exemplary systems, the dispute resolution process is implemented using the transactions described in this present disclosure. In such cases, the referee can be a participant with a node in the domain. The dispute resolution process can then be implemented within ledger logic without need for additional accounting components. Disputes can be raised, evidence provided, and resolution outcome determined without need for additional transaction logic. This may allow participants to raise disputes, provide evidence, and resolve disputes through transactions.

Timeout Disputes

As noted above, in one example the confirmation condition requires a participant to respond to a proposed transaction in a timely manner. If a participant does not respond in a timely manner, participant node(s) (or delegates) to that transaction can initiate a timeout dispute to a referee node. This can be used to determine non-compliance and, more importantly, determine the specific participant node that caused non-compliance. An example of handling such timeout disputes can include one or more of:

Submitting to a referee node, the timestamp of the affected confirmation request, together with the associated proof delivered by the messaging API and the pseudonym (of the accused participant) that failed to respond. If known, the identity behind the pseudonym is also sent.

If no identity was provided, the referee node asks the identity manager 170 to uncloak it. After determining the accused participant's identity, the referee node sends the participant a request for evidence that they (in particular the participant's respective node) have responded. The evidence is a timestamped message from the messaging service, containing the confirmation response from either the accused participant or the capacity monitor (in case the request was rejected with an OutOfQuota response).

If the evidence is provided, the initiator of the request is permanently moved into a "confirm-only" mode: they are prohibited from sending further confirmation requests to the system, but we still allow them to receive messages and send confirmation responses.

If the accused participant does not respond, a message is broadcast, marking them as offline. Offline participants are moved to confirm-only mode, and other participants are allowed to reject their confirmation requests. As the submitters are anonymous in the current scheme, the rejects could be done by the capacity monitor or the allowance accountant. After the accused participant comes back online, they can issue a request to be marked again as such by the referee node. The request might be granted only after a certain "cool-off" period, to incentivize the participants to stay available.

If the accused participant responds with invalid evidence, they are permanently (or during a specified penalty period) moved to the confirmed-only mode.

Detecting and Proving Participant Misbehaviour

Participant misbehaviour can arise due to malicious action. Examples include:

- A participant submits a transaction that does not conform to the underlying system model (e.g., a DAML model in a DAML system).
- A participant submits a transaction on behalf of a submitting party that the participant does not host.
- A participant submits a transaction that needs to be authorized by a party other than the submitting party.
- A participant submits an ill-formed transaction.
- A participant defines the declared stakeholder participants differently from the stakeholder participants according to DAML (or other alternative system) semantics. Thus, the wrong participants are informed about the action.
- A recipient node confirming the transaction does not apply the algorithm specified by the protocol to validate an action. For example, it approves an action although the action uses archived contracts. Or it rejects an action that should be approved according to the validation algorithm.
- The external node delivers a message with an incorrect list of recipient nodes or fails to deliver a message to the recipient node.

Examples of misbehaviour and how it can manifest in the system include:

1. a confirmation request (e.g., a submitted proposed transaction) is flagged as malformed;
2. conflicting responses (from recipient nodes to what is expected) arrive to a confirmation request;
3. transactions are rejected by falsely claiming capacity promise exhaustion (e.g., lack of resources).

From this, it can be determined that:

1. If two parties issue conflicting confirmations on the same confirmation request, then one of them is malicious (or its participant node is malfunctioning in a way different from crashing).
2. The honest parties, with the help of the referee node, will have sufficient data to pinpoint who was cheating.

A confirmation request can be malformed because of:

1. Failing conformance and authorization checks, as described earlier.
2. Incorrect resource declaration by the submitting node 110.

An honest participant that receives a malformed confirmation request forwards it to the referee node to initiate a dispute. The referee node can then perform the same checks that the dispute initiator participant node did. If the checks fail (i.e., the submitting node's proposed transaction fails the rules), the submitter's identity is uncloaked and the submitter is permanently moved to the confirm only mode. Otherwise, the initiator of the dispute is set to confirm only.

Conflicting responses can only occur if one party rejects (i.e., one of the recipient nodes), and another one (i.e., another recipient node) confirms the transaction. The rejecting party must provide the evidence for the rejection to the referee node first:

1. If it rejected the transaction because of authorization or conformance problems, then the confirmation request itself suffices; or
2. If it rejected the transaction because of consistency checks, then it should provide an earlier, finally confirmed transaction that conflicts with the current transaction.

The loser in the dispute is permanently (or during a penalty period) moved to the confirm only mode, as they have acted maliciously.

Detecting and Proving Centralized Messaging Service Misbehaviour

If we use a centralized messaging broker (e.g., external node 230), the messaging broker's misbehaviour can cause violations of the messaging layer properties that are required. Intuitively, any relevant misbehaviour of the broker will lead to a divergence of the participants' states. The divergence will be detected when the participants exchange confirmations and/or heartbeats or when they attempt to raise disputes, as they will have conflicting evidence pointing to the broker's misbehaviour. There are two cases where the misbehaviour will be detectable by the affected party, but not provable: (i) when the broker withholds all messages from a participant, and (ii) when the broker rejects the participant's messages.

Other Example Methods

Three other example methods will now be described. The first is an example of the method in a single domain. The second and third examples relate to multiple domains. In particular, the second relates to a domain change protocol. The third relates to multi-domain transactions.

Further Example Method in a Single Domain

FIGS. 10 to 13 illustrate an example of a delivery-versus-payment (DvP) 1001 in a single domain 1000. Alice 1010 and Bob 1012 wants to exchange an IOU given to Alice 1010 by a bank 1014 for some shares that Bob 1012 owns. We have four parties: Alice (aka A) 1010, Bob (aka B) 1012, a Bank and a share registry SR 1016. There are also three types of contracts:

1. an IOU contract 1031, always with Bank 1014 as the backer
2. a Share contract 1033, always with SR 1016 as the registry
3. a DvP contract 1035 between Alice 1010 and Bob 1012

Assume that Alice has a "swap" choice on a DvP contract 1035 instance that exchanges an IOU 1031 she owns for a Share 1033 that Bob has. We assume that the IOU and Share contract instances have already been allocated in the DvP. Alice wishes to commit a transaction executing this swap choice; the transaction has the following structure shown in FIG. 10.

Figure 11A:
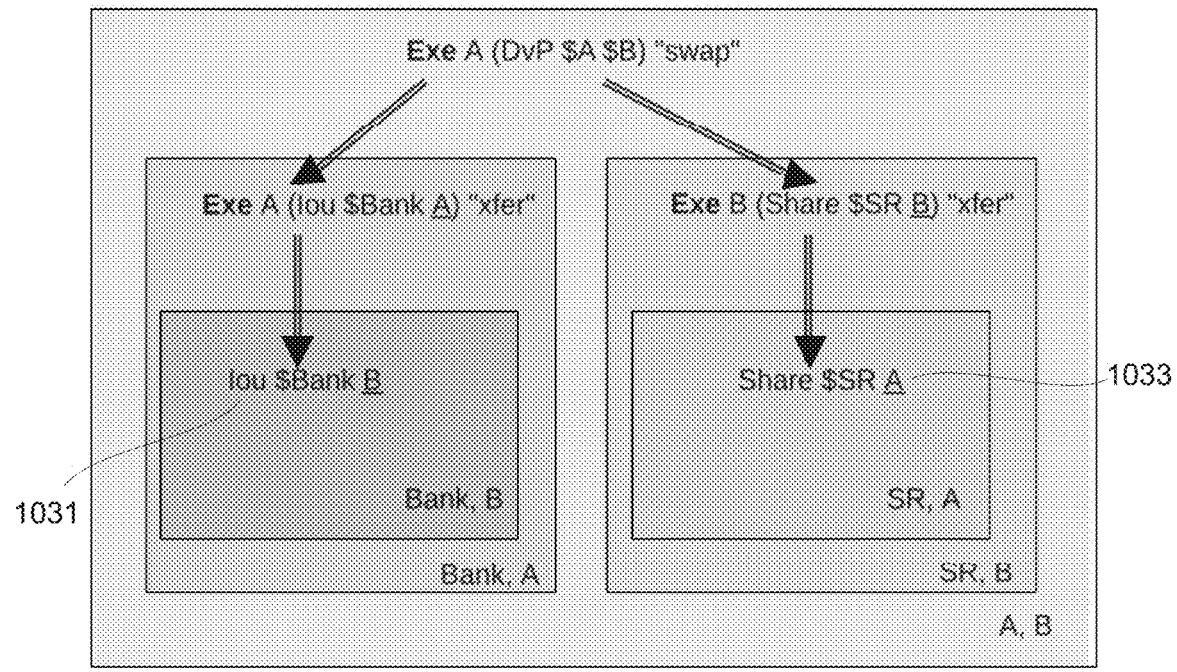
FIG. 11a shows the views of the various entities in the example transaction in FIG. 10.
Figure 11B:
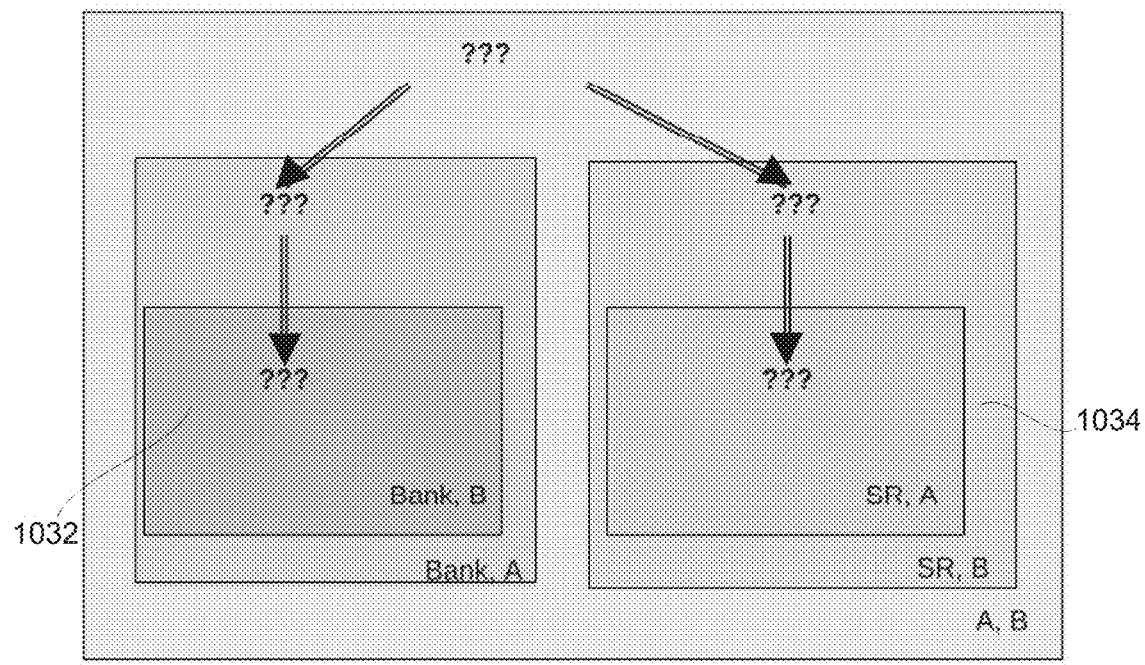
Figure 12:
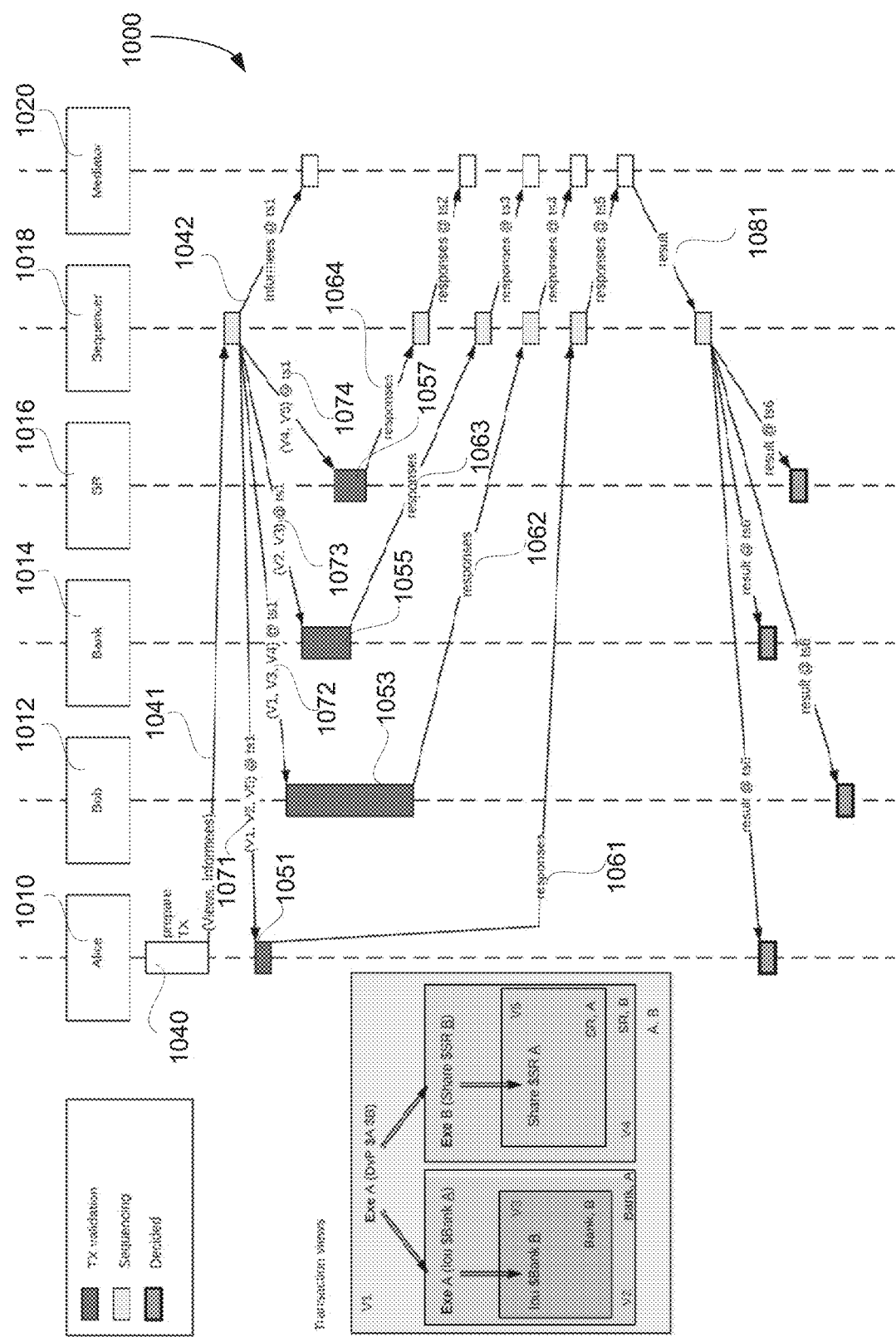
FIG. 12 is a schematic diagram of the transaction and method of FIGS. 10 to 11b.

Committing this example transaction involves two steps:

First step—Alice's participant node 1010 (as a submitting node) prepares 1040 a confirmation request 1041 for the transaction (see FIG. 12). The request 1041 provides different views on the transaction; participants see only the subtransactions exercising, fetching or creating contracts on which their parties are stakeholders (more precisely, the subtransactions where these parties are informees). The views for the DvP, and their recipients, are shown in FIG. 11a (as indicated on the bottom right of the boxes). Alice's participant node 1010 submits the request to a sequencer 1018 (i.e., the external node 1018), who orders all confirmation requests in this single domain 1000; and whenever two participants see the same two requests, they will see them according to this sequencer (external node 1018) order. In this example, the sequencer (external node 1018) has only two functions: ordering messages and delivering them to their stated recipients 1012, 1014, 1016. The payload message contents are encrypted and not visible to the sequencer (external node 1018).

Second step—The recipient nodes 1012, 1014, 1016 then check the validity of the views that they receive. The validity checks 1051, 1053, 1055, 1057 can cover three aspects:
1. validity as defined in the ledger model: consistency, (mainly: no double spends), conformance (the view is a result of a valid DAML interpretation) and authorization (guaranteeing that the actors and submitters are allowed to perform the view's action)
2. authenticity (guaranteeing that the actors and submitters are who they claim to be).
3. transparency (guaranteeing that participants who should be notified get notified).

Conformance, authorization, authenticity and transparency problems only arise due to submitter 1010 malice. Consistency problems can arise with no malice. For example, the IOU that is to be transferred to Bob 1012 might simply have already been spent (assuming that we do not use the "locking" technique in DAML). Based on the check's result, a subset of recipients 1014, 1016, called confirmers then prepares a (positive or negative) confirmation response for each view separately. A confirmation policy associated with the request specifies which participants are confirmers, given the transaction's informees.

The confirmers send their responses 1061, 1062, 1063, 1064 to a mediator 1020, another special entity that aggregates the responses into a single decision for the entire confirmation request. The mediator 1020 serves to hide the participants' identities from each other (so that Bank 1014 and SR 1016 do not need to know that they are part of the same transaction). Like the sequencer (external node 1018), the mediator 1020 does not learn the transactions' contents. Instead, Alice's participant node 1010, in addition to sending the request 1041, also simultaneously notifies 1042 the mediator 1020 about the informees of each view. The mediator receives a version of the transaction where only the informees of a view are visible and the contents blinded 1032, 1034 as conceptually visualized in the diagram FIG. 11b.

From this, the mediator 1020 derives which (positive) confirmation responses 1061, 1062, 1063, 1064 are necessary in order to decide the confirmation request as approved.

Requests 1041 submitted by malicious participants can contain bogus views. As participants can see only parts of requests (due to privacy reasons), upon receiving an approval for a request, each participant locally filters out the bogus views that are visible to it, and accepts all remaining valid views of an approved confirmation request. Under the confirmation policy's trust assumptions, the protocol ensures that the local decisions of honest participants match for all views that they jointly see. The protocol thus provides a virtual shared ledger between the participants, whose transactions consist of such valid views. Once approved, the accepted views are final, i.e., they will never be removed from the participants' records or the virtual ledger.

Referring back to the example in FIG. 12, the sequencer (i.e., the external node 1018) and mediator 1020 together with an identity (not illustrated but described elsewhere) form an example of a single domain 1000. All messages within the domain 1000 are exchanged over the sequencer (external node 1018), which ensures a total order between all messages exchanged within a domain 1000.

The total ordering ensures that participants see all confirmation requests 1041 and responses in the same order. The protocol additionally ensures that all non-Byzantine (i.e. not malicious or compromised) participants see their shared views (such as the exercise of the IOU transfer, shared between the participants of Bank and A) in the same order, even with Byzantine submitters. This has the following implications:
1. The correct confirmation response for each view is always uniquely determined, because, in some examples using DAML model, it is deterministic. However, for performance reasons, we allow occasional incorrect negative responses, when participants start behaving in a Byzantine fashion or under contention. The system provides the honest participants with evidence of either the correctness of their responses or the reason for the incorrect rejections.
2. The global ordering creates a (virtual) global time within a domain, measured at the sequencer (external node 1018); participants 1010, 1012, 1014, 1016 learn that time has progressed whenever they receive a message from the sequencer 1018. This global time is used for detecting and resolving conflicts and determining when timeouts occur. Conceptually, we can therefore speak of a step happening at several participants simultaneously with respect to this global time, although each participant 101, 1012, 1014, 1016 performs this step at a different physical time. For example, in the message sequence diagram of FIG. 12, Alice 1010, Bob 1012, the Bank 1014, and the share registry's 1016 participants receive the confirmation request 1071, 1072, 1073, 1074 at different physical times, but conceptually this happens at the timestamp ts1 of the global time, and similarly for the result message 1081 at timestamp ts6.

The example of FIGS. 10 to 13 illustrates a single domain. However, this can be modified and adapted to support multiple domains as will be discussed in later examples.

Some considerations in the system are to reconcile integrity and privacy concerns while ensuring progress with the confirmation-based design, given that participant nodes might be overloaded, offline, or simply refusing to respond. Example ways of addressing these considerations include:

Using timeouts: if a transaction's validity cannot be determined after a timeout (which is a domain-wide constant), the transaction is rejected.

If a confirmation request times out, the system informs the participant submitting 1010 the request on which participants have failed to send a confirmation response. This allows the submitting participant to take out of band actions against misbehaviour.

Flexible confirmation policies: To offer a trade-off between trust, integrity, and liveness, some domains may be tailored to their respective confirmation policies. Confirmation policies specify which participants need to confirm which views. This enables the mediator 1020 to determine the sufficient conditions to declare a request approved. Of particular interest is the VIP confirmation policy, applicable to transactions which involve a trusted (VIP) party as an informee on every action. An example of a VIP party is a market operator. The policy ensures ledger validity assuming the VIP party's participants behave correctly; incorrect behaviour can still be detected and proven in this case, but the fallout must be handled outside of the system. Another important policy is the signatory confirmation policy, in which all signatories and actors are required to confirm. This requires a lower level of trust compared to the VIP confirmation policy sacrificing liveness when participants hosting signatories or actors are unresponsive. Another policy (being deprecated) is the full confirmation policy, in which all informees are required to confirm. This requires the lowest level of trust, but sacrifices liveness when some of the involved participants are unresponsive.

Attestator nodes. Attestator nodes can be thought of as on-demand VIP participants. Instead of constructing DAML models so that VIP parties are informees on every action, attestator nodes are only used on-demand. The participants who wish to have the transaction committed must disclose sufficient amount of history to provide the attestator nodes with unequivocal evidence of a subtransaction's validity. The attestator's statement then substitutes the confirmations of the unresponsive participants.

Figure 13:
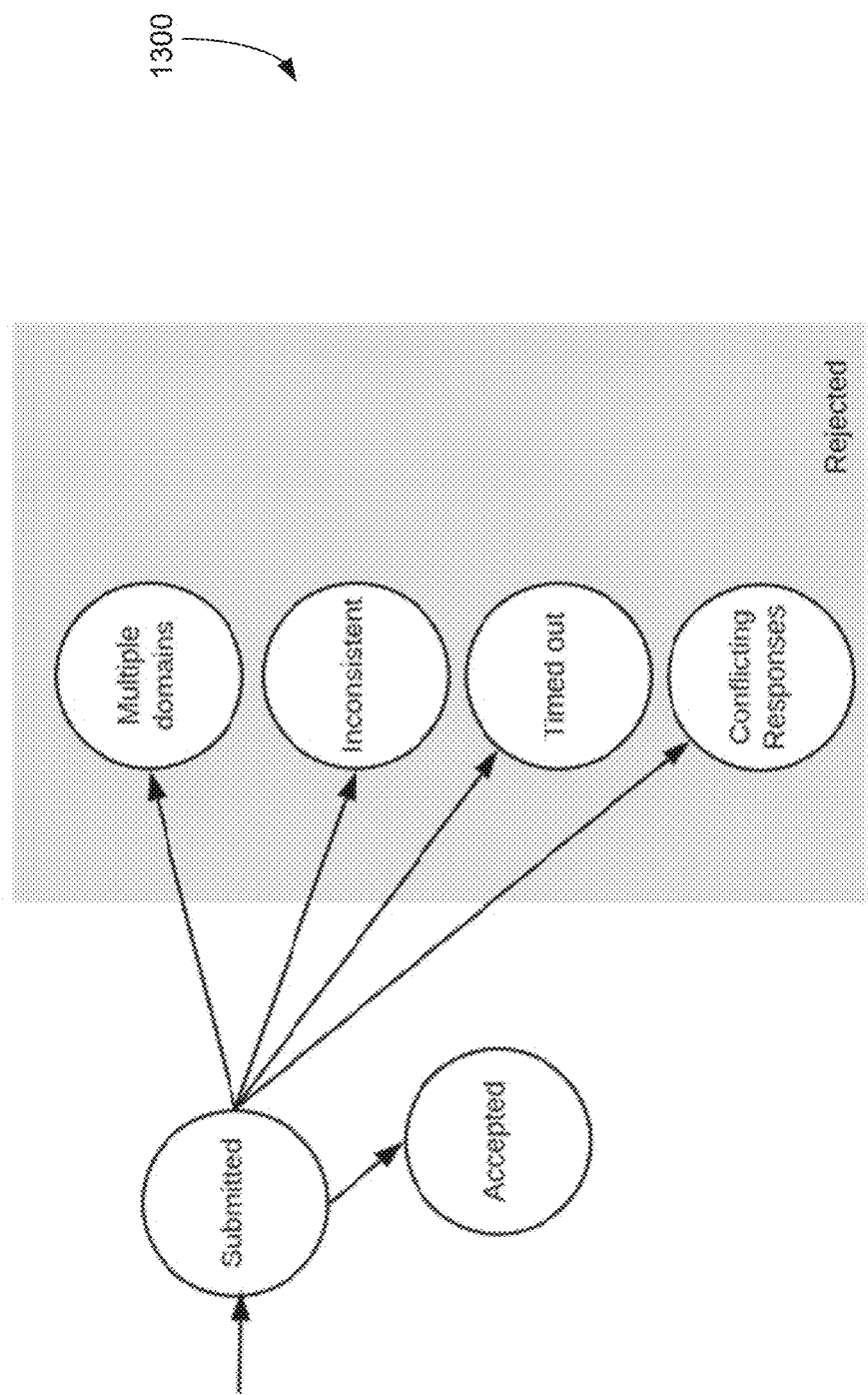
FIG. 13 is a state transition diagram of the transaction and method of FIGS. 10 to 12.

FIG. 13 illustrates a state transition diagram 1300 of a confirmation request; all states except for "Submitted" are final. As described elsewhere, the confirmation request can be rejected for a variety of reasons including: request for a transaction that is outside of the current domain 1000 (unless it is part of an allowable multi-domain transaction which will be described separately), timeout, inconsistency and conflict with earlier or other requests.

Domain Changes and Composability

In some examples, the system has composability in that the system will support multiple domains and transactions across different domains. Composability provides atomicity guarantees for inter-domain transactions at the synchronisation layer (rather than the application layer). This can allow composing of several domains into one conceptual ledger at the application level. Approaches to inter-domain transactions include:

1. Domain change protocol. This is a protocol to transfer a contract from one domain to another. Such a protocol can be used to reduce a multi-domain transaction to a single-domain transaction by moving all required contracts to a single domain That is, it requires all stakeholders of all affected contracts to be connected to that one common domain.
2. Protocol for multi-domain transactions. This approach involves some of the participant nodes that can act as relays between different domains. This approach does not require all stakeholders to be connected to a single domain. However, it is important in such systems to have active participation by stakeholders so that the transaction is executed atomically across all domains.

The two approaches will now be discussed in detail.

Domain Change Protocol

The domain change protocol moves individual contracts from one domain, the origin, to another, the target. Contracts may be moved for different reasons:

- As a preparatory step to ensure that a subsequent transaction can operate on contracts of a single domain.
- To balance the load between different domains (done by the stakeholders).
- To take advantage of better market rules, allowances, or quality of service (also done by the stakeholders).

Examples of the domain change protocol can include one or more of the following characteristics:

- A contract resides in one domain only, or is in the transfer to another domain. The contract must eventually reside in a domain that is the contract's residence. All stakeholders to the contract must be directly connected (or indirectly connected via a relay) to that residence domain.
- All stakeholders must know where all of their contracts reside and can keep this information as metadata in their respective contract store.
- The contract ID does not change when the residence changes.

A domain change happens in two steps: transfer-out on the origin domain and transfer-in on the target domain. A domain change may be aborted using a transfer-abort.

At the moment, the participants learn the identity of the initiator of the domain change and the message broker (i.e., an external node) sees the IDs of the transferred contracts and the target domain. Better privacy guarantees are to be investigated in future work.

In some examples, the domain change protocol approach may be particularly advantageous as it does not necessarily require collaboration between all domains, but instead only the participants relevant to that contract and transaction. The domain change protocol is initiated by an initiator node 614. In some examples, the initiator node 613 is, or is associated with, the submitting node 110. In other examples, the initiator node can be other nodes, including the recipient node 120.

Figure 6:
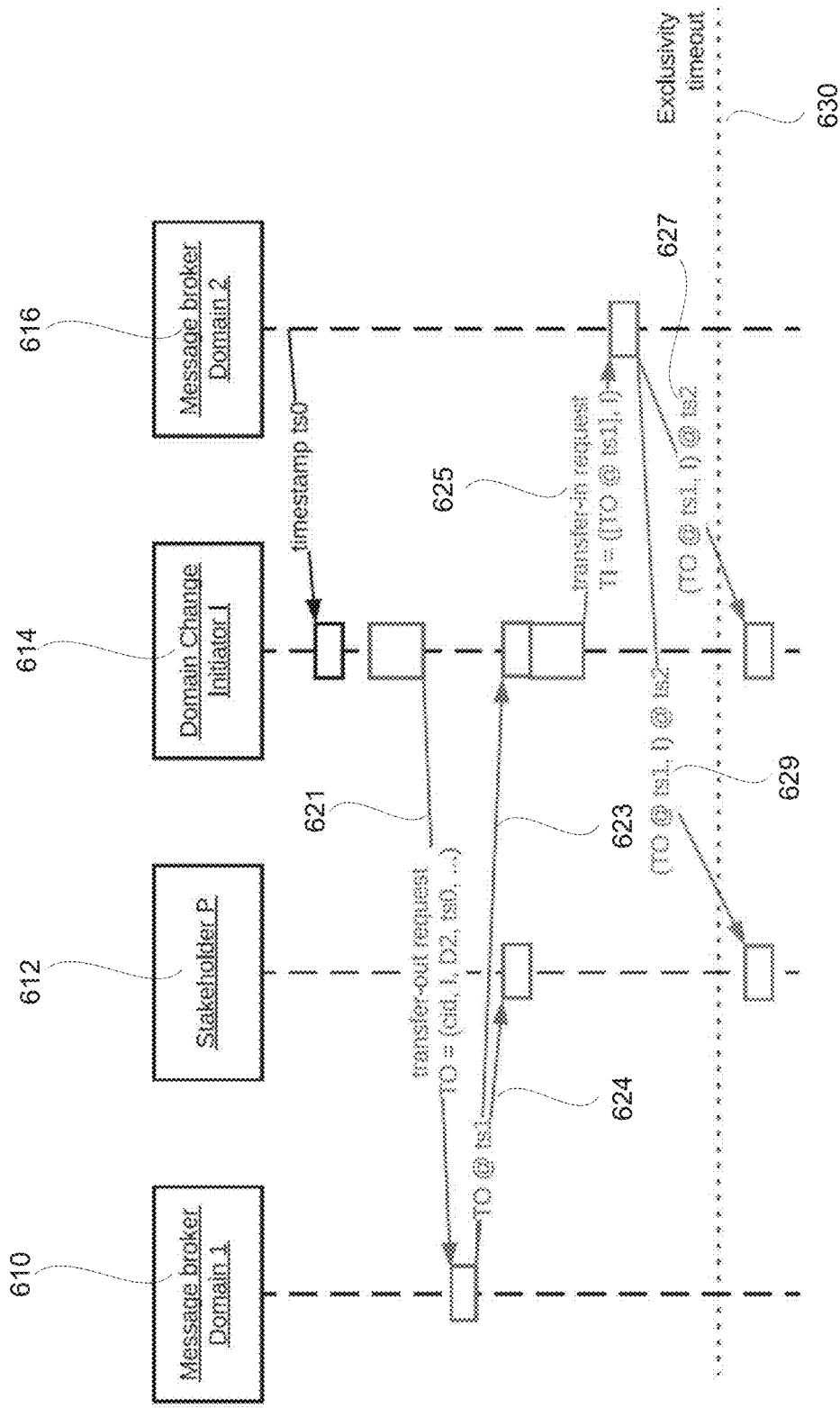
FIG. 6 is a schematic diagram of an example of a domain change from an origin domain to a target domain.

Two examples of domain changes will now be described with reference to FIGS. 6 and 7. In the first example, there is a contract with ID cid resident at domain 1 with stakeholders I and P. The initiator I 614 transfers the contract to domain 2 as shown in FIG. 6.

1. The initiator I 614 sends a transfer-out request 621 to the message broker 610 (i.e. external node) of the origin domain. The transfer-out request TO contains the contract ID, the submitter, the target domain, and a timestamp ts0 from the target domain.
2. The origin message broker 610 timestamps the request TO at time ts1 and sends 623, 624 it to the stakeholders 612 and the initiator 614. They consider the contract cid to be in transfer from time ts1 on.
3. The initiator 614 sends a transfer-in request TI 625 to the target domain's message broker 616 (i.e. external node of the target domain), which includes the timestamped transfer-out request.
4. The target message broker 616 timestamps the transfer-in request at time ts2 and sends 627, 629 it to the stakeholders 612 (i.e. those associated with the recipient node and/or submitting node) and the initiator 614. The stakeholders 612 then consider the contract to reside at the target domain from time ts2 onwards.

The transfer-out request 621 contains a timestamp ts0 from the target domain to establish the baseline for the exclusivity timeout 630 on the target domain. Before the exclusivity timeout 630, only the initiator node 614 may send a transfer-in request or a transfer-abort message to the target domain to complete the domain change or to abort it. This exclusivity timeout 630 gives the initiator 614 the time to start several domain changes for different contracts on possibly different origin domains and submit them in a single transfer-in message to the target domain, along with a transaction (not shown in the diagrams).

If the initiator 614 fails to complete or abort the domain change before the exclusivity timeout 630, the other stakeholders 612 of the contract may do so. This ensures that the initiator node 614 cannot keep a contract in transfer indefinitely and thereby deprive the other stakeholders 612 from their right to exercise choices on them.

Figure 7:
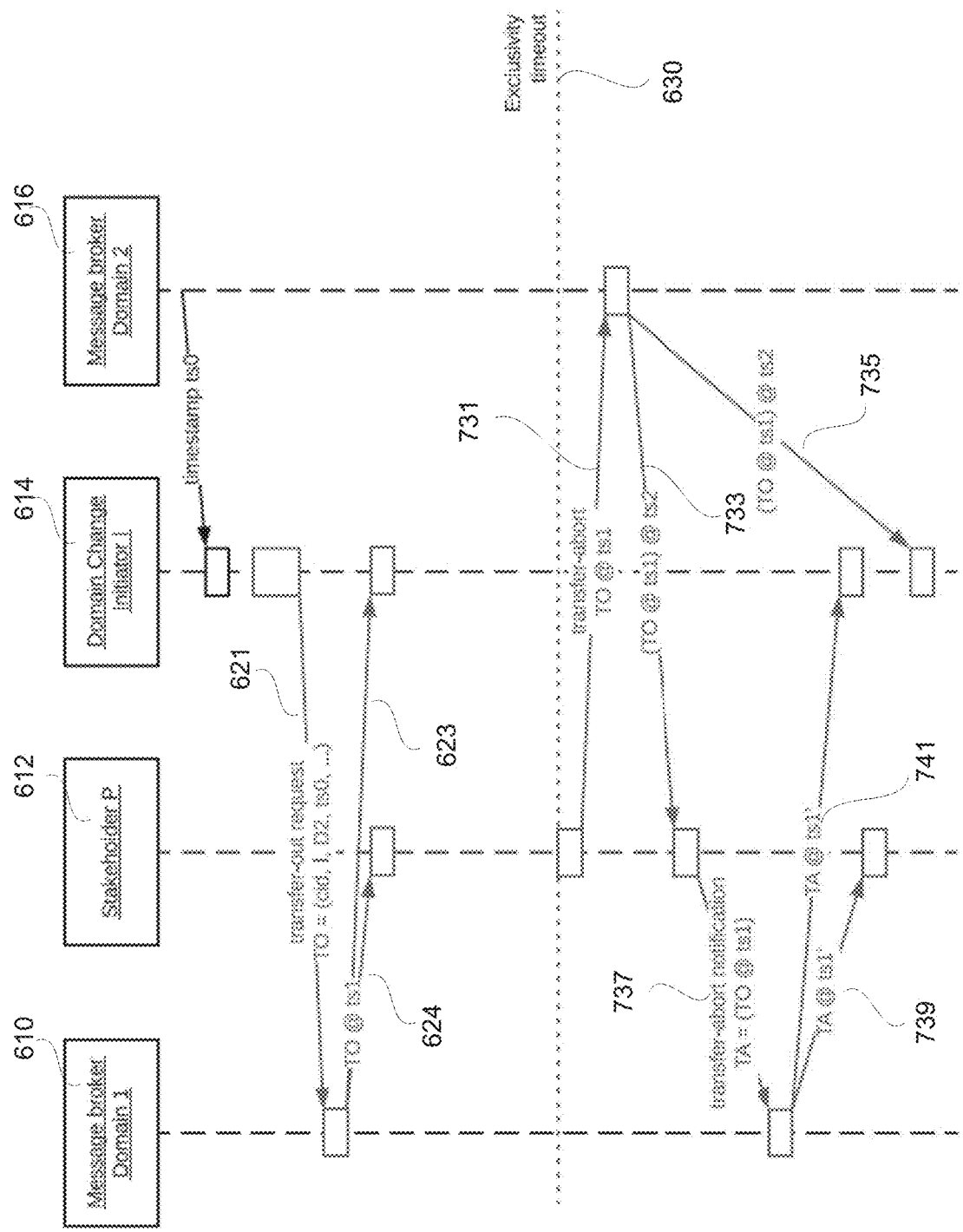
FIG. 7 is another example of a domain change from an origin domain to a target domain.

The second example, as shown in FIG. 7, has the same setting as the previous example, but after step 2, the initiator does not send the transfer-in request before the exclusivity timeout 630. Instead, the steps include the following:

3. The stakeholder P 612 sends 731 a transfer-abort message to the target domain 616.
4. The target domain 616 timestamps the transfer-abort at time ts2 and forwards 733, 735 it to the stakeholders and the initiator.

The initiator node 614 and stakeholder 612 therefore know that there has not been an earlier transfer-in message on the target domain. The contract itself is still in transfer because there has not yet been a timestamp on the origin domain. Therefore, 5. The stakeholder P 612 forwards 737 the timestamped transfer-abort as a transfer-abort notification to the origin domain message broker 610.
6. The origin message broker 610 timestamps this notification at time ts1' and forwards 739, 741 it to the stakeholders 612 and the initiator node 614. They consider the contract to reside at the origin domain again from ts1' onwards.
7. When receiving 735 the transfer-abort message from domain 2, the initiator node 614 checks that the target domain timestamp is after the exclusivity timeout 630 to ensure that stakeholder P 612 did not cut into their exclusivity time period.

Instead of aborting the domain change, stakeholder P could also have completed it by sending a transfer-in message. The protocol would then have continued like in the first example except that the initiator node 614 checks that stakeholder P's transfer-in message has been timestamped after the exclusivity timeout 630. Conversely, in the first example, the initiator 614 could have aborted the domain transfer instead by sending the transfer-abort message.

The above are examples of domain change protocols and it is to be appreciated that other types and variations of the protocol may achieve this result. Further details of one example of the protocols generally described in FIGS. 6 and 7 will now be described.

Not everyone is allowed to transfer a contract to another domain. Every stakeholder (which can be those associated with the submitting node, recipient node, or other affected node) can always transfer its contracts; the only restriction is that all stakeholders must have signalled beforehand they accept (or otherwise consent) the new domain. In this basic design, we assume that every participant declared at the beginning of time which domains consents to and that every participant knows these declarations To initiate a domain change, the initiator 614 sends 621 a transfer-out request 621 to the residence domain of the contract (such as via message broker Domain 1 610). Such a request contains the contract ID to be transferred, the initiator's identity and possibly a proxied initiator node, the target domain, a recent timestamp of the target domain (e.g., from a broker's heartbeat), and a justification for the right to change the domain. The timestamp sets the baseline for the time window during which the initiator 614 has the exclusive right to either abort the domain change or submit the transfer-in message on the target domain (When the initiator 614 is not connected to the origin domain of a contract, then he must ask a stakeholder 612 to initiate the domain transfer on his behalf. In that case, the actual initiator becomes the proxiedInitiator and the stakeholder the initiator.) The transfer-out request is addressed to all contract stakeholders 612 on the messaging layer. An example of the transfer-out request includes:

```
data TransferOutRequest = TransferOutRequest
    { contractID :: ContractID
    , initiator :: Party
    , proxiedInitiator :: Maybe Party
    , targetDomainID :: SiriusDomainID
    , targetTimestamp :: Signature SiriusDomainID Timestamp
    , justification :: (ProvenanceProof, Randomness) }
```

The origin's message broker 610 timestamps the request, sends 623 a submission confirmation to the initiator 614 and forwards 624 the transfer-out request along with the timestamp to all stakeholders 612. The allowance accounting component at the origin domain deducts a domain change allowance from the initiator's account.

The stakeholders P 612 perform the following checks on the transfer-out request, one or more, or all of the following:

i. The list of stakeholders 612 is complete.
ii. The submitter is the initiator 614 specified in the request.
iii. The target domain is acceptable to all stakeholders.
iv. The target timestamp has been signed by the target domain.
v. The justification is valid.
vi. The contract resides at the origin domain.
vii. There is no competing domain change or transaction with a smaller physical timestamp, and there was no transfer-abort message on the target domain for the same transfer-out request.

If checks (i) to (v) fail, the transfer-out request is malformed and the participant 612 reports malicious behaviour (out of band of the transfer protocol). If check (vi) fails, the stakeholder 612 rejects the transfer-out request 624. The rejection includes the current residence domain of the contract. If the contract currently is in transfer due to a racing domain change, the rejection says so. When the initiator 614 is not a stakeholder 612, check (vi) may also fail without races because the initiator 614 then is not informed about domain changes. In such a case, the rejection informs the initiator 612 about the new residence. If check (vii) fails, the stakeholder 612 rejects the transfer-out request 624. If all checks pass, the contract becomes in transfer, beginning with the origin timestamp on the transfer-out request. Contracts in transfer (temporarily) do not reside on any domain and no choices can be executed on them.

The stakeholders 612 confirm the transfer-out request via the message broker 610 of the origin domain to the initiator 614 within the transfer-out confirmation timeout defined by the domain rules. All checks only rely on data that all stakeholders 612 agree on. The stakeholders 612 therefore must all come to the same outcome. So there is no need for sending confirmations among them.

The transfer-in step registers the contract on the target domain. The stakeholders 612 and the (proxied) initiator 614, who have the transfer-out request with the origin message broker timestamp and signature, can so do by submitting a transfer-in message 625 to the target message broker 616. This right is exclusive to the initiator 614 for the time period between the transfer-out 621 and the exclusivity timeout 630. A single transfer-in message 625 may simultaneously register several contracts, even from different origin domains, and optionally include a DAML transaction (in the form of a request payload; the resource request message must be sent beforehand). An example of the transfer-in request includes:

```
data TransferInMessage = TransferInMessage
  { inContracts :: [TransferInRequest]
  , submitter :: Party
  , transaction :: Maybe RequestPayload }
data TransferInRequest = TransferInRequest
  { out :: TransferOutRequest
  , originTimestamp :: Timestamp
  , originSignature :: Signature }
```

When the target message broker 616 receives a transfer-in message 625, all the transfer-in requests get the same timestamp by the target domain and are sent 629 to the respective stakeholders 612 as transfer-in confirmation requests. If the transfer-in message contains a transaction, it gets the next timestamp.

When a participant 612 receives 629 a transfer-in confirmation request, it waits until it has received 624 and processed a corresponding transfer-out request from the origin domain 610. (Usually, the transfer-out request 624 arrives before the transfer-in message 629, but this need not be the case if network latencies vary.) Then, it performs the following checks:

(i) It has confirmed the transfer-out request on the origin domain as described in the transfer-out step.
(ii) It has not seen a transfer-in confirmation request or a transfer-abort notification with an earlier timestamp for this transfer-out request.
(iii) The transfer-out request specifies the correct target domain.
(iv) If the submitter of the transfer in message is not the initiator of the transfer-out request, then at least the exclusivity timeout 630 has elapsed between the targetTimestamp in the transfer-out request and the target broker's timestamp on the transfer-in confirmation request.
(v) If the initiator 614 is not a stakeholder of the transferred contract, then the participant remembers to check that the next timestamp from the message broker will be on a transaction that exercises a choice on the transferred contract.

If any of these checks fail, the participant 612 reports misbehaviour as described in the dispute resolution section. Otherwise, it considers the contract to reside on the target domain starting from the point in time indicated by the target message broker's timestamp on the transfer-in confirmation request. With this, the contract ceases to be in transfer (i.e., it resides in the target domain). It sends a confirmation to the initiator 614 and the proxied initiator via the target message broker 616. Otherwise, it sends a rejection to the initiator and all stakeholders.

If the (proxied) initiator node is not a stakeholder of the contract, the participant 612 checks that the message from the target message broker 616 with the next timestamp contains a transaction that exercises a choice on the transferred contract and the provenance proof contains the actor and the choice. If this is not the case, misbehaviour is reported.

Bundling several transfer-out requests into a single transfer-in message does not ensure atomicity of all transfers. Some may succeed and some may fail. The bundling merely ensures that all succeeding transfers get the same timestamp. This way, a bundle of contracts needed for a transaction may take up their residence at the same time. If they would be done in individual transfer-ins, there was the danger that the earlier ones get transferred out before all contracts reside on the same domain. If one of the domain changes fails, the transaction will also fail unless it does not exercise a choice on the untransferred contract, because the stakeholders of the contract will reject the transaction due to the contract not residing on the transaction's domain. Before the (earliest) exclusivity timeout, the initiator knows whether all domain changes will succeed, though, provided that he received one transfer-out confirmations for each contract on which he is not a stakeholder.

Each domain specifies an exclusivity timeout 630 for domain changes as shown in FIG. 7. During the exclusivity timeout 630, only the initiator 614 of the domain change is allowed to send the transfer-in or transfer-abort message. The timeout 630 baseline is established by the target domain timestamp that the initiator 614 used in the transfer-out request 621. The initiator 614 thus has an incentive to use the most recent timestamp, because this prolongs its exclusive right to advance the domain change.

During the exclusivity time window, the initiator 614 can collect the transfer-out request confirmations 623 and bundle several transfer-outs into a single transfer-in 625. The initiator 614 can thus ensure that all contracts required for a transaction are moved to the same domain or decide to abort the domain change if some failed. By including the transaction into the transfer-in request 625, no competing transfer-out can transfer some of the contracts away. The resource request message for the transaction shall be sent during the exclusivity time window (i.e. before the exclusivity timeout 630). The exclusivity period should therefore be sufficiently long such that the initiator 614 can also wait for the capacity rejection timeout before submitting the transfer-in message 625.

After the exclusivity timeout 630, the other stakeholders may initiate abort of the domain change to prevent initiator (s) keeping contracts in transfer indefinitely and to free resources.

Protocol for Multi-Domain Transactions

A multi-domain transaction spans contracts from multiple domains and does not require an explicit contract domain change. This section describes a protocol for multi-domain transactions with the following properties and assumptions:

The submitter must be connected to all domains where the contracts used or created in the transaction reside.
A participant is called a relay if it is a stakeholder to a subtransaction, whose input contract resides on one domain, and that itself has a subtransaction that happens on another domain.
The submitter of a multi-domain transaction is always a relay. All relays must be connected to all domains.
All other stakeholders need only be connected to the domains on which their contracts reside. In particular, there need not be a single domain to which all involved participants are connected.
Participants connected to multiple domains may have registered different keys with the identity managers of different domains.
The multi-domain transaction is executed atomically across all domains unless all relays or one of the message brokers do not act in a timely fashion or connectivity problems between all relays and one of the message brokers occur.
The same ledger-effective time is used across all domains.
There is a known bound on the clock difference between the different domains and on the clock drift.
The multi-domain transactions work with the confirmation request rules pessimistic reject and conditional verdict.
All involved domains must follow the same finality model (full confirmations or optimistic VIP confirmations).

Single-domain transactions can front-run multi-domain transactions.

Every contract resides at a single domain to which all stakeholders are connected and all stakeholders of a contract always know where it resides.

The submitter (associated with the submitting node 110) knows the residence domain of all input contracts to the transaction of which it is a stakeholder. Like in the domain change protocol, for input contracts on which the submitter is not a stakeholder, the submitter knows the residence at some point in time in the past. For contracts created in the transaction, the submitter also knows where these contracts are to be created. This can either be specified in the transaction itself (for example in a DAML transaction or DAML extension) or the submitter decides on its own. The domains involved in a transaction are all the domains where an input contract to the transaction resides or where the transaction creates a contract.

Figure 8:
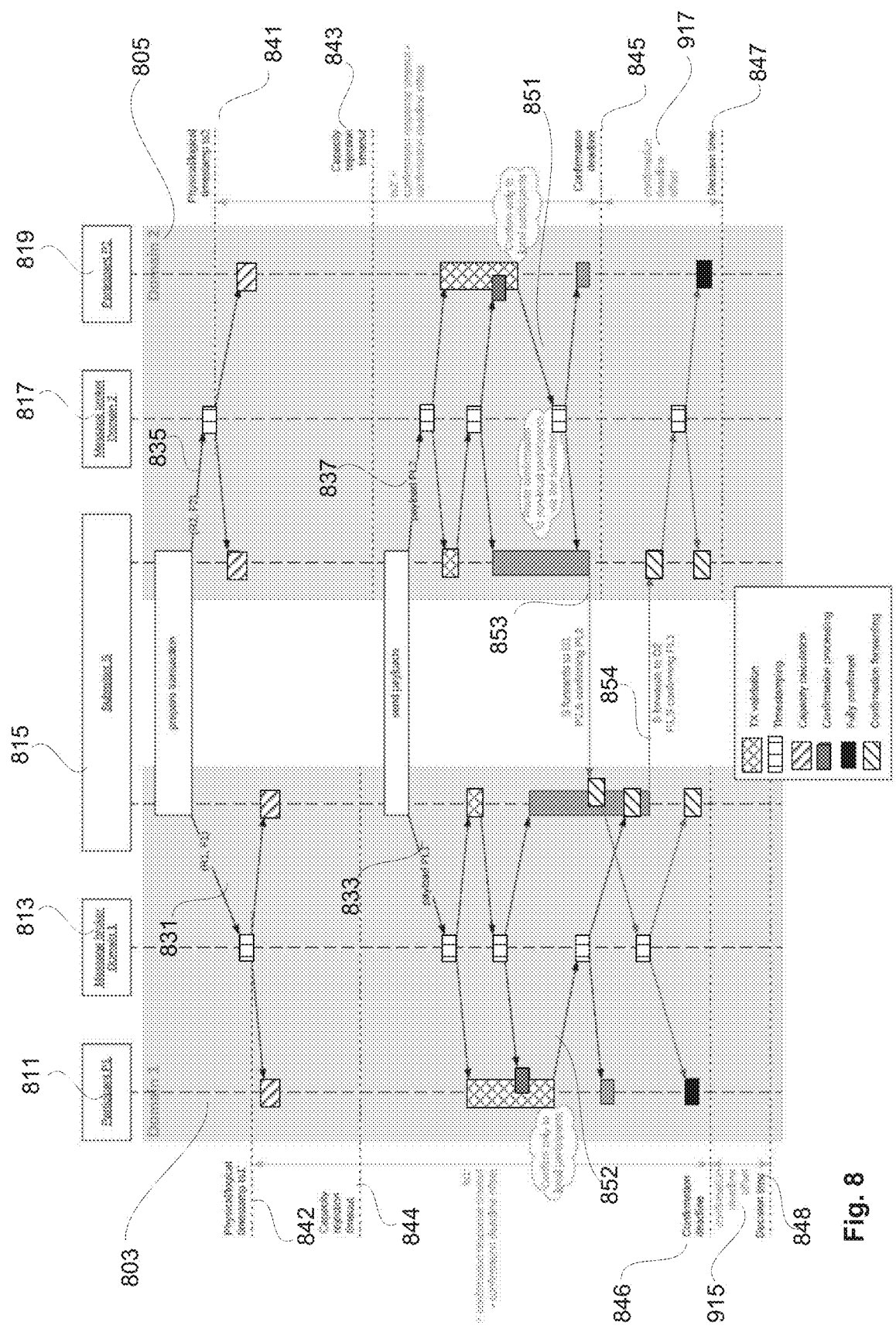
FIG. 8 is a schematic diagram of an example of a multi-domain transaction across two domains.

Referring to FIG. 8, a multi-domain transaction is split up into one part for each domain 803, 805. Each part executes like a partial single-domain transaction where some view payloads are missing in the confirmation request, namely those that affect contracts on other domains. All confirmations for all views must nevertheless be sent to all domains. To that end, the relays forward the confirmations from one domain to the other domains.

FIG. 8 illustrates the message flow for a simple two-domain transaction exercising choices on two contracts cid1 and cid2. The domain assignments are given by the following table:

| Domain | Connected participants | Resident contracts |
|---|---|---|
| D1 | S, P1 | cid1 with stakeholders S, P1 |
| D2 | S, P2 | cid2 with stakeholders S, P2 |

So the transaction involves the three participants: Submitting node 815, Participant 1 811, and Participant 2 819 and the two domains D1 and D2 (and respective message brokers 813, 817 of Domain 1 (D1, 803) and Domain 2 (D2, 805) that act as external nodes). There is no domain to which all participants involved the transaction are connected, but the submitter (submitting node) 815 is connected to all domains and thus acts as a relay. The submitter 815 splits the confirmation request of the whole transaction into two partial single-domain transactions, one for each view. It then sends concurrently each part to the appropriate message brokers 813, 817 (i.e., the two external nodes of respective domains D1 and D2). Each part consists of the two messages, resource request 831, 835 and request payload 833, 837, where the submitter 815 must ensure that it sends the payloads 833, 837 only after it has made sure that no participant rejected the resource request 831,835 on any domain 803, 805 (e.g., by waiting until all capacity rejection timeouts have passed). Each partial single-domain transaction is processed like in the single-domain case with the following exceptions:

1. The expected confirmations 851, 852 include also the pseudonymous participants on other domains. The relays (which in this example is submitter node 815) are then responsible for forwarding 853, 854 the confirmations via the other domain's message broker 813, 817 to the intended recipients 811, 819.

2. The confirmation deadline 845, 846, which determines the time when participants 811, 819 must have sent their confirmation responses 851, 852 to the local message broker 817, 813, is earlier than the decision time 847, 848 (even with respect to the message broker's clock) by the confirmation deadline offset, which the submitter 815 chooses subject to some constraints. Confirmations 851, 852 from remote domains must have reached the domain's message broker (external nodes) 813, 817 by the decision time 848, 847. The offset between confirmation deadline and decision time gives the relays time to collect the confirmations from one domain and forward it to the other domain and to hide clock skew and varying confirmation response timeouts between the domains 803, 805.

Figure 9:
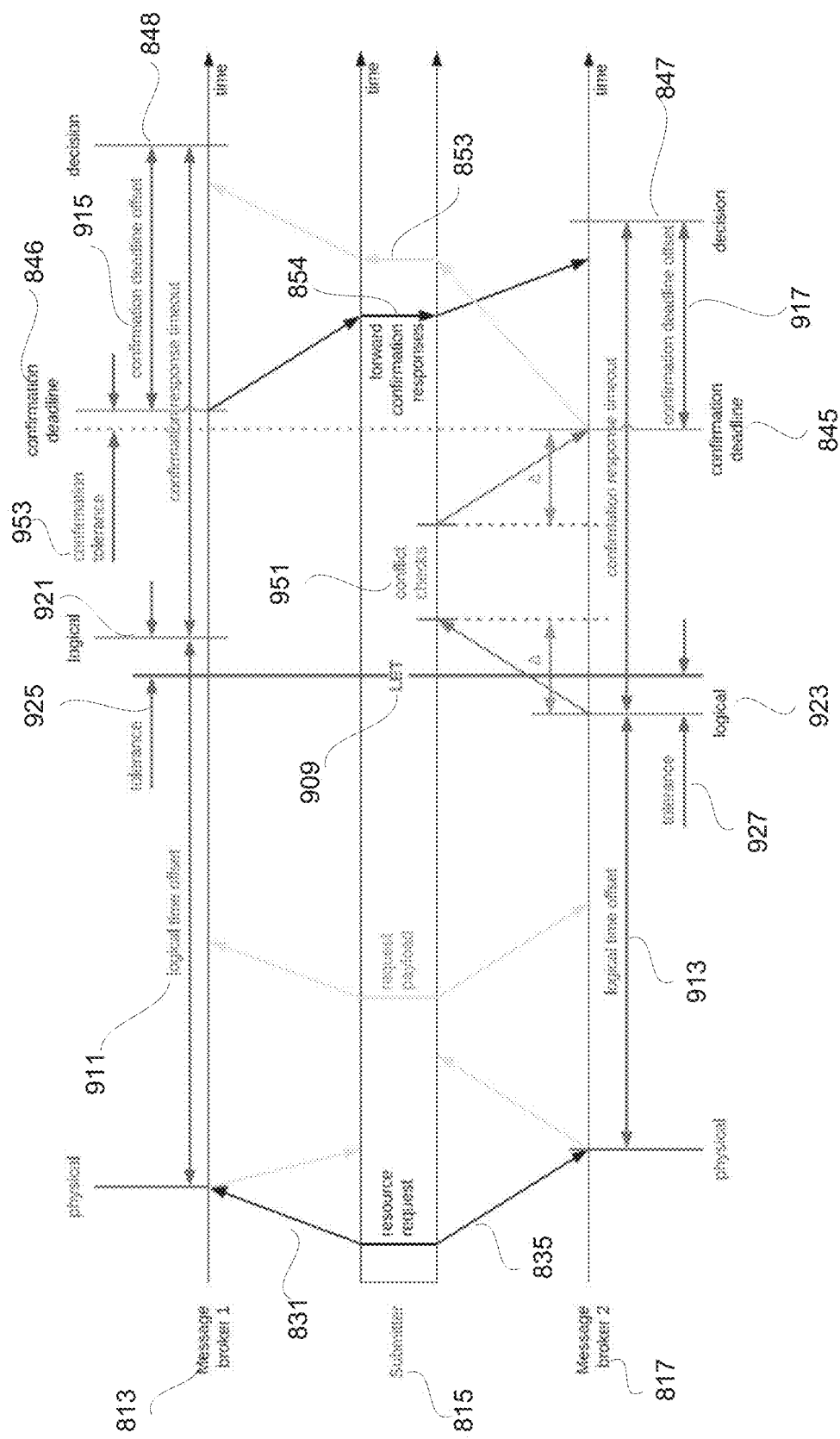
FIG. 9 is a diagram illustrating various deadlines in the multi-domain transaction of FIG. 8.
Figure 10:
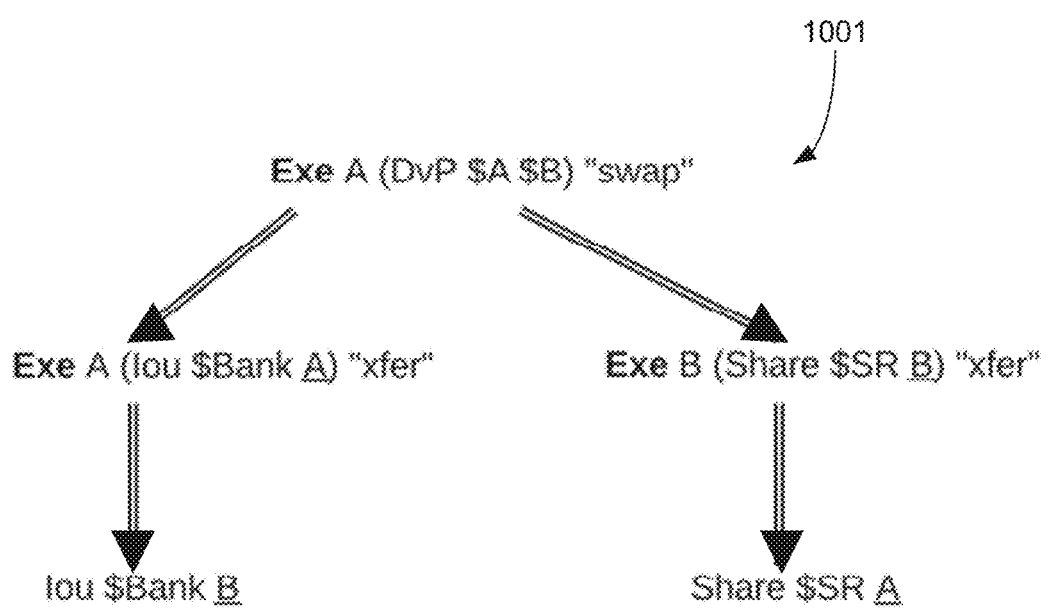
FIG. 10 illustrates another example of a transaction involving multiple participants that can be implemented in a single domain.

FIG. 9 illustrates how the various deadlines are determined and work together. The submitter (submitting node) 815 chooses:

The ledger effective time (LET) 909 for the evaluation.
The logical time offset 911, 913.
The confirmation deadline offset 915, 917.

The LET must be the same across the whole multi-domain transaction. The offsets, 911, 913, 915, 917 can be chosen differently for each domain 803, 805.

When the partial transactions are sent 831, 835 to the individual domains, each receives a physical timestamp that determines all time points on the particular domain as follows:

Logical time=physical time+logical time offset 911, 913.
Decision time 847, 848=logical time+confirmation response timeout 915, 917.
Confirmation deadline 845, 846=decision time 848, 847-confirmation deadline offset 915, 917.

Each point in time is tied to its domain 803, 805. So the absolute time of these time points vary across domains. In FIG. 9, the submitter 815 has chosen a longer logical time offset 911 for Domain 1, 803 (e.g., because it expected the resource request transmission to take longer on Domain 2, 805) and the logical time 921 on Domain 1, 803 indeed comes after the logical time 923 on Domain 2, 805 with respect to wall-clock time.

The submitter 815 should choose the logical time offsets 911, 913 based on its experience with the domains' network latencies such that the all domains end up with a similar logical time. This is because the ledger effective time 909, which is the same on all domains, must be close to the logical time 921, 923 of each domain, as determined by the tolerance 925, 927 of the domain rules.

The submitter (submitting node) 815 should pick the confirmation deadline offset 915, 917 such that every relay has enough time to forward 853, 854 the confirmation responses in the time between the confirmation deadline 845, 846 of the source domain and the decision time 847, 848 of the target domain of the forwarding (for all combinations of source and target domain). However, the offset 915, 917 must be small enough such that every participant on every domain has enough time to check 951 for conflicts between when it observes the logical timestamp from the domain and when it must send out the confirmation response such that it arrives before the confirmation deadline 845, 846 at the broker 813, 817.

Since the submitter 815 chooses these times, it might have an advantage over other relays. To prevent this, the submitter 815 must choose a confirmation tolerance 953 that bounds how far the confirmation deadlines 845, 846 may lie apart on any two domains. The larger the tolerance, the longer the confirmation deadline offset 915, 917 must be.

Use Case Example of Multi-Domain Transaction: Global Collateral

An example of a multi-domain transaction will now be described in the context of a global collateral for multi-domain transaction. The key synchronisation and privacy requirements of the global collateral are captured in the generic atomic swap.

In the global collateral use case, two parties A and B want to atomically swap two assets X and Y owned by A and B, respectively. For simplicity, we assume that every party runs its own participant node. Ownership of asset X is recorded on one exchange $EX_1$ by the exchange's asset registry R1. Ownership of asset Y is recorded on another exchange $EX_2$ by the other exchange's asset registry $R_2$. Each exchange $EX_i$ runs its own domain $D_i$ and the exchanges' asset registries are only connected to the corresponding exchange domain, i.e., Ri is connected only to Di. Parties A and B are connected to both domains.

The atomic swap is captured in a DvD (delivery versus delivery) contract, in which one of the two, say A, can exercise a choice to execute the swap. This choice comes with two sub-transactions: where A transfers X to B; and B transfers Y to A, respectively. This contract may reside on another domain $D_3$, to which both A and B must be connected since they are stakeholders.

This transaction meets the requirements of a multi-domain transaction: The asset registries $R_1$ and $R_2$ are not relays because they each see only a single transfer on their exchange's domain, and they therefore need not be connected to the other domains. In fact, they do not care whether the transaction executes atomically across all domains. In contrast, A and B are relays and they both are connected to all three domains. Atomicity is crucial to both. For if A's transfer of X to B succeeds, but B's transfer of Y to A fails, A is left without any asset.

The case for B is symmetric. So both of them have an interest in timely relaying messages between the domains.

This transaction cannot be executed with the "domain change protocol" (as discussed above) because there is no domain to which all stakeholders are connected to.

The remainder of this section describes the details of multi-domain transactions and how they differ from single-domain transactions.

Transaction Submission

Submitting a multi-domain transaction differs from a single-domain transaction in the following aspects:

View formation takes the contract residence into account. When the traversal of the transaction tree visits a subtransaction of a top-level transaction, a new box is created when:
- the subtransaction's contract (input or create) resides on a different domain than the parent node's input contract, or
- the stakeholder sets differ (like in the single-domain case). Every box is annotated with the domain that it is associated to.

Referring to FIG. 8, the submitter prepares a confirmation request consisting of a resource request 831, 835 and the payload message 833, 837 for each domain involved in the transaction. Each resource request and payload message for a domain D is prepared like in the single-domain case with the following modifications:
- The resources and allowances fields in the resource request aggregate only the resource requirements and transferred allowances of views sent via D. Additionally, every relay gets assigned a resource bound on all domains for relaying confirmation responses.
- Bandwidth refers to the size of the payloads sent via D.
- The payload data contains only the action descriptions of the views sent via D.
- The list "allStakeholders" contains only the pseudonyms of the stakeholders of boxes sent via D. If some relay P (including the submitter) is not among them, but nevertheless connected to D, the submitter artificially creates a pseudonym for P and adds it to "allStakeholders"
- The list of expected confirmations contains the confirmations required from all domains. For every confirmation, the domain ID is set, even if confirmations are sent over the domain to which the payload message will be sent.
- The "multiDomain" field is set in the resource request as described below. This field in particular defines a confirmation deadline offset and tolerance, which is explained below.

```
data MultiDomainData = MultiDomainData
    { confirmationDeadlineOffset :: TimeDistance
    , confirmationTolerance       :: TimeDistance
    }
```

- The logTimeOffset is increased by the confirmation deadline offset
- The "multiDomain" field in the request payload metadata is set with the list of resource IDs on other domains.

```
data MultiDomainPayloadData = MultiDomainPayloadData
    { remoteRequestIds :: [(DomainID, RequestID)]
    }
```

The multi-domain transaction metadata in the resource request contains the following information:
The submitter picks for each domain an offset for the confirmation deadline. Participants on a given domain must send their confirmations before logical time+crt=confirmationDeadLineOffset instead of logical time+crt where crt is the confirmation response timeout from the single-domain case. The confirmation deadline offset must satisfy the following constraint:

confirmationDeadLineOffset<crt−2*Δ where Δ is the expected network delay for communicating with the domain's message broker. Additionally, it must satisfy 2*Δmax+confirmationTolerance+skew≤confirmationDeadLineOffset where Δmax is the maximum expected network delay from any involved participant to any involved domain it is connected to and skew is an upper bound on the clock skew between any two domains.

The confirmation deadline offset gives the submitter (and other participants) the time to act as a relay for forwarding the confirmations from one domain to another. The upper bound ensures that all participants have enough time to send the confirmation response after they observe the logical time. The lower bound gives the relays time to forward confirmation responses between the domains.

The confirmation tolerance specifies how far the confirmation deadlines on the different domains may lie apart. The better the submitter can predict the physical timestamps on the different domains, the closer the actual confirmation deadlines will lie and the lower the tolerance it can choose.

Instead of the payload requests, the submitter 815 can abort the transaction. Aborts are needed if:

A resource request gets rejected on one of the domains. The whole transaction thus must be rejected.

The physical timestamps have drifted too far off such that the confirmation tolerance have been exceeded.

When the message broker receives the resource request or the request payload, it deals with them like for a single-domain transaction. In particular, the submitter must pay the submission allowance on every domain.

Processing Confirmation Requests

Confirmation requests 831, 833, 835, 837 are processed like for a single-domain transaction except for the following aspects.

The participant checks that the "RemoteRequestIDs" field contains no duplicate domain IDs and exactly one entry for every domain mentioned in the expected confirmations. Every participant derives a new request identifier from the request ID given in the payload request and the remote request IDs. The derivation must be independent of the order of the remote request IDs. The new request identifier is used for the confirmation responses.

The confirmation deadline for the transaction is determined by phys_ts+log TimeOffset+crt−confirmationDeadlineOffset The capacity monitor uses the modified confirmation deadline to determine whether a transaction fits into the capacity promises.

The participants check that

2*Δmax+confirmationTolerance+skew≤confirmationDeadlineOffset<crt−2*Δ−skew

For request payloads 833, 837, the participant additionally checks the following:

The resource request 831, 835 and the request payload, 833, 837 have been sent via the same domain 803, 805. For exercises, the input contract resides on the domain over which the confirmation request was sent. For creates, the domain of the request payload is acceptable to all stakeholders.

For each action, the participant checks that it will have received boxes for all subtransactions of which it is a stakeholder by the time when it sends the confirmation response.

If a subaction of the view acts on a different domain, the participant considers itself as a relay.

If a subaction of the view acts on a different domain, the participant checks before it sends its confirmation all of the following:

The physical timestamps of all remote request ID in "remoteRequestIDs" lies at least confirmationTolerance+Δmax+skew before the confirmation deadline of the view.

It has received the resource requests on all domains listed in "remoteRequestIDs".

Every pair of confirmation deadlines of all those requests is at most "confirmationTolerance" apart.

The correct domain ID is set for the expected confirmations for the action boxes that are sent to the participant.

When cross-checking the metadata and the action boxes, the participant checks for all subactions on the same domain. If the participant is a relay, it performs this cross-check also all subactions on other domains with the "allStakeholders" lists sent via the corresponding domain. (The list of expected confirmers is checked for all subactions in any case.)

The participant sends the confirmation response to the pseudonyms from the list "allStakeholders". It checks that they receive the expected confirmations from all domains. The multi-domain data and when generating the confirmation response contains the confirmation tolerance.

--- data MultiDomainConfirmationData = MultiDomainConfirmationData
  { confirmationTolerance :: TimeDistance
  }

---

In case of racing transactions, multi-domain transactions are always handled according to the pessimistic reject rule, even if conditional verdicts are used for single-domain transactions.

Consequently, if the logical timestamp of the multi-domain transaction falls between the logical time and the confirmation deadline for another (single or multi-domain) transaction, the multi-domain transaction is rejected outright. This makes multi-domain transactions second-class citizens, especially as multi-domain transactions typically have longer logical time offsets.

Processing Confirmation Responses

Confirmers (such as participant's nodes 811, 819 operating as receiving nodes) process confirmation responses identically to single-domain transactions except that every participant additionally checks that the multi-domain data in the confirmation contains the same confirmation tolerance it has received in the resource request 831, 835. A participant considers the transaction to be finally approved on a given domain 803, 805 if all expected confirmations have arrived via this domain. In particular, if a participant occurs with different pseudonyms on different domains, it must act with respect to final approval as if it was two separate entities. So the participant may consider the transaction finally approved on one domain (e.g. 803) whereas it is still pending on another domain (e.g. 805). In particular, the participant can base his decisions on subsequent confirmations on the final approval on one domain whereas it must not do so on other domains. The semantics of single-domain transactions nevertheless ensures that all stakeholders of a contract agree on its state, because a contract can reside only at one domain. Moreover, the different states with respect to finality will have converged when the latest decision time has passed, unless timeouts, disputes, and crashes occur.

A participant node considers itself a relay if it considered itself as a relay for any of the views it has received. When a relay receives a confirmation response from one domain, it performs the same checks as in the single-domain case. In addition, it does the following:

It collects confirmation responses from all domains.

When sufficiently many confirmation responses from one domain have arrived (as determined by the list of expected confirmations), the relay sends all confirmations to all participants over the other domains. The relay must not omit participants with pseudonyms on other domains even if they are stakeholders of the contract, because every participant connected to multiple domains acts as if it was a separate entity on each domain.

Since the submitter has created a pseudonym for all relays on all domains, all relays receive all confirmation responses and can therefore forward them. The relays can also forward confirmation responses immediately instead of collecting them first and then sending them in a single batch. To avoid unnecessary traffic, a relay shall forward a confirmation response only to domains on which it has not yet received the confirmation response. As all forwards race against each other, the same confirmation response may be sent over a domain several times with different timestamps. Everyone can ignore the confirmation response forwards with the later timestamps.

Atomicity Across Domains

In some examples, the confirmation responses 851, 852 must be sent by the local confirmation deadline 845, 846. Responses from other domains need only arrive by the decision time 847, 848. These two time-stamps represent the end of the two phases in a two-phase-commit protocol: All participants must send prepare to commit to the submitter by the confirmation deadline and they can expect the commit or abort by the decision time 847, 848.

The classical two-phase-commit protocol cannot combine hard timeouts with atomicity. Consequently, multi-domain transactions may execute non-atomically if some confirmation responses are not forwarded 851, 852 to all domains 803, 805 before the domain-specific decision time 847, 848. In the introductory example, suppose that the submitter 815 delays the forwarding 854 of Participant 1's 811 and Submitter's confirmations of PL1 to domain 805 until after the decision time 847 on domain 805. Then, Participant 1 811 and Submitter 815 consider the transaction on domain D1 approved. In contrast, Participant 2 819 considers the confirmation PL1 854 on domain D2 to have timed out and can raise a dispute against the submitter. Depending on the second domain 805 dispute rules, the transaction may be rejected on domain 805. So the transaction has not been executed atomically. However, we argue that only the submitter 815 cares about atomicity in such an example and it was the submitter's fault that atomicity is violated. So nobody can complain about the transaction not having been executed atomically.

In general, only certain parties care about the atomicity of (parts of) a transaction, not the system as a whole. More formally, let $tx=[a_1, a_2, \ldots, a_n]$ denote the transaction of interest. Every action $a_i$ itself creates a contract or exercises a choice $ch_i$ on the contract $c_i$. Every exercise $a_i$ itself contains a subtransaction $tx_i$ of further actions $a_{i,j}$ with further subtransactions $tx_{i,j}$, and so on. The authorizers of the exercise $a_i$ may care about the subtransaction $tx_i$ being executed atomically because they were promised atomicity when the input contract to the exercise was created. Similarly, the authorizers of $a_{i,j}$ care about the atomicity of $tx_{i,j}$. Since $t_{x,i,j}$ is a subtransaction of $tx_i$, the authorizers of $a_i$ also care (transitively) about $tx_{i,j}$ being executed atomically. For the top-level transaction tx, the submitter cares about its atomicity. In summary, for a (sub)transaction tx . . . , the submitter 815 and all authorizers 811, 819 on the path from the root to the subtransaction care about its atomicity. No other party should care whether tx . . . is executed atomically. In particular, if a party is a stakeholder in subtransaction $tx_{i1}$, but not in subtransaction $tx_{i2}$ then it does not care whether $tx_{i2}$ executes atomically, because it cannot even know about $tx_{i2}$ due to DAML's privacy model. Only the submitter cares about all top-level actions executing atomically.

Moreover, if a party is an authorizer of $a_{i,j}$ and of $a_{i,k}$ with $j \neq k$, but it is not an authorizer of $a_i$, then it must not care whether the two subactions are executed atomically or not. In particular, such a party's participant need not be a relay.

Given this notion of atomicity, every participant can itself ensure atomicity of the subtransactions it cares about, as the following argument shows.

A participant considers atomicity of a multi-domain (sub) transaction tx violated if one subtransaction $tx_1$ of tx is approved on some domain (e.g. first domain $D_1$) and another subtransaction $tx_2$ of tx is rejected on another domain (e.g. second domain $D_2$).

There is no need to consider $D_1=D_2$ or $tx_1=tx_2$, i.e., conflicts on a single domain or on a single subtransaction, because the single-domain subprotocol ensures integrity and atomicity within one domain. In particular, we can ignore participants that are not relays.

So $D_1 \neq D_2$ and consequently $tx_1 \neq tx_2$. The atomicity violation can only happen if all expected confirmations for the whole transaction tx have reached domain $D_1$ but not $D_2$. It suffices to show that the participant can avoid this situation by forwarding confirmation responses in time.

Let $tx_i$ be any subtransaction whose confirmation responses have reached $D_1$, but not $D_2$. Let $D_i$ denote the domain over which $tx_i$ is sent. Since the relay is connected to all domains involved in the transaction, it is in particular connected to $D_i$. Since it has received the resource request and the payload request via $D_i$, it is part of the "allStakeholders" list send via $D_i$. Since the confirmations for $tx_i$ have reached $D_i$, they must have been sent over domain $D_i$ before the confirmation deadline. Assuming that the message broker correctly implements the messaging API, the relay has received these confirmations in time. It forwards these responses to all domains, in particular $D_2$. So the responses will arrive on domain $D_2$.

It remains to show that the relay can forward the confirmation responses in time. The relay receives them from domain $D_i$ before time (as measured by $D_2$'s message broker)

confirmationDeadline$i$+Δmax+skew so if the participant immediately forwards them, they reach $D_2$'s message broker before confirmationDeadline$_i$+2*Δmax+skew The relay has checked while processing the confirmation responses that confirmationDeadline$_i$≤confirmationDeadline$_2$+confirmationTolerance 2*Δmax+confirmationTolerance+skew<confirmationDeadlineOffset$_2$ Since decisionTime$_2$=confirmationDeadline$_2$+confirmationDeadlineOffset$_2$, we have the desired relationship confirmationDeadline$_i$+2*Δmax+skew≤decisionTime$_2$ Timeouts in Multi-Domain Transactions It is the submitter 815 who chooses the parameters that chooses the timeouts on the various domains 803, 805. It is therefore responsible for forwarding 853, 854 the confirmation responses between the domains, for it should choose the parameters such that it is going to be able to actually achieve the forwarding within the timeouts the submitter node 815 sets for itself. All other participants 811, 819 to the transaction merely check whether the submitter 815 has chosen the timing parameters such that they are likely able to do their respective tasks in time and enforce their interest in the transaction.

Nevertheless, timeouts may occur. The participants 811, 819 become aware of the multi-domain nature of a transaction only when they receive the confirmation payloads 833,837, as this is when the list of expected confirmations and the list of request Ids is sent. This section therefore focuses only on timeouts of confirmation responses 851, 852 and ignores timeouts of request payloads.

If a participant 811, 819 notices that a confirmation on the same domain is missing from a participant at the confirmation deadline 845, 846, the participant 811, 819 can raise a dispute on the appropriate domain like for single-domain transactions. If a participant notices that a confirmation response is missing from another domain, the participant 811, 819 can raise a dispute against the submitter 815 on the local domain 803, 805. This makes the submitter 815 the main responsible node for forwarding 853, 854 confirmations across domains 803, 805. Conversely, all other relays may do so in their own interest, but they are not obliged to do so. Even if it is not the submitter's fault, say because a participant on another domain has not sent its confirmation in time, the dispute is targeted against the submitter 815.

The submitter 815 itself can then raise a dispute on the other domain Even if the submitter wins the latter dispute and loses the former, it bears the risk that the effects of the two disputes do not cancel out.

If a timeout occurs, the transaction may not execute atomically. As discussed in the previous section, every participant 811, 819 is able to ensure the degree of atomicity it has an interest in. Yet, a participant 811, 819 may be involved in several domains 803, 805 of a multi-domain transaction and yet have no interest in its atomicity (e.g., because all its views execute on a single domain and it is thus not a relay). In such a case, the participant 811, 819 may observe that the transaction is not atomic.

Depending on the dispute rules, the participant 811, 819 may have to consider the transaction having both succeeded and failed. More precisely, every effect of the transaction (contracts being created or archived) is tied to the residence domain. The effect takes place as soon as the transaction is approved on the residence domain, independent on the outcome on other domains.

However, the timeouts do not create an opportunity for double spends: As every contract resides only at a single domain 803, 805, the two transactions involved in a double spend must execute on the same domain. Since all stakeholders always agree on the state of a contract, all stakeholders would have to lie about the contract being unspent for the second transaction.

Detecting Misbehaviour in Multi-Domain Transactions

Like for single-domain transactions, participants can misbehave in multi-domain transactions. This section identifies the cases of misbehaviour that are specific to multi-domain transactions. The measures against misbehaviour that can occur with single-domain transactions remain the same.

i. Inconsistent Information

Since the resource request 831, 835 and request payload 833, 837 messages are split up across domains 803, 805, the messaging API cannot ensure any more that all participants receive the same message parts. In detail, the submitter 815 could send inconsistent information to different domains 803, 805. The participant's nodes 811, 819 can detect the following inconsistencies and raise the appropriate dispute on their domain. The dispute rules still need to be extended to cover all these cases.

LET: Every participant includes the LET from the payload request in its confirmation response. When a participants processes a confirmation response, it checks that the LET is the same as the LET it has seen. If the submitter sends LETs for different views, at least all relays will notice the difference. (If none of the relays checks, then no honest participant cares about atomicity, i.e., about LET consistency.)

Remote request IDs: All participants derive a transaction identifier from all request IDs, which they use in their confirmation responses. If a participant receives a different list of request IDs, the derived transaction identifier will be different. Therefore, the other participants will not approve these confirmations and raise a dispute (either because of ill-formedness or missing confirmations) against the participant (same domain) or the submitter (other domain). The same-domain case can only occur if the message broker does not implement the messaging API as specified.

Expected confirmations: Every confirmation response contains a hash of the expected confirmations. Different lists of expected confirmations have different hashes and will therefore cause a dispute about ill-formed confirmation responses.

Confirmation tolerance: The confirmation tolerance is included in the confirmation responses and participants check that the value in the confirmations is the same as in the resource request they have received. Different confirmation tolerances will therefore cause a dispute about ill-formed confirmation responses.

ii. Ill-Formed Parameters¶

In a multi-domain transactions, the submitter specifies the following parameters in addition to those for a single-domain transactions:

Timing parameters "confirmationDeadlineOffset" (per view) and "confirmationTolerance"

Domain IDs in expected confirmations

Remote request IDs

The "confirmationDeadlineOffset" is chosen per domain whereas the other parameters are chosen for the transaction as a whole. These parameters are subject to constraints that every participant checks while processing the confirmation request. If the constraints are violated, the participant raises a dispute against the submitter because of an ill-formed message on the domain via which the ill-formed message was sent.

Most checks only involve the participant's local knowledge and can therefore be certainly executed. The only exception are the checks performed by relays on views with a subview on a different domain. If a relay has not received the messages from the other domains that it needs for the checks by the confirmation deadline, then the relay sends a rejection. However, the check that the physical timestamps lie before all the confirmation deadlines by at least skew+"confirmationTolerance"+$\Delta$max ensures that under normal network operations, the relay will have received all necessary messages by the confirmation deadline. If not, the relay can raise a dispute about the missing request payload against the submitter. The check also ensures that all honest relays come to the same verdict, independent of network delays. (If a resource request takes more than skew+"confirmationTolerance"+Δmax time to travel from the message broker to the relay, then the relay should raise an SLA dispute with the message broker or its ISP.)

Every stakeholder of a contract additionally checks that the view is sent via the right domain. For exercises, it may happen that the input contract does not reside on the domain. This may happen under normal operations, i.e., without malice. If this check fails, no dispute is raised. Instead, the stakeholder sends a rejection, which includes the current residence of the contract, like in the domain change protocol.

Interplay with Domain Changes

Atomicity puts a burden on the relays of a multi-domain transaction as they must actively ensure that confirmations are forwarded in time. Therefore, a participant 811, 819 may want to refrain from acting as a relay in any multi-domain transaction. Unless the participant is connected only to a single domain, it cannot ensure this, though.

Identity Manager and Multiple Domains

One or more identity manager nodes 170, 270 can be provided, and in some examples, different domains have respective identity managers 170, 270. The identity manager nodes (and identity manage system in general) can have the same trust and topology as the synchronization system. The system(s) may be configured such that domains can be created by any node and any participant node can connect to any domain, so long as the participant obtains authorization from the domain operator. That is, the system does not have, or require, a single global identity manager.

Each of the participant nodes 110, 120, 210, 220, 811, 815, 819, external nodes 130, 230, 813, 817 and/or mediator 280 may have a local component called an Identity Providing Service Client (IPS Client). The IPS Client established a connection with the identity manager 170, 270 of the domain to read and validate the identity information of the domain (and/or participants). The IPS client exposes a read API providing aggregated access to the domain topology information and public keys provided by the identity manager 170, 270 of one or more domains.

The identity manager 170, 270 receives keys and certificates through some process and evaluates the justifications, before presenting the information to the IPS Clients of the participant nodes or other domain entities. The IPS Clients verify the information. The local consumers of the IPS Client read API trust the provided information without verifying the justifications, leading to a separation of synchronisation and identity management.

The identity manager 170, 270 and IPS Client may be designed with one or more of the following considerations:

Mapping of Parties to Participants. Query the state at a certain time and subscribe to a stream of updates associating a known identifier of a party to a set of participants as well as the local participant to a set of hosted parties. Mapping to a set of participants satisfies the high-level requirement on parties using multiple participants.

Participant Qualification. Query the state at a certain time and subscribe to a stream of updates informing me about the trust level of a participant indicating either untrusted (trust level of 0) or trusted (trust level of 1).

Participant Relationship Qualification. A party to participant relationship is qualified, restricted to submission (including confirmation), confirmation, and observation (read-only). This also satisfies the high-level requirement on read-only participants.

Domain aware mapping of Participants to Keys. Query the state at a certain time and subscribe to a stream of updates mapping participants to a set of keys per synchronization domain.

Domain Entity Keys. Query the current state and subscribe to a stream of updates on the keys of the domain entities.

Lifetime and Purpose of Keys. Learn for any key received for what it can be used, what cryptographic protocol it refers to and when it expires.

Signature Checking. Given a blob, a key obtained from the IPS and a signature, verify that the signature is a valid signature for the given blob, signed with the respective key at a certain time.

Immutability. The history of all keys preserved within the same time boundaries as audit logs such that it can be used to audit participant or domain entity logs.

Evidence. For any data received from the Identity Manager, get the set of associated evidence to prove arguments in a legal dispute. The associated evidence contains a descriptor which can be used to read up in the documentation on the definition of the otherwise opaque blob.

Race Condition Free. Confirm certainty about the validity of a key with respect to a transaction such that there cannot be a disagreement on the validity of a transaction due to an in-flight key change.

Querying for Parties. Query using an opaque query statement, the Identity Manager for a party and will receive results based on a privacy policy not known to the specific participant node/IPS Client.

Party metadata. Access metadata associated with a party for display purposes.

Equivalent Trust Assumptions A federation protocol of the reference identity management service needs to be based on equivalent trust assumptions as the interoperability protocol such that there is no mismatch between the capabilities of the two.

The identity manager system can be constructed with the following further considerations. The synchronisation protocol is separated from the identity protocol. However, in order to leverage the composability properties of the synchronisation protocol, an equivalent approach is required for identities. As such, given that in some circumstances there is no single globally trusted entity that can be relied upon for synchronisation, similarly in some circumstances it is not possible to have a single globally trusted entity to establish identities, which leads us to the first principle:

For global synchronization to work in reality, there cannot be a single trust anchor.

A cryptographic key pair can uniquely be identified through the fingerprint of the public key. By owning the associated private key, an entity can always prove unambiguously through a signature that the entity is the owner of the public key. This principle is used in the system to verify and authorize the activities of the participants. As such, we can introduce the second principle:

A participant is someone who can authorize and whose authorizations can be verified (by someone with a known key)

That is, a participant is an entity/node with a key or with a set of keys that are known to belong together. However, this does not necessarily equal knowledge of who owns the key. Ownership is an abstract aspect of the real world and is not relevant for the synchronisation itself. Real world ownership is only relevant for the interpretation of the meaning of some shared data, but not of the data processing itself. This leads to the third principle:

Separate certification of system identities and legal identities (or separation of cryptographic identity and metadata)

Cryptographic keys can be used to build trust chains by having a key sign a certificate certifying some ownership or some fact to be associated with another key. However, at the root of such chains is always the root key. The root key itself is not certified and the legal ownership cannot be verified: a participant just needs to believe it. As an example, if an entity looks at a local certificate store on the entity's device, they need to trust that a certain root is owned by a named certificate authority. Such trust is rooted in the trust in the operating system provider that they have included only legitimate keys.

As such, any link between legal identities to cryptographic keys through certificates is based on a belief that the entity controlling the root key is honest and ensured that everybody attached to the trust-root has been appropriately vetted. Thus an entity may need to believe that legal identities are properly associated, but verifying it in the absolute sense is very difficult, especially impossible online.

Another relevant aspect is that identity requirements are asymmetrical properties. While large corporations want to be known by their name (BANK), individuals tend to be more closed and would rather like that their identity is only revealed if really necessary (GDPR, HIPAA, confidential information, bank secrecy). Also, by looking at a bearer bond for example, the owner has a much higher interest in the identity of the obligor than the obligor has in the owner. If the obligor turns out to be bad or fraud, the owner might lose their money and investment. In contrast, the obligor doesn't really care to whom he is paying back the bond, except for some regulatory reasons. Therefore, we conclude the fourth principle:

Identities on the ledger are an asymmetric problem, where privacy and publicity needs to be carefully weighted on a case by case basis.

In order to construct a global composable identity system, an identity scheme needs to produce globally unique identifiers. This allows the global system to avoid federation which would require cooperation between identity providers or consensus among all participants and would be difficult to integrate with the synchronisation protocol.

We will use $(p_k^x, S_k^x)$ to refer to a public/private key pair of some cryptographic scheme, where the super-script x will provide the context of the usage of the key and the sub-script k will be used to distinguish keys.

In the following, we will use the fingerprint of a public key $I_k$=fingerprint($p_k$) in order to refer to key pair $(p_k, S_k)$. Based on this, we will use $I_k$ resp. $(p_k, S_k)$, as an identity root key pair in the following. There can be multiples thereof and we do not make any statement on who the owner of such a key is.

Now, we introduce a globally unique identifier as a tuple $(X, I_k)$, where $I_k$ refers to the previously introduced fingerprint of an identity root key and X is in principle some abstract identifier such that we can verify equality. As such, $(X, I_k)$ $(Y, I_l)$ if $X=Y$ and $I_k=I_l$. The identifier is globally unique by definition: there cannot be a collision as we defined two identifiers to be equal by definition if they collide. As such, the identity key $I_k$ spans a namespace and guarantees that in his namespace, there is no collision by definition.

The unique identifier within the project, in one example in Scala code, is defined as:

```
/** A namespace spanned by the fingerprint of a pub-key
 *
 * This is based on the assumption that the fingerprint is unique to the
 * public-key */
final case class Namespace(fingerprint: Fingerprint)
/** a unique identifier within a namespace */
final case class UniqueIdentifier(id: Identifier, namespace: Namespace) {
```

We will use the global unique identifier to identify participant nodes N=(N,$I_k$), parties P=(P,$I_k$), and domain entities D=(D,$I_k$) (which means that X is short for (X,$I_k$). For parties P and participant nodes N, we should use a sufficiently long random number for privacy reasons. For domains D, we use readable names, Alternative Domain Construction(s)

The preceding disclosure specifies that each domain can contain a set of components for conducting transactions within, or across, that domain. For instance, a domain can contain a sequencer or external node (e.g., nodes 130, 230, 813, 817, 1018) for ordering transactions submitted by participant nodes (e.g., nodes 110, 120, 210, 220, 811, 815, 819) in the domain, and a mediator node 280 for aggregating and ensuring fidelity of confirmations within the domain. It is to be appreciated that alternative constructions for domains are possible and contemplated by the disclosure.

In some examples, the function of the mediator node 280 can be implemented in alternatives to the ones described above. In one example, the function of the mediator node is replicated by a fault-tolerant service on replicating servers (such as using a byzantine fault-tolerant state machine replication). In another example, the function of the mediator node can run inside a software guard extension (SGX) enclave in one or more nodes to provide stronger privacy and confidentiality. In some examples, such an enclave may be associated with the external node.

The disclosure contemplates that each domain, or a subset of domains, could include a distributed system (e.g., a blockchain) running its own consensus protocol, in this instance, instead of relying on a sequencer or external node (e.g., nodes 130, 230, 813, 817, 1018) for ordering transactions, participant nodes (e.g., nodes 110, 120, 210, 220, 811, 815, 819) in the domain could rely on the transaction-ordering protocol of the distributed system (e.g., blockchain) for ordering and/or validating transactions submitted in that domain. Further, as mentioned previously, transactions can occur on different domains or across domains (e.g., a multi-domain transaction). Thus, the synchronization protocol disclosed herein can be utilized to synchronize a virtual ledger across different distributed systems (e.g., blockchains). In that sense, the synchronization protocol disclosed herein can be constructed in a manner to synchronize different distributed systems, forming a web of different distributed systems each running their own consensus and/or transaction-ordering protocols.

Notably, such examples are more than just mere interoperability between different domains and systems. The transaction protocol can remain the same to form the virtual ledger such that the domain infrastructure of a domain can be swapped or changed, and different implementations of the domain(s) can be connected.

In an example, the consensus protocol of the aforementioned distributed system may be a byzantine fault-tolerant protocol (e.g., BFT, PBFT, aBFT, etc.), it can be a consensus protocol used along with sybil-resistance features as in Proof of Work (POW) or Proof of Stake (POS), or it can be another consensus protocol recognized in the art. As such, it is contemplated that the synchronization protocol disclosed herein can work in conjunction with other distributed systems (e.g., blockchains) to synchronize transactions amongst different distributed systems and form a virtual ledger of different distributed systems.

The invention claimed is:

1. A method of scheduling and validating a multiple-participant process, the method comprising:
submitting, by a submitting node associated with a participant in the multiple-participant process, a proposed transaction by sending a cryptographically-protected message to one or more recipient nodes, the one or more recipient nodes each being associated with a respective stakeholder affected by the proposed transaction, wherein the proposed transaction includes a set of sub-transactions that each involves at least one of the one or more recipient nodes and specifies each respective stakeholder, wherein the set of sub-transactions are created prior to receiving the proposed transaction and the cryptographically-protected message comprises at least an unencrypted submessage readable by an external node and a cryptographically-protected submessage to preserve privacy from at least the external node;
determining, by the external node, an order of the proposed transaction relative to other transactions;
by way of at least some of the recipient nodes, validating the cryptographically-protected message;
receiving a confirmation of validity of the cryptographically-protected message from at least some of the recipient nodes;
finalizing the proposed transaction, as a confirmed transaction, based on receiving one or more confirmations from at least some of the recipient nodes that satisfy a confirmation condition; and
writing the confirmed transaction to a distributed ledger according to the order determined by the external node.

2. The method of claim 1, wherein the one or more recipient nodes includes at least a first recipient node and a second recipient node, and wherein the cryptographically-protected submessage is readable by the first recipient node, but not readable by the second recipient node.

3. The method of claim 2, wherein the first recipient node has access to a decryption key to decrypt the cryptographically-protected submessage, but the second recipient node does not.

4. The method of claim 1, wherein the cryptographically-protected message is sent to the external node, and the external node sends the cryptographically-protected message to the one or more recipient nodes.

5. The method of claim 1, wherein the one or more recipient nodes use pseudonymous addresses to hide their identity from other recipient nodes.

6. The method of claim 5, further comprising an identity manager that maintains associations between the submitting node and a pseudonymous address, and the one or more recipient nodes and a pseudonymous address.

7. The method of claim 1, wherein determining validity of the cryptographically-protected message is based on the unencrypted submessage, and further including:
determining if a transaction time of the proposed transaction is within a window of a timestamp provided by the external node.

8. The method of claim 1, wherein determining validity of the cryptographically-protected message is based on the cryptographically-protected submessage, wherein determining the validity of the cryptographically-protected message includes one or more of the following:
identifying whether the proposed transaction conflicts with a previous transaction;
determining whether the proposed transaction is well-formed; or
determining if the proposed transaction conforms with a set of conformance rules.

9. The method of claim 1, wherein the confirmation condition is one or more of the following:
receiving a confirmation from each recipient node corresponding to a participant in the multi-participant process;
receiving a specified amount of confirmations within an allocated period of time;
receiving confirmations from a specified subset of the one or more recipient nodes; or
receiving confirmation from a verifiable attestation mechanism such as a cryptographic prover or trusted hardware.

10. The method of claim 1, further comprising a referee node that determines if the one or more recipient nodes do not act in accordance with an expected action for the respective recipient node, wherein the referee node determines one or more of the following:
whether the proposed transaction is well-formed;
whether the confirmation provided by the one or more recipient nodes conflicts with one or more other confirmations; or
whether the proposed transaction falsely indicates a capacity promise exhaustion.

11. The method of claim 10, wherein determining whether the proposed transaction is well-formed includes checking one or more of the following:
that the proposed transaction conforms with the conformance rules;
that the proposed transaction is authorised by a required subset of the one or more recipient nodes; or
that the proposed transaction has a correct declaration of resource requirements.

12. The method of claim 1, wherein determining the order of the proposed transaction is based on the unencrypted submessage.

13. The method of claim 12, wherein the order of the proposed transaction is based on a physical timestamp corresponding to the time the cryptographically-protected message is received by the external node, or a logical time stamp assigned to the proposed transaction.

14. The method of claim 1, further comprising:
determining, by the external node, one or more recipient nodes associated with the participants in the multiple-participant process based on the unencrypted submessage;
sending, by the external node, at least the cryptographically-protected submessage to the one or more recipient nodes,
wherein receiving the confirmation of validity of the cryptographically-protected submessage from the one or more recipient nodes is performed by the external node;
determining, by the external node, one or more nodes that should receive the confirmation; and
sending, by the external node, the confirmation to the one or more nodes;
wherein finalizing the proposed transaction and writing the confirmed transaction to the distributed ledger is performed by the submitting node.

15. The method claim 1, further comprising:
receiving and aggregating, by a mediator node, the confirmations provided by the one or more recipient nodes; and
performing one or more of the following:
storing the aggregation of the confirmations;
sending the aggregation of the confirmations to another node; or
confirming the proposed transaction based on the aggregation of the confirmations.

16. The method of claim 1, wherein the distributed ledger records messages between at least two of the submitting node, external node, or recipient nodes, wherein the confirmed transaction written to the distributed ledger comprises the recorded messages, whereby the order determined by the external node is evidenced, or can be derived, from the recorded messages.

17. The method of claim 1, wherein the distributed ledger comprises a plurality of distinct ledgers, each maintaining a respective partial copy of the ledger, wherein the distributed ledger is constructed from partial records of the plurality of distinct ledgers.

18. The method of claim 1, further including a change of the multiple-participant process from a first domain associated with the external node to a target domain associated with a target external node, the method further comprising:
receiving, by the external node of the first domain, a transfer request from an initiator node, wherein the transfer request specifies the target domain and the target external node;
determining, by the external node of the first domain, validity of the target domain and the target external node to host the proposed transaction,
wherein based on determining the target domain can validly host the proposed transaction, sending an authorization to the initiator node to schedule and validate the proposed transaction at the target node, wherein ordering the proposed transaction is performed by the target external node.

19. The method of claim 18, further comprising:
receiving, at least one of the submitting node or a recipient node, the transfer request; and
determining, at least one of the submitting node or a recipient node, validity of the target domain and target external node to host the proposed transaction,
wherein based on determining the target domain can validly host the proposed transaction, sending authorization to the initiator node to schedule and validate the proposed transaction at the target node.

20. The method of claim 1, wherein the encrypted submessage includes expected confirmation data to cryptographically validate all expected confirmations in the proposed transaction, wherein the method further comprises:
executing a cryptographic function to cryptographically validate each of the received one or more confirmations corresponds with the expected confirmation data.

21. The method of claim 20, wherein the expected confirmation data is in the form of one or more public keys, and wherein the expected confirmation includes an electronic signature with a private key corresponding to the one or more public keys.

22. The method of claim 1, wherein each subtransaction is associated with a corresponding cryptographically-protected submessage with private information readable by an involved recipient node to the subtransaction, but not readable by one or more recipient nodes that are not involved in the subtransaction, and
wherein the cryptographically-protected submessage includes private information validation data to validate confirmations that, at least in part, are representative of private information of at least one other subtransaction in the proposed transaction, and the method further comprises:
validating that the confirmation of at least one other subtransaction corresponds with the private information validation data.

23. A method of scheduling and validating a transaction or series of transactions in a multiple-participant process comprising:
submitting a proposed transaction by at least sending a partially encrypted message to one or more recipient nodes associated with a participant in the multi-participant process, the one or more recipient nodes each being associated with a respective stakeholder affected by the proposed transaction, wherein the proposed transaction includes a set of sub-transactions that each involves at least one of the one or more recipient nodes and specifies each respective stakeholder, wherein the set of sub-transactions are created prior to receiving the proposed transaction and the partially encrypted message comprises at least an unencrypted submessage readable by an external node and an encrypted submessage to preserve privacy from at least the external node;
receiving a confirmation of validity of the partially encrypted message from the recipient node;
finalizing the proposed transaction, as a confirmed transaction, based on receiving one or more confirmations from at least some of the recipient nodes that satisfy a confirmation condition;
receiving, from the external node, an order of the confirmed transaction relative to other transactions; and
writing the confirmed transaction to a ledger according to the order determined by the external node.

24. The method of claim 23, wherein the proposed transaction is part of a proposed multi-participant transaction across multiple domains, the method further comprising:
determining from a proposed multi-participant transaction: the first proposed transaction for a first domain including the one or more recipient nodes and the external node; and at least another proposed transaction for another domain including one or more other recipient node and another external node;
submitting the other proposed transaction by at least sending another partially encrypted message to the one or more other recipient nodes associated with a participant in the multi-participant process in the other domain, wherein the other partially encrypted message comprises at least an unencrypted submessage readable by the other external node and an encrypted submessage to preserve privacy from at least the other external node;
receiving another confirmation of validity of the other partially encrypted submessage from the one or more other recipient node,
wherein finalizing the proposed transaction further includes finalizing the other proposed transaction, as another confirmed transaction, based on receiving one or more confirmations from at least some of the other recipient nodes that satisfy the confirmation condition;
receiving, from the other external node, an order of the other confirmed transaction relative to other transactions in the other domain; and writing the other confirmed transaction to a ledger, or other ledger, according to the order determined by the other external node.

25. The method of claim 24, further comprising:
sending the confirmation of validity of the cryptographically-protected message from the recipient node in the first domain to the other recipient node in the other domain; and
sending the other confirmation of validity of the cryptographically-protected message from the other recipient node in the other domain to the recipient node in the first domain.

26. A method of scheduling and validating a plurality of transactions in a multiple-participant process comprising:
by way of a node or series of related nodes:
determining an order of a plurality of messages corresponding to the plurality of transactions that make up the multi-participant process;
receiving, from a submitting node associated with a participant in the multi-participant process, a proposed transaction submitted to one or more recipient nodes associated with a participant in the multi-participant process, the one or more recipient nodes each being associated with a respective stakeholder affected by the proposed transaction, wherein the proposed transaction includes a set of sub-transactions that each involves at least one of the one or more recipient nodes and specifies each respective stakeholder, wherein the set of sub-transactions are created prior to receiving the proposed transaction and the proposed transaction includes a partially encrypted message, the partially encrypted message comprising at least an unencrypted submessage readable by the node or series of related nodes;
determining a recipient node associated with a participant in the multi-participant process based on the unencrypted submessage;
sending the partially encrypted message to the recipient node;
receiving a confirmation of validity of the partially encrypted message from the recipient node; and
sending the confirmation to the submitting node.

* * * * *